(12) United States Patent
Minemura

(10) Patent No.: US 7,844,819 B2
(45) Date of Patent: *Nov. 30, 2010

(54) APPLICATION AUTHENTICATION SYSTEM

(75) Inventor: Atsushi Minemura, Tokyo (JP)

(73) Assignee: Panasonic Corporation, Kadoma-shi (JP)

( * ) Notice: Subject to any disclaimer, the term of this patent is extended or adjusted under 35 U.S.C. 154(b) by 975 days.

This patent is subject to a terminal disclaimer.

(21) Appl. No.: 10/304,620

(22) Filed: Nov. 26, 2002

(65) Prior Publication Data
US 2003/0114144 A1 Jun. 19, 2003

(30) Foreign Application Priority Data
Nov. 26, 2001 (JP) ............................. 2001-359940
Nov. 5, 2002 (JP) ............................. 2002-321844

(51) Int. Cl.
H04L 9/32 (2006.01)
(52) U.S. Cl. ................... 713/176; 713/181; 713/187
(58) Field of Classification Search ............ None
See application file for complete search history.

(56) References Cited

U.S. PATENT DOCUMENTS

| 5,892,902 | A | 4/1999 | Clark |
| 5,907,616 | A | 5/1999 | Brogger et al. |
| 6,230,002 | B1 * | 5/2001 | Floden et al. ............ 455/411 |
| 6,910,131 | B1 * | 6/2005 | Yamada et al. ............ 713/186 |
| 6,931,545 | B1 * | 8/2005 | Ta et al. ............ 726/10 |
| 7,512,802 | B2 * | 3/2009 | Minemura ............ 713/176 |

FOREIGN PATENT DOCUMENTS

EP 0607767 A1 7/1994

OTHER PUBLICATIONS

Digital cellular telecommunications system (Phase 2+) (GSM); UMTS; MExE; Functional description; Stage 2 (3GPP TS 23.057 version 4.2.0 Release 4); ETSI Standards, EU Telecomm. Stand. Inst., Jun. 2001, vol. 3-T2, No. V420, Sophia-Antipo, FR.
Digital cellular telecommunications system (Phase 2+); Specification of the Subscriber Identity Module-Mobile Equipment (SIM-ME) interface (3GPP TS 51.011 version 4.1.0 Release 4); ETSI Standards, EU Telecomm. Stand. Inst., Jun. 2001, vol. 3-T2, No. V410, Sophia-Antipo, FR.
"Trusted Computing Platform Alliance" Feb. 22, 2002, Version 1.1B, Trusted Computing Group, OR USA.

* cited by examiner

Primary Examiner—Pramila Parthasarathy
(74) Attorney, Agent, or Firm—Day Pitney LLP

(57) ABSTRACT

Since there is a possibility that an application downloaded to a terminal performs an invalid operation, an operation of the downloaded application is very much restricted, and the application can not use local resources of the terminal. With the use of information for authenticating the application, which is held in a tamper resistant region of an authentication module, authentication for the application downloaded to a download section of the terminal is performed to confirm its source or whether or not it has been tampered with. Only an authenticated application is permitted to use the local resources of the terminal or the authentication module, so that an invalid application is prevented from using the local resources. Furthermore, there is no need to make the terminal have the tamper resistant region, manufacturing costs of the terminal can be held at a low level.

12 Claims, 55 Drawing Sheets

APPLICATION AUTHENTICATION SYSTEM

BACKGROUND OF THE INVENTION

1. Field of the Invention

The present invention relates to technology to authenticate a terminal and an application program that operates in the terminal, in a system having a terminal such as a cell phone and an authentication module such as an IC card.

2. Description of the Prior Art

Conventionally, in a system where the IC card is attached to the terminal to perform business transaction with a server, an application program (hereinafter, abbreviated as 'application') operating in the server has directly authenticated the IC card because a region having tamper-resistance cannot be secured in the terminal. Therefore, the terminal has only relayed communication between the server and the IC card.

On the other hand, it has been made possible in recent years for the server to download the application to a cell phone or the like to operate it in a portable terminal.

However, since there is a possibility that the application downloaded to the cell phone performs an invalid operation, an operation of the downloaded application is very much restricted.

For example, use of local resources is greatly restricted for the application downloaded to the cell phone, such that it cannot write data in the IC card attached to the cell phone and use of various kinds of interfaces is restricted (prohibited).

Further, the application downloaded to the cell phone is restricted to reading and writing of personal information such as a mail address recorded in a telephone book or an address book or contents of mails stored in a mail inbox, which is held by the cell phone or the IC card. This is because the relevant application is an authorized one, and verification, whether or not it has a right to access to the information held inside the cell phone, the IC card or the like, or whether or not it operates obliquely, cannot be performed.

This could be an extremely large disincentive to all-purpose use (versatility) of portable tools and applications to E-commerce (EC), which have promising futures.

To eliminate the restrictions, the downloaded application needs to be authenticated to confirm a feature of the application. For example, a signature that a third person has added to the application is downloaded along with the application, the signature and information necessary for verifying correctness of the signature are presented to the IC card, and thus authentication is performed. However, since the cell phone generates the information (a digest generated by a hash function, for example) necessary for determining the correctness of the signature after the cell phone has downloaded the application and the signature, there is a possibility that a dummy signature, which is different from the signature added to the downloaded application, and a digest, which has been manipulated such that verification can be performed by the signature, are presented to the IC card by the cell phone. For this reason, there exists a problem that the IC card cannot trust that the signature and the digest presented to the IC card are actually the ones of the downloaded application, and the IC card cannot perform authentication for the downloaded application.

Furthermore, to enable the application downloaded to the terminal such as a cell phone (hereinafter, abbreviated to a 'terminal application') to access to the IC card and to read and write the information stored in the IC card so as to be protected, it is required that a processing for authenticating the terminal application that accesses the IC card is similarly performed by the IC card to determine whether or not access may be permitted.

As processing where a secure device such as the IC card performs authentication for the terminal application that accesses the IC card, processing has conventionally been performed so that the secure device determines whether or not the terminal application has secret information similar to information held therein. However, the terminal does not have a region or a function such as a region having tamper-resistance for securely holding the secret information. For this reason, there exists a problem that the secret information may leak and the conventional method cannot eliminate the possibility that the terminal application uses the leaked information and thus the secure device cannot authenticate the terminal application closely.

SUMMARY OF THE INVENTION

To solve the aforementioned problems, the present invention allows the tamper-resistant region in the authentication module such as the IC card to have information for authenticating a program written in the ROM of the terminal such as a cell phone (hereinafter, the program may be referred to as a 'library'), and the authentication module performs authentication for a library written in a region such as the ROM and a TRM of the terminal, whose rewriting is difficult.

When the library authenticated in this manner spontaneously generates necessary information to determine the correctness of the signature and presents it to the IC card along with the signature of the downloaded application, the IC card can trust that the signature and the information presented by the authenticated library are actually the ones of the downloaded application, and thus the IC card can authenticate the application downloaded to the terminal. As the result, the authenticated application can write data in the IC card, which can realize a more complicated operation than the operation of business transaction using a conventional terminal.

Further, by authenticating the application downloaded to the terminal with the IC card as described-above, it becomes possible that the downloaded application is allowed to use an external interface of the terminal.

To execute the present invention, the signature of the application to be downloaded needs to be downloaded. Therefore, it is made possible that the signature of the application is not only downloaded independently of the application, but also stored in a definition file of the application in order to deal with conventional data specification. Accordingly, downloading of the signature independently of downloading of the application is unnecessary.

BRIEF DESCRIPTION OF THE DRAWINGS

For a more complete understanding of the present invention and the advantages thereof, reference is now made to the following description taken in conjunction with the accompanying drawings.

FIG. 13 is a function block diagram of the application authentication system in the fifth embodiment of the present invention.

FIG. 42 is a flowchart explaining a processing flow of the application authentication system in the nineteenth embodiment of the present invention.

PREFERRED EMBODIMENTS OF THE INVENTION

The present invention relates to the application authentication system that includes the terminal and the authentication module, and the 'terminal' may be a portable electronic device represented by the cell phone. Further, it also may be a personal computer or a public terminal installed on a street corner, which is virtually not portable. It is an electronic device to which the authentication module described below is attachable, and it can operate the application inside the device. The terminal has various kinds of sections inside as described below, and these sections can be realized by software when the terminal is provided with a ROM, a RAM and a CPU.

The 'authentication module' is one having a storage area inside, which is a (SD) memory card, an IC card or a smart card, and it performs an operation to reply to data entered when the data is entered from the terminal to which the module is attached. Furthermore, the authentication module has a region called a tamper-resistant region that prevents invalid reading-out and invalid rewriting of information stored therein. A few of the sections in the authentication module described below can also be realized by a card application that operates in such an IC card.

Generally, the authentication module is attached to the terminal, and an electrical circuit is formed between the terminal and the authentication module to exchange information. However, there also exists a mode where the main body of the terminal and a part to which the authentication module is attached separately, and information is exchanged by communication.

Note that the application operating on the terminal performs one or more arithmetic operations, use a local interface, access the server, access the tamper-resistant region, and access an external memory. The 'local interface' is an external interface that the terminal has, where IrDA (an interface for infrared communication), Bluetooth, another radio communication, an interface for cable communication, and the like are cited.

Note that description has been made above that the terminal and the authentication module are easily separated, but the terminal may be provided inside the terminal so as to be crimped or soldered to the terminal circuit so that they cannot be separated easily.

Further, although description 'terminal' has been made above, the present invention is not limited to portable equipment and can be executed by using a personal computer, a workstation, or the like, instead of the terminal.

Furthermore, the present invention can be applied to a processing that, in a state that a plurality of equipment are connected in series, equipment on one end performs authentication for the application stored in equipment on the other end.

First Embodiment

Figure 1:
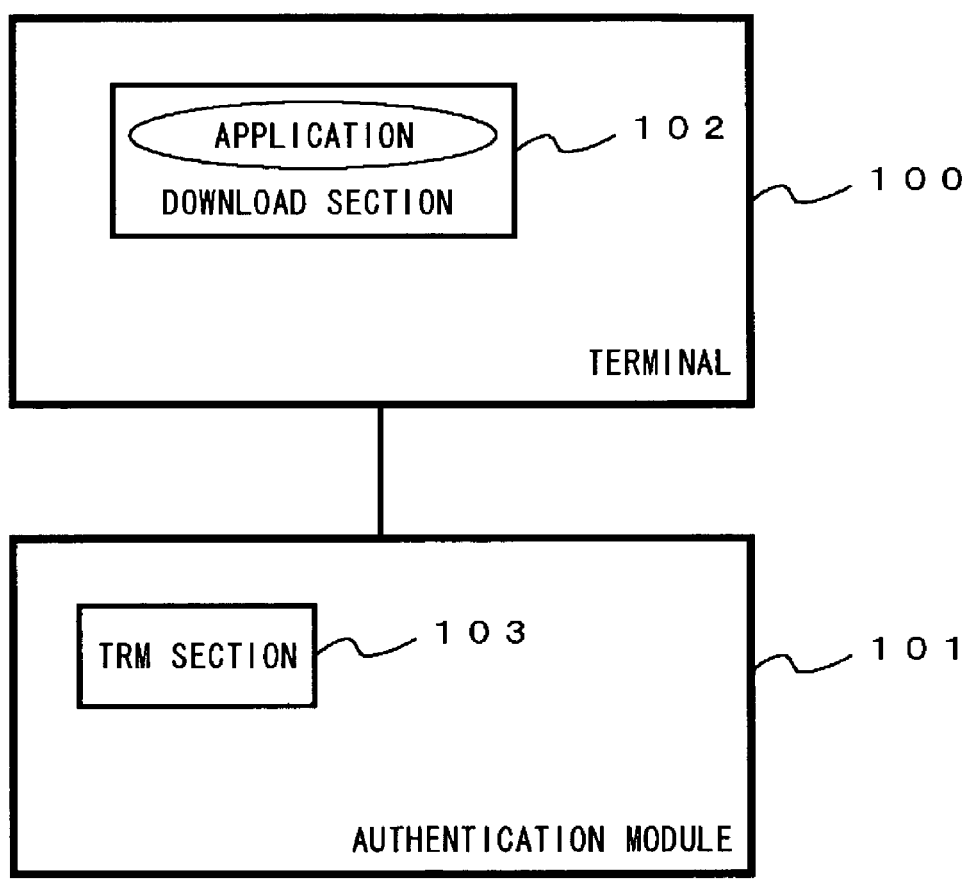
FIG. 1 is a function block diagram of an application authentication system in the first embodiment in the present invention.

FIG. 1 is the function block diagram of the application authentication system in the first embodiment in the present invention. The application authentication system in this embodiment has a terminal 100 and an authentication module 101.

The terminal 100 has a download section 102 that downloads the application. 'To download the application' is to read in data for executing the application from outside of the download section 102. Herein, 'data for executing the application' is: binary data, if the application is the binary data directly executable by the terminal 100; and description of a language, if the application is described in the language interpreted and executed by the terminal 100. The download section reads in the data for executing the application and holds the data.

The authentication module 101 has a TRM section 103. The TRM section 103 holds information for a processing of application authentication in the tamper-resistant region. Note that the 'TRM' is the abbreviation for a 'Tamper Resistant Module'. The 'application' is an application downloaded to the download section 102 of the terminal 100, and the 'application authentication' is to confirm that the application does not perform an invalid operation such as whether or not the application has been issued by a credible person, has been guaranteed not to perform an invalid operation, or has been tampered after it was issued by the credible person or has been tampered with after it was guaranteed not to operate obliquely. The 'processing the application authentication' is a processing to confirm such authentication.

As a method of processing the authentication, a hash function (may be referred to as a 'digest function' instead of the 'hash function') such as a SHA-1 (Secure Hash Standard-1) and a MD5 (Message Digest 5) is generally used to find resultant data that is obtained after processing the data for executing the application as input data, and the encrypted data (a so-called 'signature') is used. Herein, the 'hash function' is a function that returns a result, where finding two different input data such that the resultant data obtained after processing the input data match is difficult from a complexity point of view. Therefore, the 'information for processing the application authentication' is the actual signature or a decryption key necessary for decrypting the signature to obtain a hash value. The 'tamper-resistant region' is a storage area of the authentication module, which is a storage area whose data is difficult to read out or rewrite in an invalid manner. Such a storage area is realized in such a manner that a user must go through hardware that is not accessible unless the user takes a right procedure to access to the storage area, or that the data stored in the storage area is encrypted.

In the application authentication, the terminal 100 finds the hash value of the application downloaded to the download section 102, presents the signature for the authentication module 101 along with the hash value, and the authentication module 101 checks with the information held in the TRM section 103 whether or not the signature can be generated from the hash value or the hash value matches a hash value obtained by decrypting the signature. Further, the terminal 100 presents the actual application downloaded to the download section 102 and the signature for the authentication module 101, and may check the relationship between the actual application and the signature to perform authentication.

With the application authentication system of this configuration, the application downloaded to the download section 102 can be authenticated by the information held in the TRM section 103 of the authentication module 101. Thus, the system can prevent downloading of an invalid application to be executed in the terminal 100 or stored in the authentication module 101.

Figure 2:
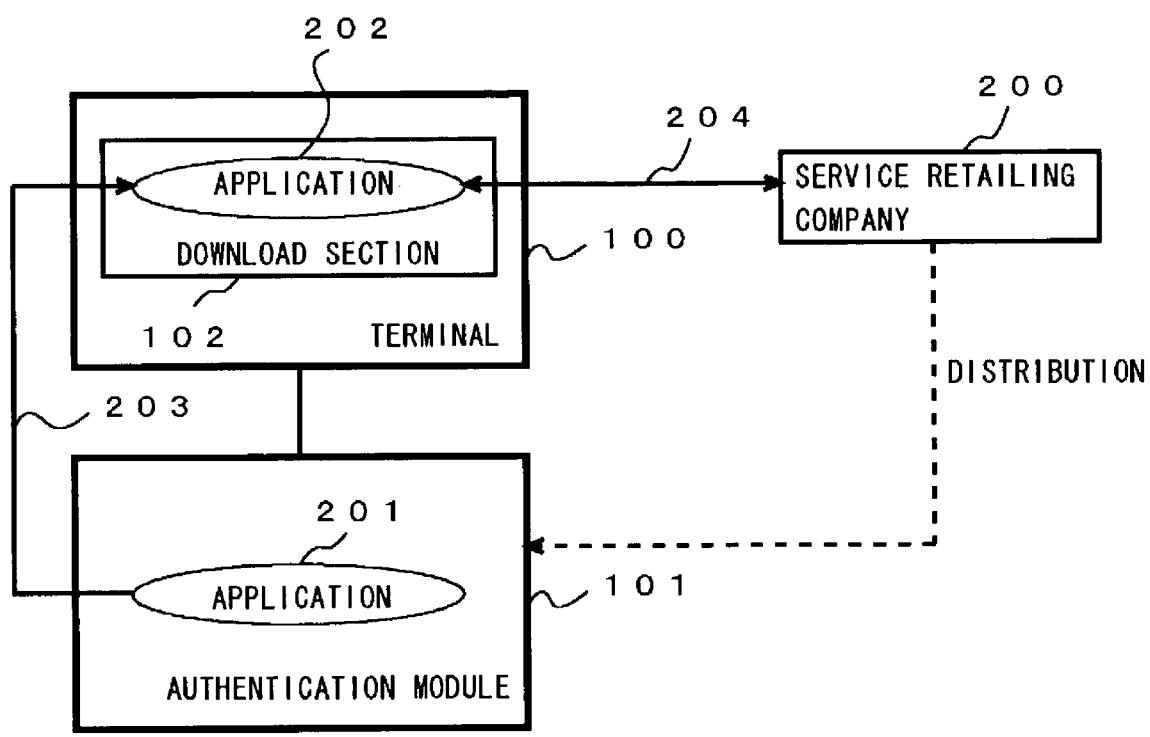
FIG. 2 is a view showing an example of the application authentication system in the first embodiment of the present invention.

FIG. 2 shows an example of the application authentication system in this embodiment. In this example, a service retailing company 200 distributes the authentication module 101 in a state that an application 201 is stored therein. When a person who has obtained the authentication module 101 attaches the module 101 to the terminal 100, the application 201 is downloaded from the authentication module 101 to the download section 102 of the terminal 100 (arrow 203). When an downloaded application 202 is authenticated by the information stored in the TRM section of the authentication module 101, the application 202 operates in the terminal 100 to receive provision of service from the service retailing company 200 (arrow 204).

Figure 3:
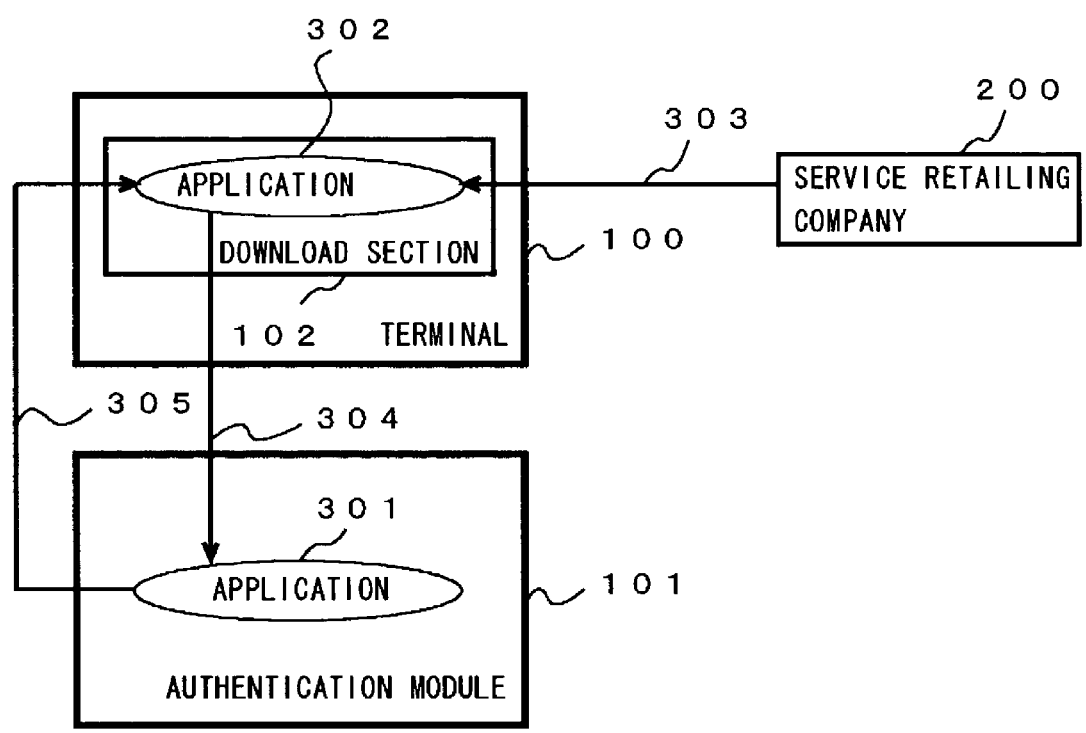
FIG. 3 is a view showing another example of the application authentication system in the first embodiment of the present invention.

FIG. 3 shows another example of the application authentication system in this embodiment. In this example, the service retailing company 200 downloads an application 302 to the download section 102 of the terminal (arrow 303). When authentication is performed to the application 302 by the information held in the TRM section of the authentication module 101 and confirmation is made that the application is not an invalid application, it is stored as an application 301 in the authentication module 101 (arrow 304). Then, the application 301 is downloaded to the download section 102 of the terminal 100 if necessary, and executed in the terminal 100.

In FIGS. 2 and 3, although the application executed in the terminal 100 is downloaded from the authentication module 101, another example is cited as follows. When a server, to which the terminal 100 has connected, downloads the application, authentication is performed by the information held in the TRM section of the authentication module 101, and confirmation is made that the application is not an invalid application, the application is executed in the terminal 100.

Although the word 'terminal' has been used, it does not mean that the word is limited to the portable terminal or the like represented by the cell phone. For example, it may be a home electronic appliance, and also may be a so-called information home electronic appliance or a network home electronic appliance. Products such as an air conditioner, a humidifier, a dehumidifier, an air cleaner, a microwave oven, an oven, a refrigerator, a dish washing machine, a water heater, an iron, a trouser press, an electric vacuum cleaner, a washing machine, a drier, an electric blanket, electric sheets, a light fixture, a television, a radio, an audio apparatus such as a tape recorder, a camera, an IC recorder, a telephone, a facsimile machine, a copier, a printer, a scanner, a personal computer, and the like are cited.

Second Embodiment

Figure 4:
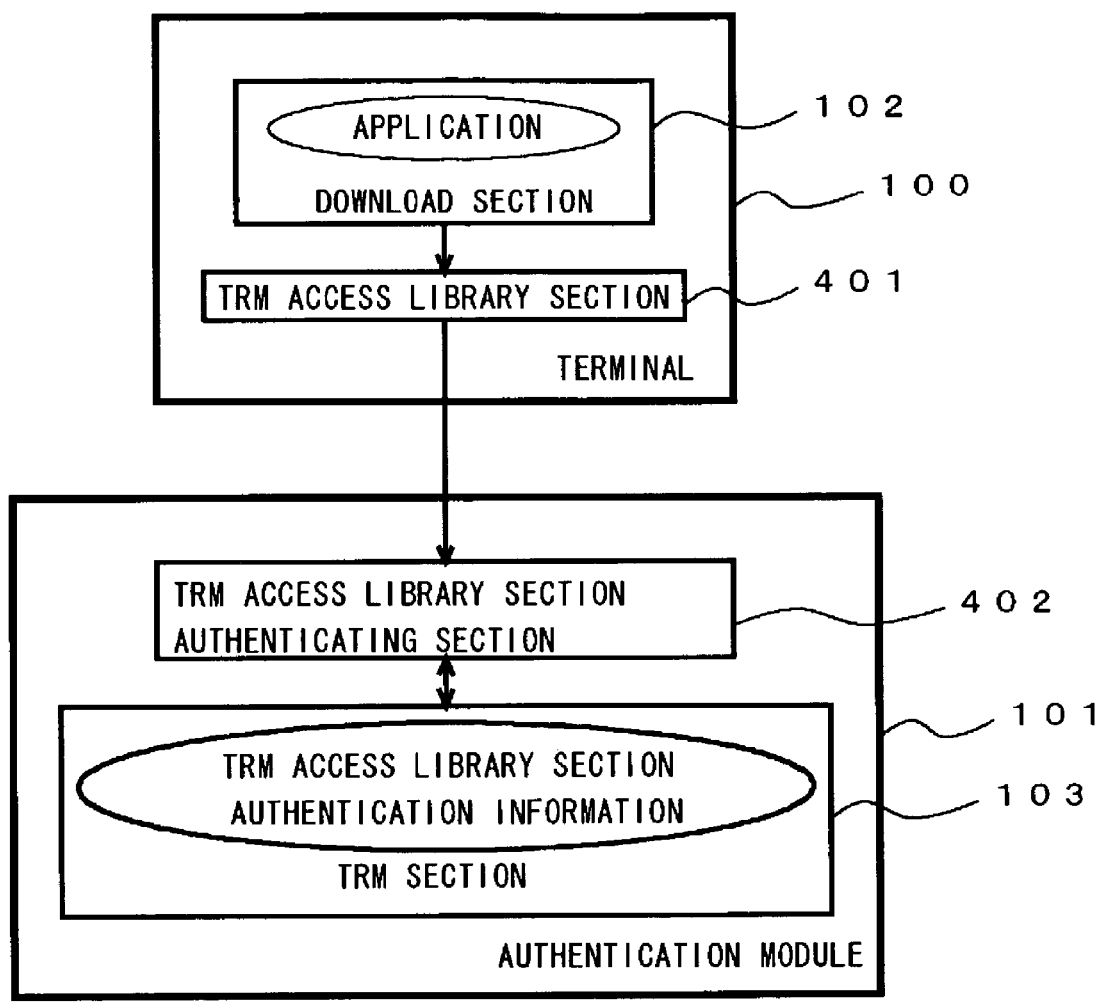
FIG. 4 is a function block diagram of the application authentication system in the second embodiment of the present invention.

FIG. 4 shows a function block diagram of the application authentication system in the second embodiment of the present invention, and the application authentication system comprises the terminal 100 and the authentication module 101. The terminal 100 has the download section 102 and a TRM access library section 401. The authentication module 101 has the TRM section 103 and a TRM access library section authenticating section 402.

The download section 102 downloads the application.

The TRM access library section 401 performs a processing for application authentication on condition that it is authenticated by the authentication module 101. Specifically, the TRM access library section 401 makes the authentication module 101 perform authentication for the section 401 itself first, and performs processing for application authentication when it is authenticated correctly.

As a method that the TRM access library section 401 makes the authentication module 101 perform authentication for the section 401 itself, there exists a method where information unique to the terminal 100 is output to the authentication module 101, and the authentication module 101 checks whether or not the output information matches the information stored in the tamper-resistant region to perform authentication. As the 'information unique to the terminal 100', (1) a telephone number is cited when the terminal is the cell phone. Furthermore, as another 'information unique to the terminal 100', it may be (2) an identifier that specifies the kind of the terminal 100 or an identifier different for each terminal such as a production number added to the terminal 100. In addition, there also exists a method of authenticating the TRM access library section 401 by using information regarding (3) a combination of the applications installed in the terminal 100. The 'applications installed in the terminal 100' means the application provided in the terminal, which is the application downloaded from outside the terminal 100 or the application stored in the ROM of the terminal 100. In this case, TRM access library section 401 outputs information to the authentication module 101 as to which application has been installed in the terminal 100 (the identifier of the installed application, for example), and the authentication module 101 performs authentication by determining whether or not the information that has been output matches the information stored in the tamper-resistant region. Alternatively, information of the invalid terminal information is stored in the tamper-resistant region, and the authentication module performs authentication by determining whether or not it does not match the invalid terminal information.

As an example of (3) cited above, it is assumed that a new service is provided for a person who is a member to receive both of service A and service B, for example. In this case, when TRM access library section 401 is authenticated by the authentication module 101 on condition that application A to receive service A and application B to receive service B are installed in the terminal 100, application C to receive service C can be provided for the member whose terminal has installed applications for service A and service B.

Further, there also exists a method of authenticating the TRM access library section 401 by using the information to identify the TRM access library section 401. The 'information to identify the TRM access library section 401' is information to identify software that constitutes the TRM access library section 401, for example, which is a name, a version or a serial number of the software. The TRM access library section 401 outputs the information to identify the TRM access library section 401 to the authentication module 101, and the authentication module 101 performs authentication by determining whether or not the information that has been output matches the information stored in the tamper-resistant region.

The 'processing for authentication of the application' is a processing for authentication of the application downloaded to the download section 102. The TRM access library section 401 may perform a part of the processing regarding authentication of the application. In addition, since the TRM access library section 401 has been authenticated by the authentication module 101, it may perform all the processing regarding authentication of the application.

Figure 36:
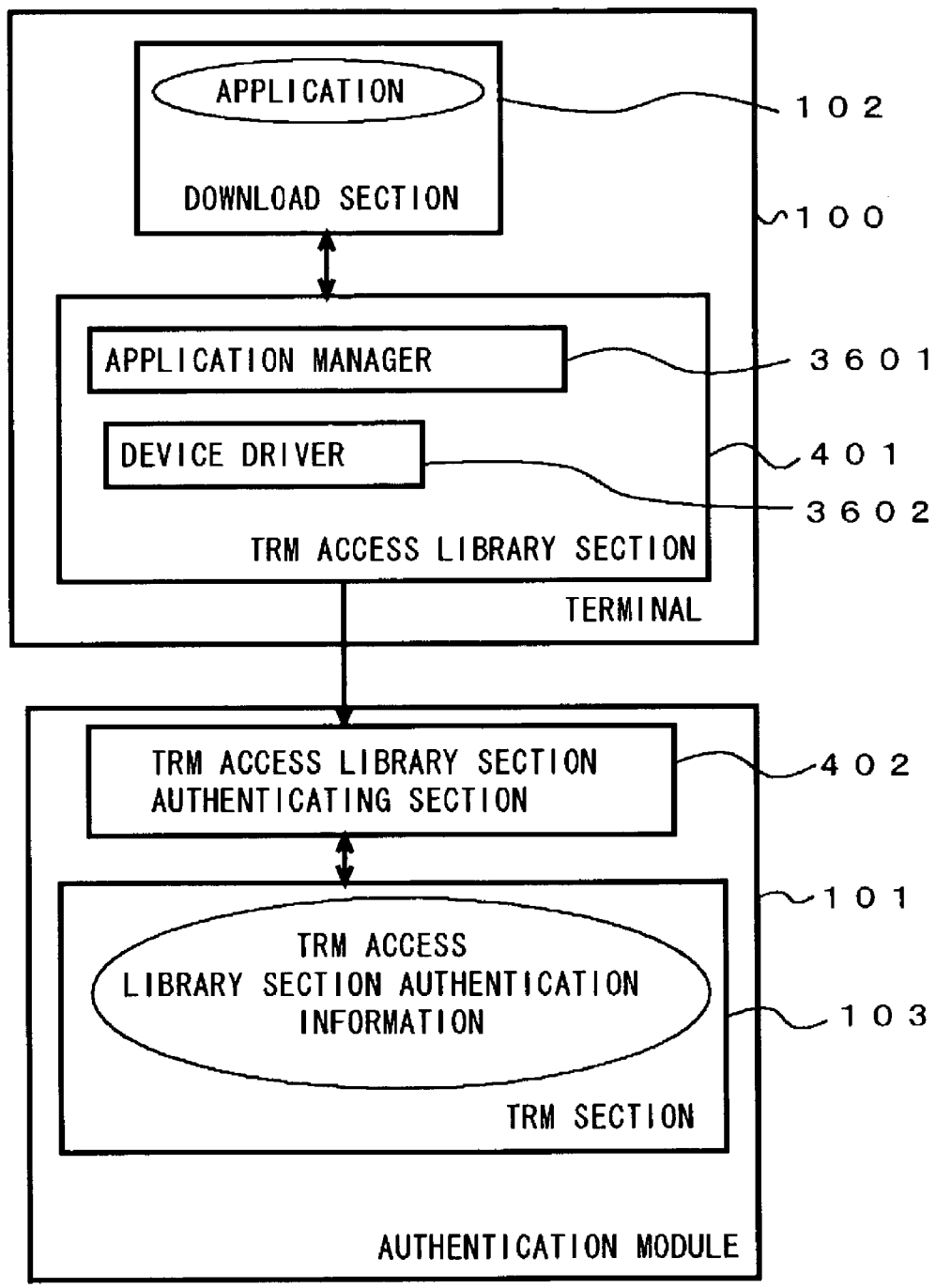
FIG. 36 is a view in which the TRM access library section of the application authentication system of the second embodiment has an application manger and a device driver.

Further, the processing performed by the TRM access library section 401 is not necessarily limited to the processing for application authentication. For example, as shown in FIG. 36, the TRM access library section 401 has an application manager and a device driver therein, and may perform a processing for them.

The 'application manager' provides a function to control the application operation, such as startup, termination, and suspension. Note that an 'application control program' is cited as another name of the application manager, for example.

The 'device driver' is a program to control input/output with the authentication module. For example, it is a program that absorbs specification of operation for input/output, which is different for each authentication module, and enables the application to perform input/output by an operation of a same interface. Note that an 'authentication module access program' is cited as another name of the device driver.

The TRM section 103 holds TRM access library section authentication information in the tamper-resistant region. The 'TRM access library section authentication information' is information to authenticate the TRM access library section 401. As already described, there are cases where this information is the information unique to the terminal 100 such as a cell phone number, the information regarding the combination of the applications installed in the terminal 100, or the information to identify the TRM access library section 401. Since the TRM access library section authentication information is held in the tamper-resistant region, there is also a case where the cell phone number, the information to identify the application installed in the terminal 100, and the information to identify the TRM access library section 401 are held in an encrypted form.

The TRM access library section authenticating section 402 authenticates the TRM access library section 401 of the terminal 100 based on the TRM access library section authentication information. Specifically, it performs authentication for the TRM access library section 401 with information for authentication output from the TRM access library section 401 to the authentication module 101 and the TRM access library section authentication information held in the TRM section 103.

Figure 5:
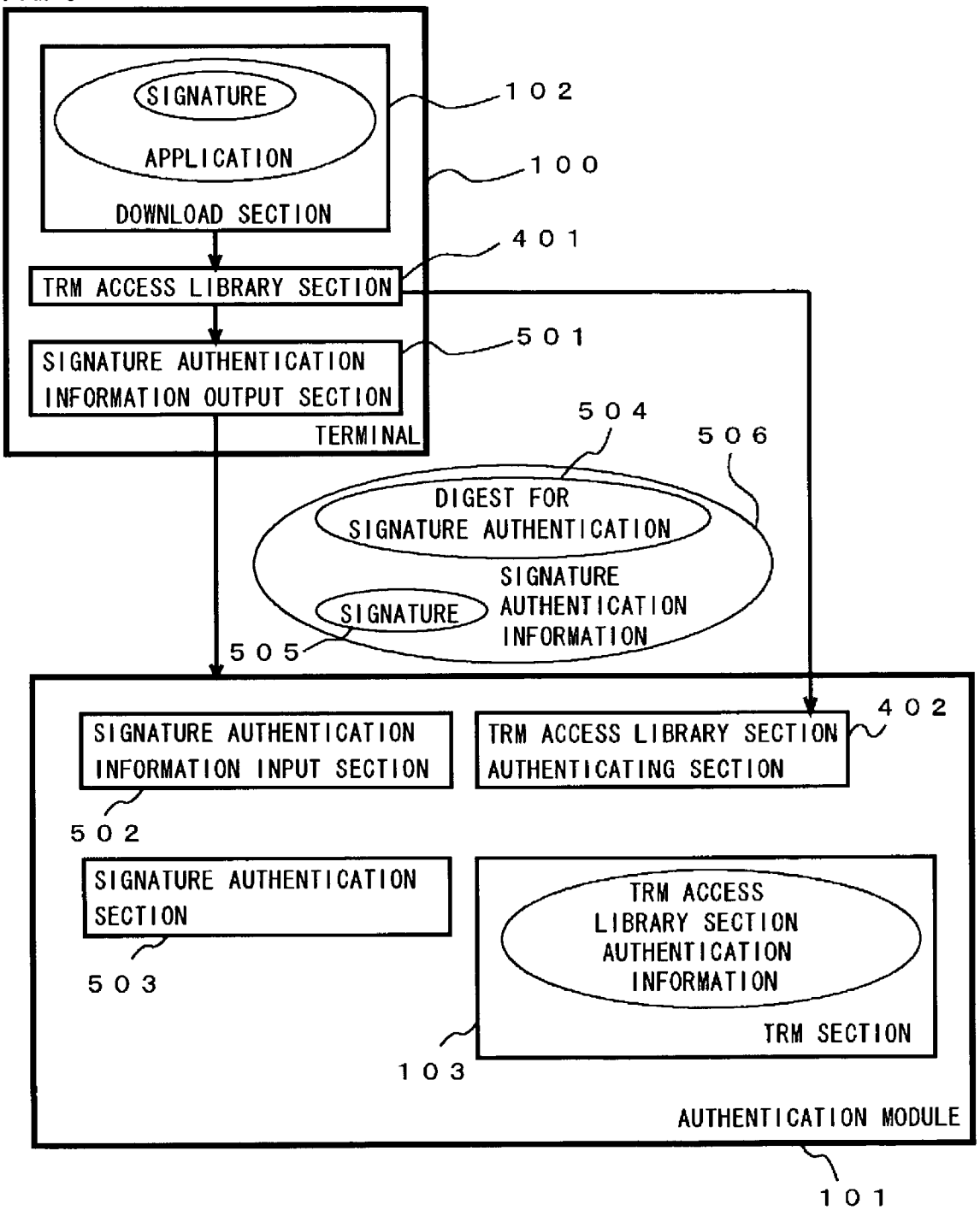
FIG. 5 is a function block diagram of an application authentication system in the second embodiment of the present invention.

FIG. 5 is a view for explaining a method of application authentication in the application authentication system in this embodiment. The difference between the application authentication systems shown in FIGS. 4 and 5 is that the download section 102 of the terminal 100 in FIG. 5 downloads the application to which the signature, which is the information to authenticate that the application has not been tampered with, is added, the terminal 100 further has a signature authentication information output section 501, and the authentication module 101 further has a signature authentication information input section 502 and a signature authentication section 503.

Figure 6:
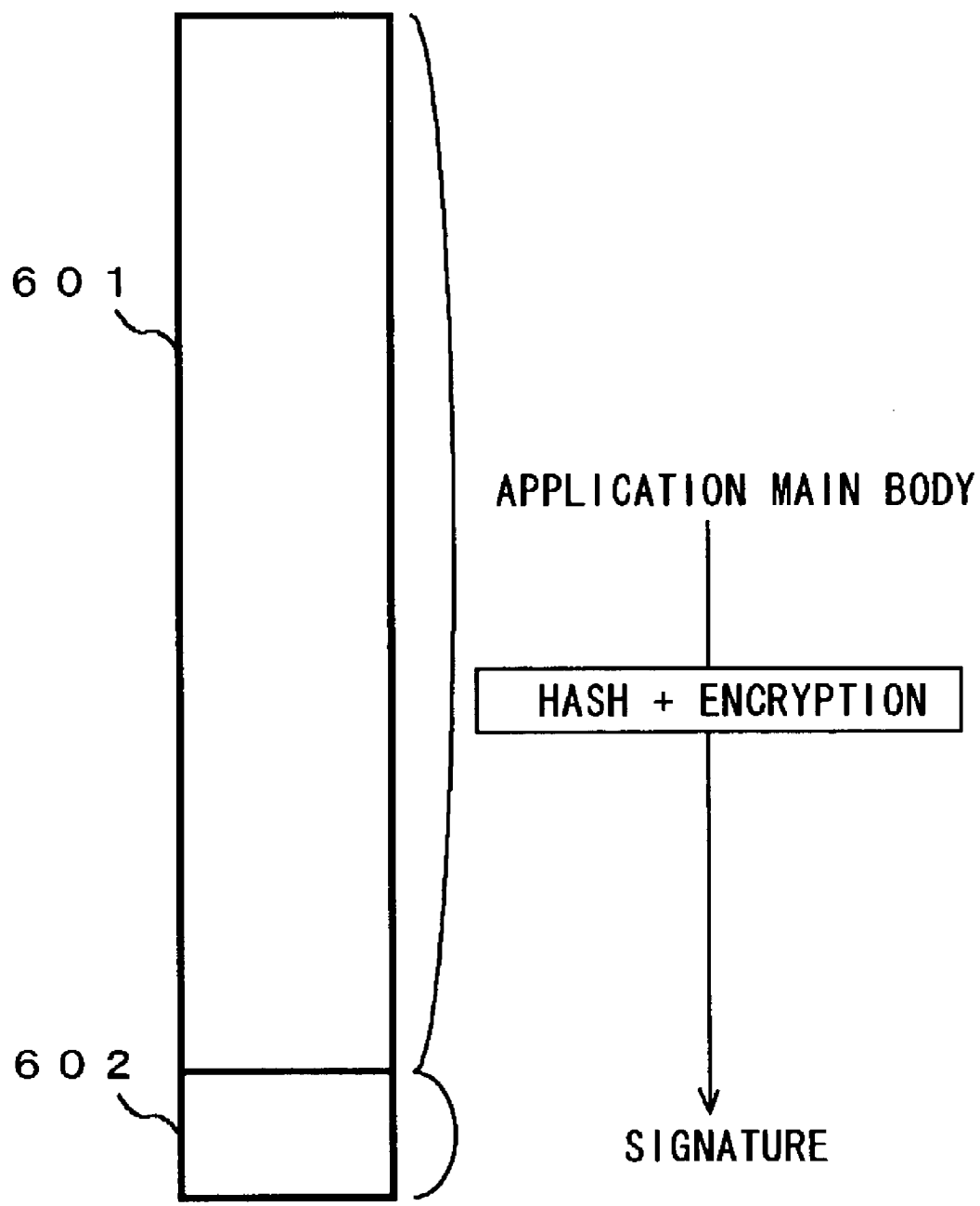
FIG. 6 is a view explaining an application main body and a signature.

The 'signature, which is the information to authenticate that the application has not been tampered with' is information to confirm that the application has not been tampered with. FIG. 6 shows a relationship between the application and the signature. An application main body 601 is qualified as data, a value obtained by applying the hash function such as SHA-1 and MD5 to the data is encrypted, and thus a signature 602 is formed. To confirm that the application main body has not been tampered with, by using the signature 602, the signature 602 is decrypted first to obtain the hash value. Next, the hash function is applied to the application main body to confirm whether or not a value obtained is the same as the hash value that is obtained by decrypting the signature 602. Alternatively, the hash function is applied to the application main body to obtain the hash value, it is encrypted, and determined whether or not the obtained value is the same as the signature 602. The former method is a method normally used when the signature 602 uses a public key cryptography, for example, where the signature 602 is generated by encrypting the hash value by a private key of a person who signs and is decrypted by a public key that corresponds to the private key of the person who has signed when confirmation is made that the application main body has not been tampered with. The latter method is used, for example, when a person who confirms that the application main body has not been tampered with knows the private key of the person who has signed, or when a symmetric key cryptography is used.

In this embodiment, TRM access library section 401, after having the authentication module 101 authenticate the section 401 itself, performs a processing that is a part of the processing for authentication of the application downloaded to the download section 102, that is, generating a digest for signature authentication from the application downloaded to the download section 102. The 'digest for signature authentication' is the hash value by the hash function such as SHA-1 and MD5.

The signature authentication information output section 501 outputs signature authentication information 506 generated in the TRM access library section 401, which includes a digest for signature authentication 504 and a signature 505, to authentication module 101. Herein, the 'signature 505' is a signature added to the application downloaded to the download section 102.

The signature authentication information input section 502 enters the signature authentication information 506 output from the signature authentication information output section 501.

The signature authentication section 503 performs verification for the signature based on the digest for signature authentication and the signature entered from the signature authentication information input section 502. As a method of verification, when the signature has been encrypted by the private key of the public key cryptography, for example, it is decrypted by the public key that corresponds to the private key and authentication is performed by comparing the result of the decryption and the digest for signature authentication to determine whether or not they are identical. Alternatively, there exists a method in which the symmetry key is held in the tamper-resistant region and the signature is decrypted by the symmetry key to compare with the digest for signature authentication, or a method in which the private key is held in the tamper-resistant region and the digest for signature authentication is encrypted by the private key to be compared with the signature.

Figure 7:
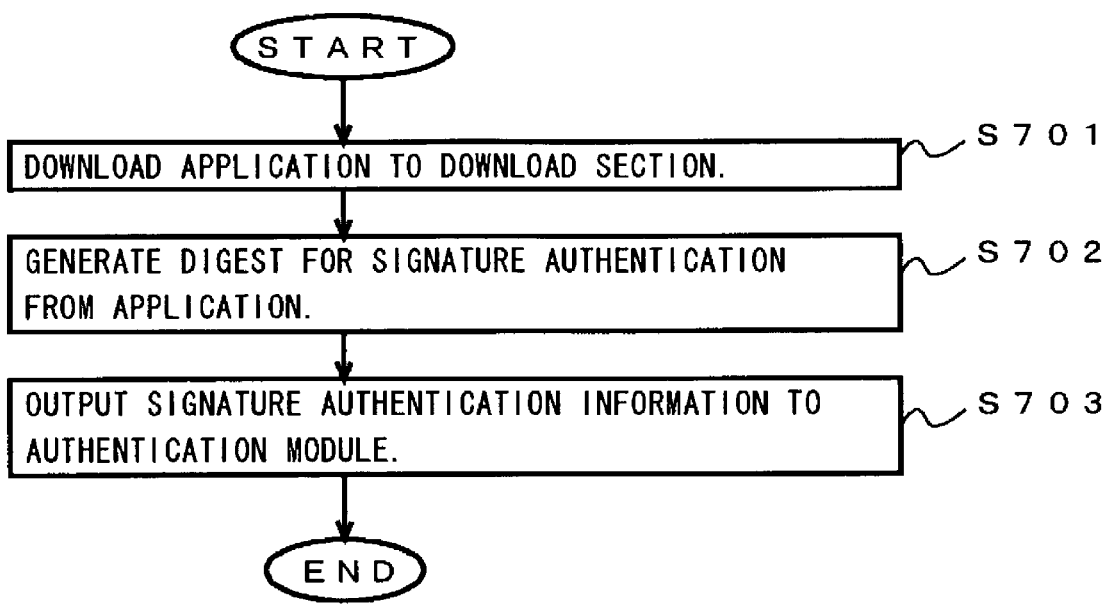
FIG. 7 is a flowchart explaining an operation of a terminal in the second embodiment of the present invention.

FIG. 7 is the flowchart exemplifying the operation of the terminal 100. As a premise for performing the processing of the flowchart, it is assumed that the TRM access library section 401 has been authenticated by the authentication module 101. In step S701, the application is downloaded to the download section 102. In step S702, the TRM access library section 401 generates the digest for signature authentication by the downloaded application. In step S703, the signature authentication information output section 501 outputs the signature authentication information 506, which includes the digest for signature authentication found in step S702 and the signature added to the downloaded application, to the authentication module 101.

Figure 8:
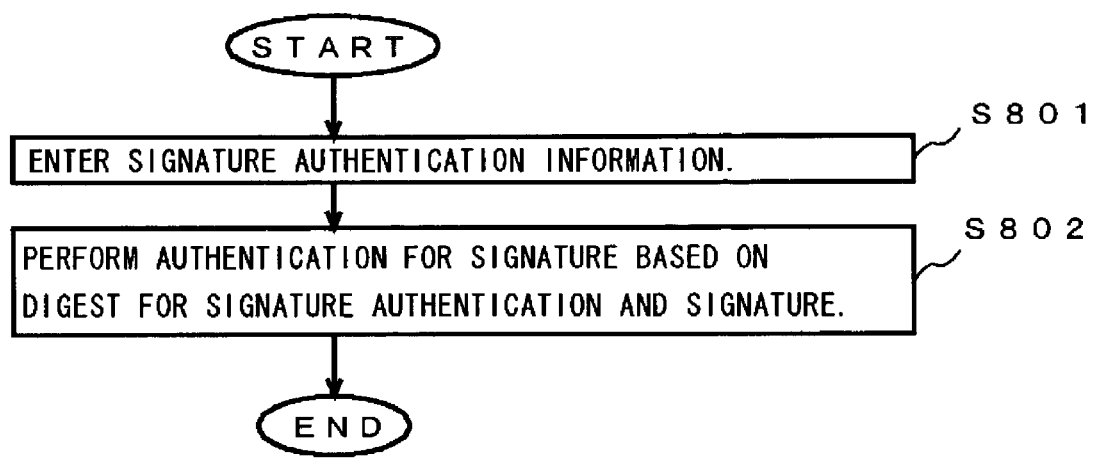
FIG. 8 is a flowchart explaining an operation of an authentication module in the second embodiment of the present invention.

FIG. 8 is the flowchart explaining the operation of the signature authentication information input section 502 and the signature authentication section 503 of the authentication module 101. As a premise for performing the processing of the flowchart, it is assumed that the TRM access library section 401 has been authenticated by the authentication module 101. For this reason, there exists a method where it is assumed that the TRM access library section authenticating section 402 sets an authentication result in the authentication module 101, and in the case of performing the processing of the flowchart of FIG. 8, the authentication result that has been set is referred to and the processing of the flowchart of FIG. 8 is performed only when the TRM access library section 401 has been authenticated. In step S801, the signature authentication information input section 502 enters the signature authentication information 506. In step S802, verification for the signature is performed based on the digest for signature authentication 504 and the signature 505. The method of verifying the signature is as described above.

In this embodiment, since the TRM access library section 401, on condition that it has been authenticated by the authentication module 101, generates the digest for signature of the application downloaded to the download section 102, and the digest for signature authentication that has been generated is input to the authentication module 101, the digest for signature authentication is trustworthy and thus the authentication module 101 can perform authentication for the application downloaded to the download section 102.

Third Embodiment

Figure 9:
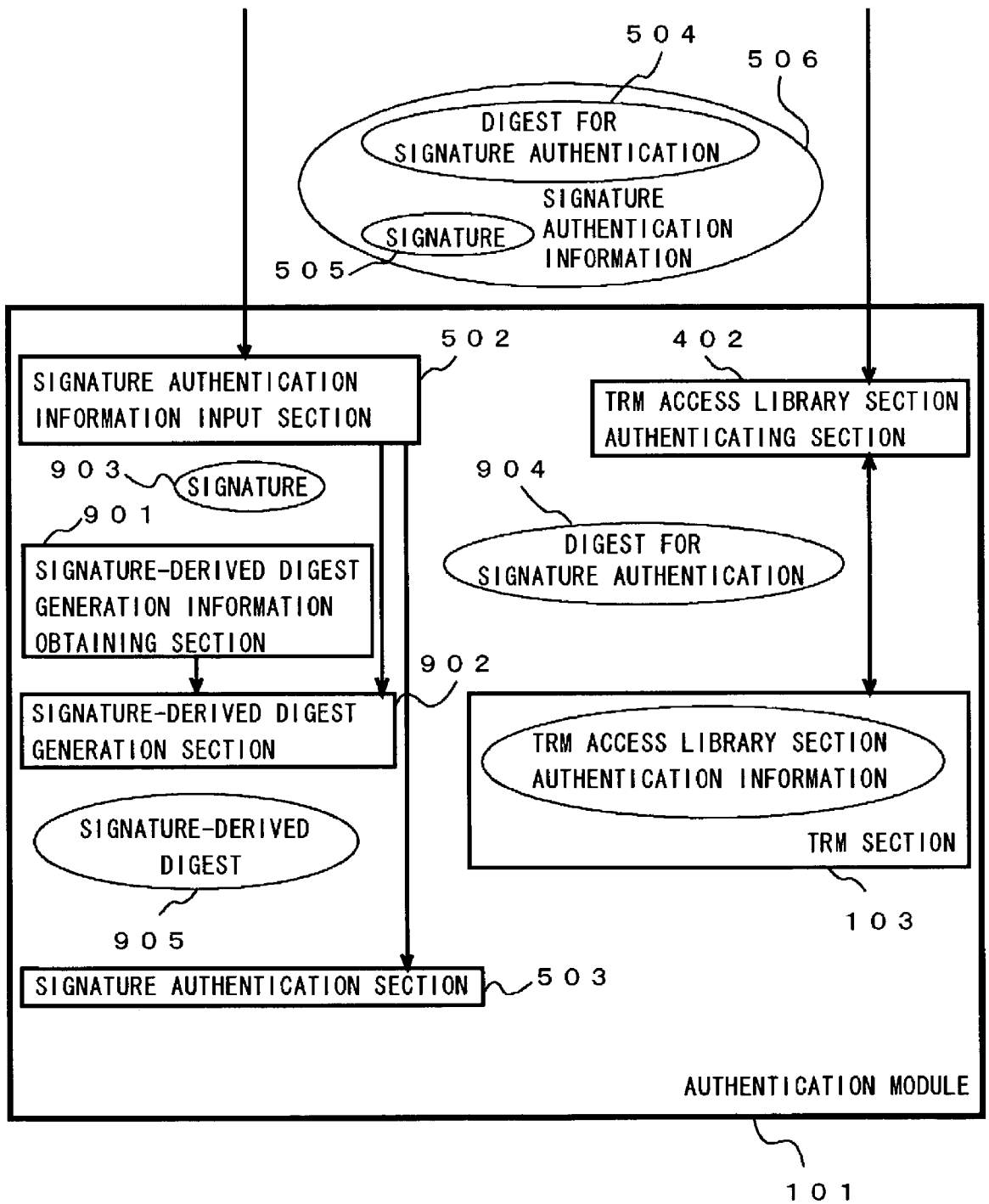
FIG. 9 is a function block diagram of the authentication module in the third embodiment of the present invention.

FIG. 9 is the function block diagram of the authentication module 101 according to the third embodiment of the present invention. This embodiment shows the authentication method by the signature authentication information in the second embodiment more specifically, where the authentication module 101 of the second embodiment further has a signature-derived digest generation information obtaining section 901 and a signature-derived digest generation section 902.

The signature-derived digest generation information obtaining section 901 obtains signature-derived digest generation information for generating a signature-derived digest by using the signature entered from the signature authentication information input section 502. If the signature is the one in which the hash value of the application main body has been encrypted, the 'signature-derived digest generation information' is the decryption key that decrypts the encrypted value. When the public key cryptography is used as a method of encryption, the public key corresponding to the private key that has been used for encrypting the hash value of the application main body is the signature-derived digest generation information. The public key may be held in the authentication module 101. Further, it may be acquired from an appropriate server via the terminal 100 or the like.

The signature-derived digest generation section 902 generates a signature-derived digest 905 by using a signature 903 entered from the signature authentication information input section 502 and the signature-derived digest generation information held in the signature-derived digest generation information obtaining section 901. Specifically, if the signature-derived digest generation information is the public key, the public key decrypts the signature 903 to generate the signature-derived digest 905 that is the hash value of the application main body.

The signature authentication section 503 performs authentication based on the signature-derived digest 905 generated in the signature-derived digest generation section 902 and the digest for signature authentication entered from the signature authentication information input section 502. In other words, it compares the signature-derived digest 905 and the digest for signature authentication 904, authenticates the application downloaded to the download section 102 when they are the same, but does not authenticate it if they are different.

Figure 10:
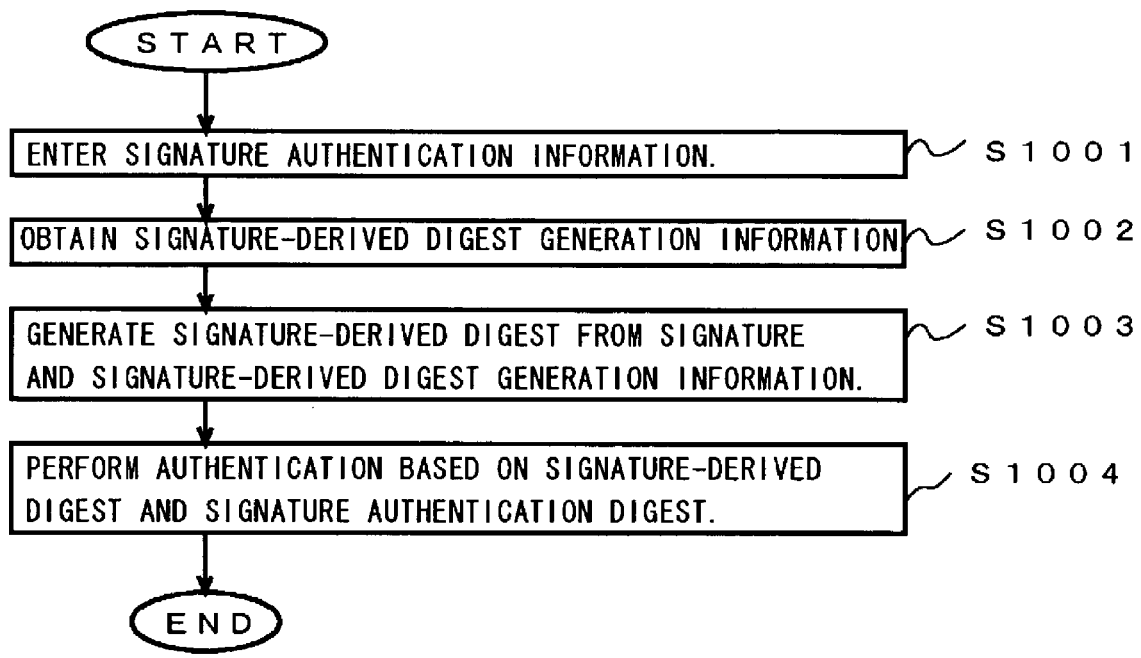
FIG. 10 is a flowchart explaining the operation of the authentication module in the third embodiment of the present invention.

FIG. 10 is the flowchart explaining the operation of the signature authentication information input section 502, the signature-derived digest generation information obtaining section 901, the signature-derived digest generation section 902, and the signature authentication section 503 in this embodiment. As a premise for performing the processing of the flowchart, it is assumed that the TRM access library section 401 has been authenticated by the authentication module 101. For this reason, there exists a method where it is assumed that of the TRM access library section authenticating section 402 sets the authentication result in the authentication module 101, and in the case of performing the processing of the flowchart of FIG. 10, the authentication result that has been set is referred to and the processing of the flowchart of FIG. 10 is performed only when the TRM access library section 401 has been authenticated. In step S1001, the signature authentication information input section 502 enters the signature authentication information 506 to obtain the signature 903 and the digest for signature authentication 904. In step S1002, the signature-derived digest generation information obtaining section 901 obtains the signature-derived digest generation information. In step S1003, the signature-derived digest 905 is generated in the signature-derived digest generation section 902 from the signature 903 and the signature-derived digest generation information. In step S1004, the signature authentication section 503 performs authentication based on the signature 903 and the digest for signature authentication 904.

Fourth Embodiment

Figure 11:
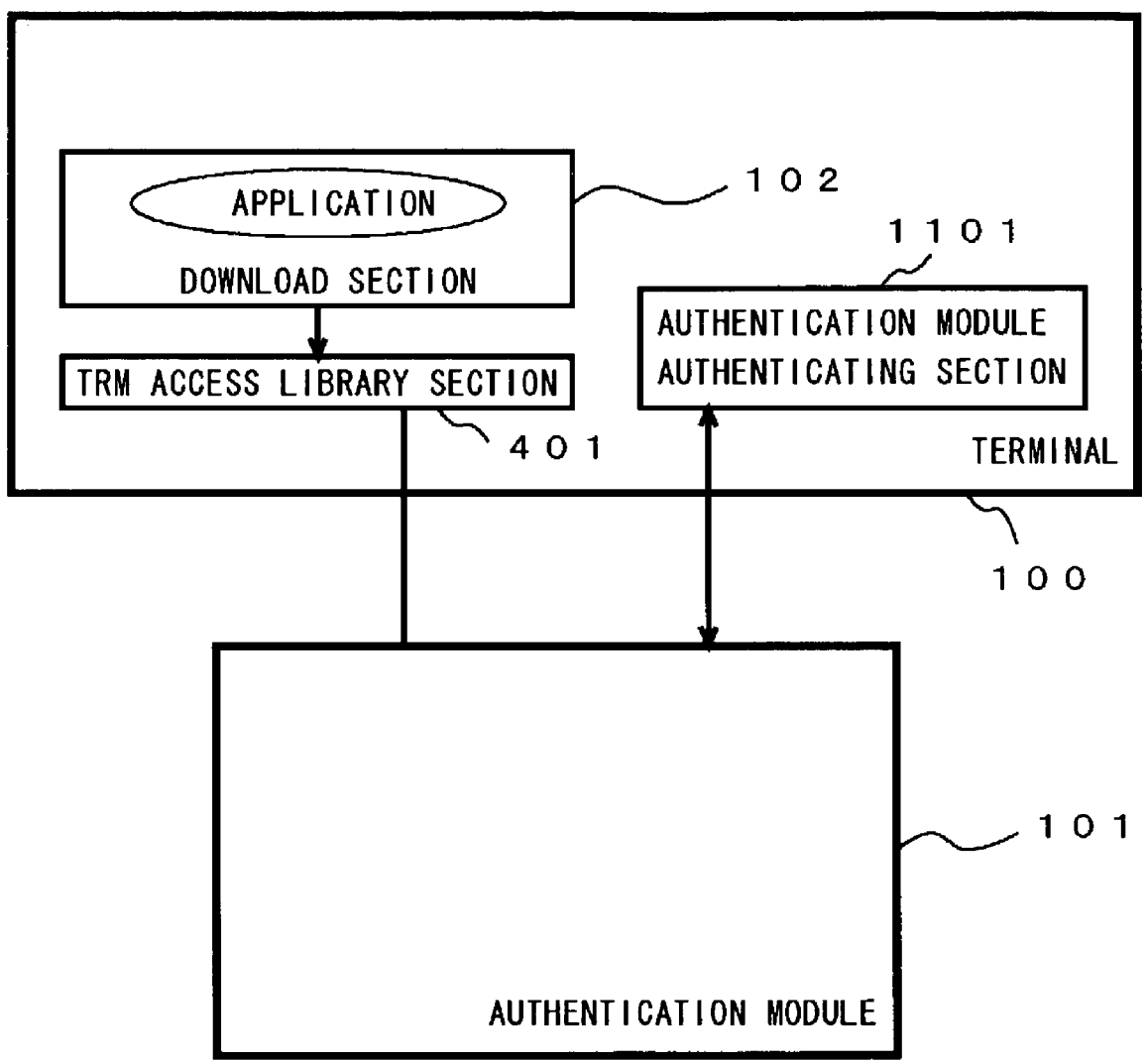
FIG. 11 is a function block diagram of the application authentication system in the fourth embodiment of the present invention.

FIG. 11 shows the function block diagram of the application authentication system in the fourth embodiment of the present invention. In this embodiment, the terminal of the application authentication system in the second embodiment or the third embodiment further has an authentication module authenticating section 1101.

Figure 12:
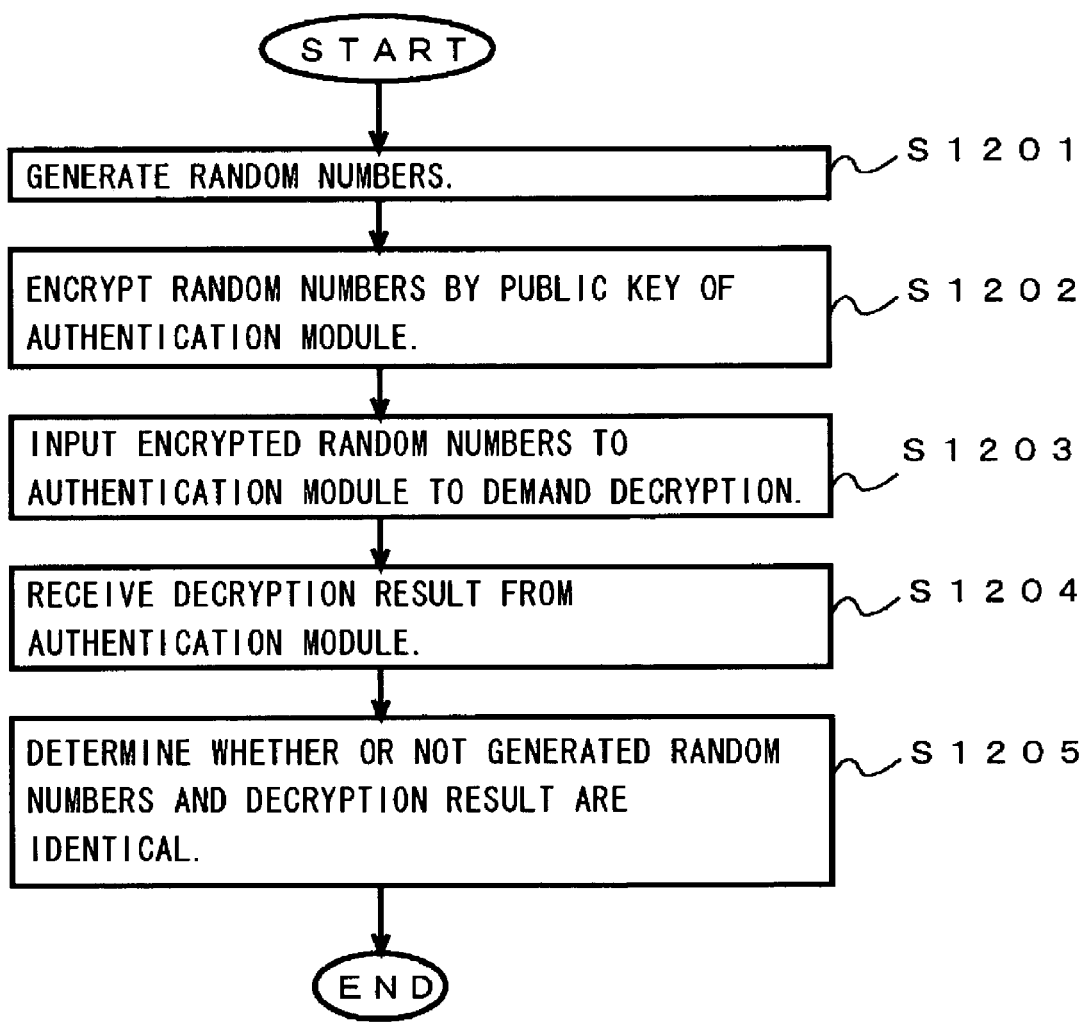
FIG. 12 is a flowchart explaining a processing where a terminal authenticates the authentication module in the fourth embodiment of the present invention.
Figure 1:
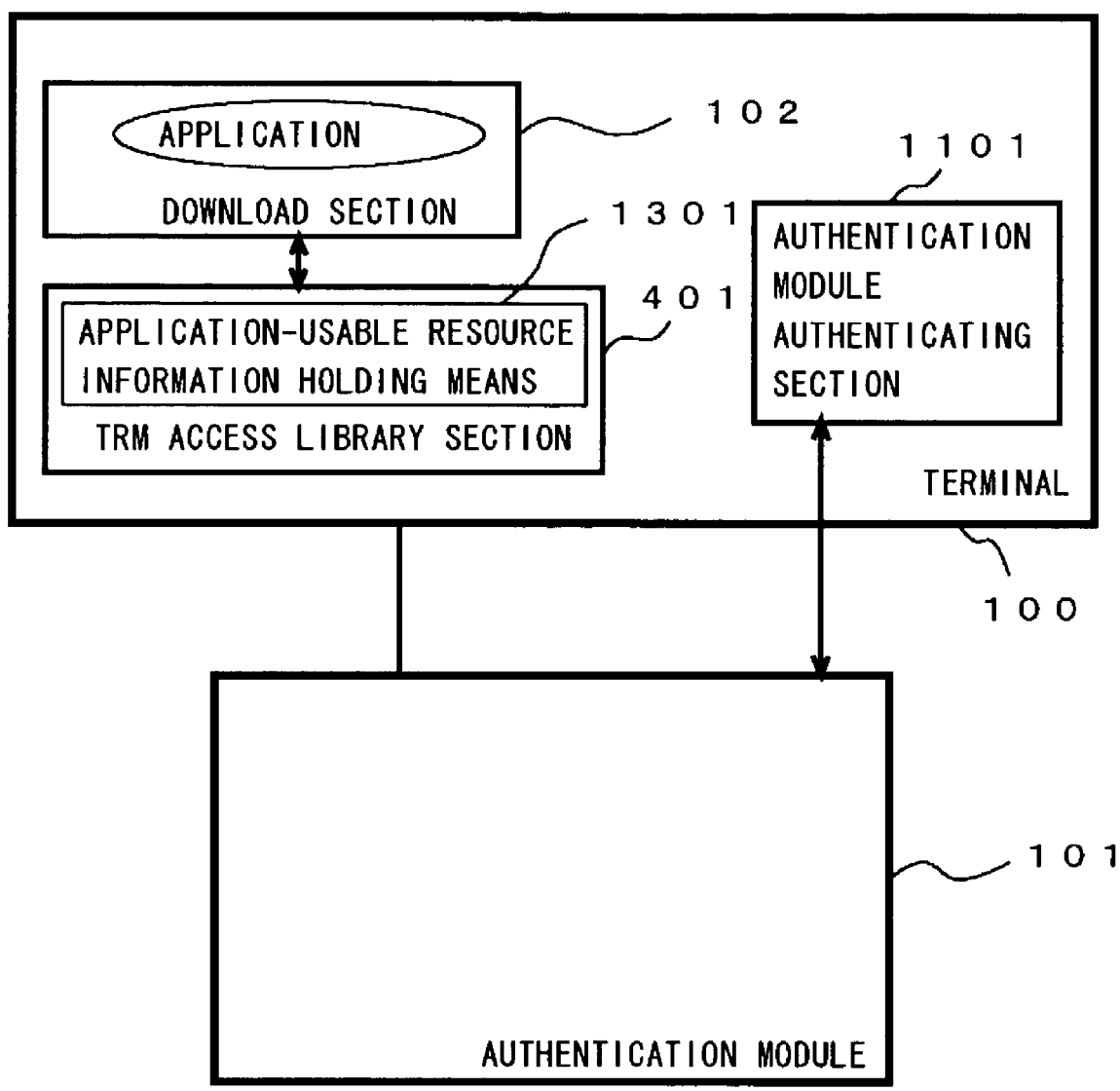

The authentication module authenticating section 1101 authenticates the authentication module 101. As a method of this authentication, there exists the method shown by the flowchart shown in FIG. 12. In using the method, it is presumed that the private key of the public key cryptography and the public key corresponding to the private key are generated for the authentication module 101, and the authentication module 101 stores the private key therein. In step S1201, the authentication module authenticating section 1101 generates random numbers. In step S1202, the random numbers generated in step S1201 are encrypted by the public key that the authentication module 101 has. In step S1203, the random numbers encrypted in steps S1202 are input to the authentication module 101 to demand decryption. In step S1204, the authenticating section 1101 receives a decryption result from the authentication module 101, and it determines if the random numbers generated in step S1201 and the decryption result received in step S1204 are identical in step S1205. As another method, there exists a method where the authentication module authenticating section 1101 inputs the generated random numbers to the authentication module 101 and demand to encrypt the random numbers by the private key of the authentication module 101. The authentication module authenticating section 1101, having obtained the encryption result, decrypts it by the public key of the authentication module 101 and determines if it is identical to the random numbers input to the authentication module 101.

As described above, the terminal 100 can perform authentication for the authentication module 101 when the terminal 100 has the authentication module authenticating section 1101 for authenticating the authentication module 101. Thus, when the application operating in the terminal 100 writes highly confidential information (privacy information, log of E-commerce (EC), balance of an account in a banking transaction, or the like) in the authentication module 101, it is possible to confirm whether or not the authentication module 101 is the right one.

Fifth Embodiment

FIG. 13 shows the function block diagram of the application authentication system in the fifth embodiment of the present invention. This embodiment is a mode in which the TRM access library section 401 of the application authentication system in the fourth embodiment further has application-usable resource information holding means 1301.

The application-usable resource information holding means 1301 holds application-usable resource information. The 'application-usable resource information' is information regarding resources whose use is approved for an authenticated application. The 'authenticated application' is the application downloaded to the download section 102, to which the processing for authentication by the TRM access library section 401 has been performed and which has been authenticated correctly. The 'resources' are resources outside the application used by the application. The resources are: local resources that are resources of the terminal 100 and the authentication module 101 attached thereto; and other resources that are resources of the server, which is a communication destination of the terminal 100, for example. There exist several types of local resources such as use of memory, use of file, use of IrDA, use of Bluetooth, use of communication, use of TRM, use of application, and use of non-contact/contact IC card I/F. In addition, in the case of the use of memory among the local resources, there also exists one regarding a range of memory capacity and memory address. Furthermore, a range of usable time is cited as well.

Figure 14:
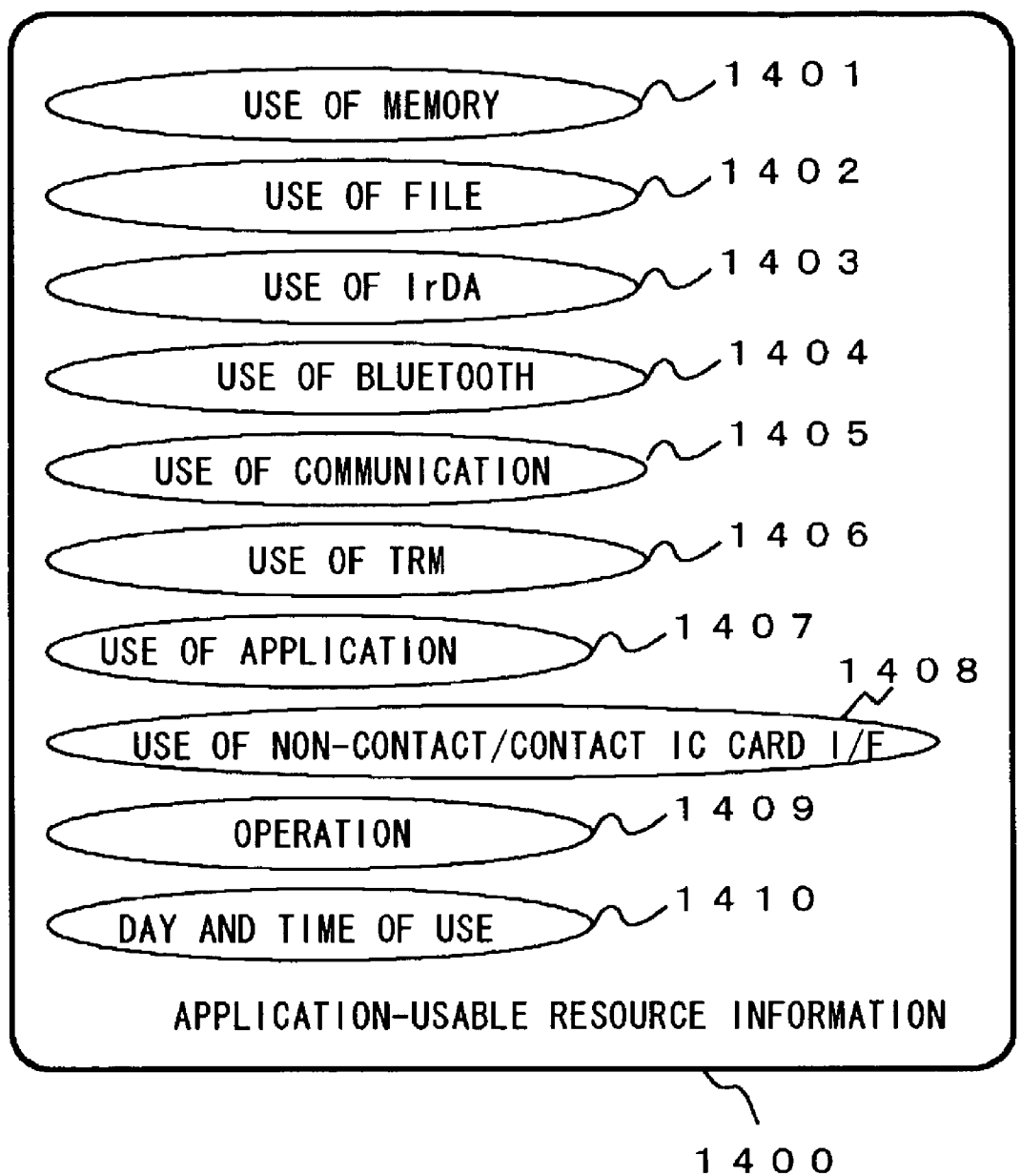
FIG. 14 is a view schematically showing application-usable resource information.

FIG. 14 exemplifies the application-usable resource information. In FIG. 14, application-usable resource information 1400 is comprised of items such as use of memory 1401, use of file 1402, use of IrDA 1403, use of Bluetooth 1404, use of communication 1405, use of TRM 1406, use of application 1407, and use of non-contact/contact IC card I/F 1408, operation 1409, date and time of use 1410, and the like.

As items of the use of memory 1401, usable capacity as memory, address of a usable range, write-capable number, read-capable number, date and time when the memory can be used or cannot be used, and the like, are cited for example. Since writing is a loaded operation for a flash memory, restricting the number of writings to a memory is particularly meaningful.

As items of the use of file 1402, one that describes access restriction to a file that the terminal has or a file that an external memory such as the authentication module 101 connected to the terminal has, is cited. There exist, for example, an accessible directory name, an accessible file name, an accessible file type (specified by a file extension, for example), date and the time when the file can be or cannot be used, and the like.

The use of IrDA 1403 is an item showing whether or not the use of an infrared communication function, which the terminal has, is approved, and time when the function can/cannot be used, total usable time, the number of uses, and the like are cited.

The use of Bluetooth 1404 is an item showing whether or not the use of a communication function via Bluetooth is approved, and intensity of radio waves where the function can be used, the number of roaming, date and time when it can/cannot be used are cited other than the time when the function can be used, total usable time, the number of uses, and the like. By specifying the intensity of radio waves where the function can be used, a distance from which communication is possible can be specified.

The use of communication 1405 is an item showing whether or not the use of a communication function with the server or the like is approved, and an accessible server or the like is cited other than the time when the function can/cannot be used, total usable time, the number of uses, intensity of radio waves where it can be used, and the number of roaming. The server accessible by the application is specified by an IP address, a domain name, a server function such as a mail server and an FTP server, or communication protocol with a server.

The use of TRM 1406 is an item showing whether or not access to the tamper-resistant region of the authentication module 101 or the like is approved, which is the date and time when access to the tamper-resistant region can or cannot be made, the number of accesses, or a card application that operates in an IC card having the tamper-resistant region, and an accessible card application, types of usable IC card commands, and the like are cited.

The use of application 1407 is an item where the application specifies another linkable application. For example, it is an address book, e-mail, scheduler, game, or the like. In addition, the date and time when link is possible with another application may be included. When the terminal 100 is a cell phone, whether or not the application is approved to operate in parallel with a call during telephone communication, or whether or not it must be stopped or finished when the call starts may be specified.

The use of contact/non-contact IC card I/F 1408 is an item showing whether or not the use of an interface for communicating with a contact/non-contact IC card or an IC card rewriter, which is capable of communicating with the terminal 100, is approved. The time when the interface can be used, total usable time, the number of usable/non-usable times, a usable I/F (type A, type B, type C, or the like), a type of usable IC card command, and the like are cited.

The date and time of use 1410 specifies date and time when the application can operate. Alternatively, it specifies date and time when the operation of the application should stop.

When the application downloaded to the download section 102 uses the resources, it sends a demand to use resources to the TRM access library section 401. The TRM access library section 401 refers to the application-usable resource information held in the application-usable resource information holding means 1301 and determines whether or not the demanded resource can be used, and it allows the application to use the demanded resource if it is usable.

The application-usable resource information is downloaded to the download section 102 together with the application to be downloaded, and it may be held in the application-usable resource information holding means 1301.

Figure 15:
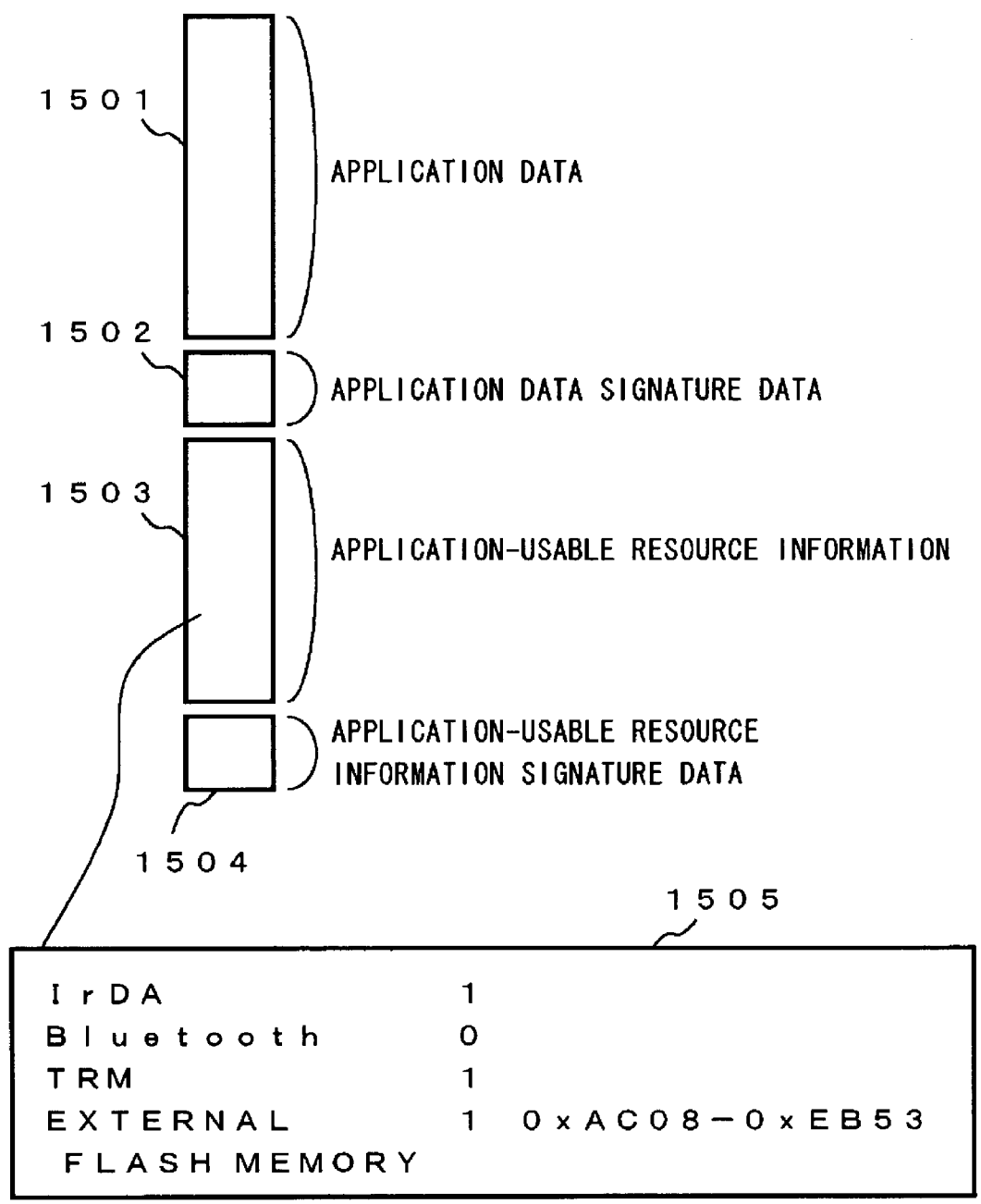
FIG. 15 is a view schematically showing a state where the application-usable resource information is downloaded with an application.

FIG. 15 is the view schematically showing data where the application-usable resource information is downloaded together with the application. Firstly, there exists application data 1501 that is the application main body followed by application data signature data 1502 that is a signature for authenticating the application data 1501, and there further exist application-usable resource information 1503 and application-usable resource information signature data 1504 for authenticating the application-usable resource information. In the application-usable resource information 1503, an expression such as 'IrDA 1' (IrDA is usable) and 'Bluetooth 0' (Bluetooth is not usable) is shown like an area added with reference numeral 1505.

Further, the application-usable resource information is stored in the authentication module 101, read out if necessary, and may be held in the application-usable resource information holding means 1301.

As described above, with a configuration in which the TRM access library section 401 has the application-usable resource information holding means 1301, the downloaded application can restrict usable resources. Accordingly, a user can conduct business in which he/she issues the application-usable resource information to a producer of the application or a service provider to receive a counter value. The application-usable resource information can be used for approval control of the local resource, and approval/disapproval of the use of the local resource can be finely set for a particular application. In the case of approving the use of local resources, business transaction by issuing the application-usable resource information is made possible when the user pays use fees to an issuer of the application-usable resource information. Furthermore, the user of the terminal 100, by paying the counter value, can obtain the application-usable resource information of the downloaded application, which is less restricted for the use of the resource, and thus business transaction where the user of the terminal 100 is a customer can be realized.

Note that, in the second to fifth embodiment, the download section 102 may download a use license. The 'use license' is the application-usable resource information added with the signature of a downloaded application. The 'downloaded application' is the application downloaded to the download section 102. The 'application-usable resource information added with the signature' is the application-usable resource information to which the signature of the application-usable resource information has been added. Since the application-usable resource information is a license for the downloaded application to use the resources of the terminal 100 or the authentication module 101, it is important to guarantee authenticity of the application-usable resource information. For this reason, the signature is added to the application-usable resource information.

Note that verification of the signature of the downloaded application and verification of the signature of the application-usable resource information may be performed either simultaneously or at different occasions. For example, if the application is verified first, verification of the signature of the application-usable resource information is performed to confirm that the signature is authentic when the application has started operation and accessed to the resources, and whether or not access to the resource is approved may be determined. In addition, creators of the signature of the downloaded application and the signature of the application-usable resource information may be the same or different. The reason why the creators of the signatures may be different is that there are cases where the creator of the application, and the issuer of the application-usable resource information are different and the former applies to the latter for approval of the use of the resources and receives issuance of the application-usable resource information from the latter. Note that the counter value may be paid at the time of application for approval of the use of the resources.

Furthermore, in the case where the application-usable resource information of the use license includes expiry date information showing a time limit for accessing to the resources, the download section 102 downloads the use license and may update the use license when time information approved based, on the expiry date information, has already expired.

Still further, the use license may be downloaded at the time of executing the downloaded application and/or authenticating the application. The use license may be downloaded from the server with which the terminal 100 can communicate. It may be downloaded from the authentication module 101 as well.

Although it is possible that the download section 102 continues to hold the use license downloaded from the server, there are cases in which the use license has been updated in the server and thus the use license held in the download section 102 may have expired. Therefore, the download section 102 may inquire to the server of the validity of the downloaded use license at the time of executing the downloaded application and/or authenticating the application.

In the download section 102, the download section 102 or another section of the terminal 100 inquires to the server of the contents of the use license (via on-line), and it may inquire whether or not the use of the resource of the application has been approved.

Sixth Embodiment

Figure 16:
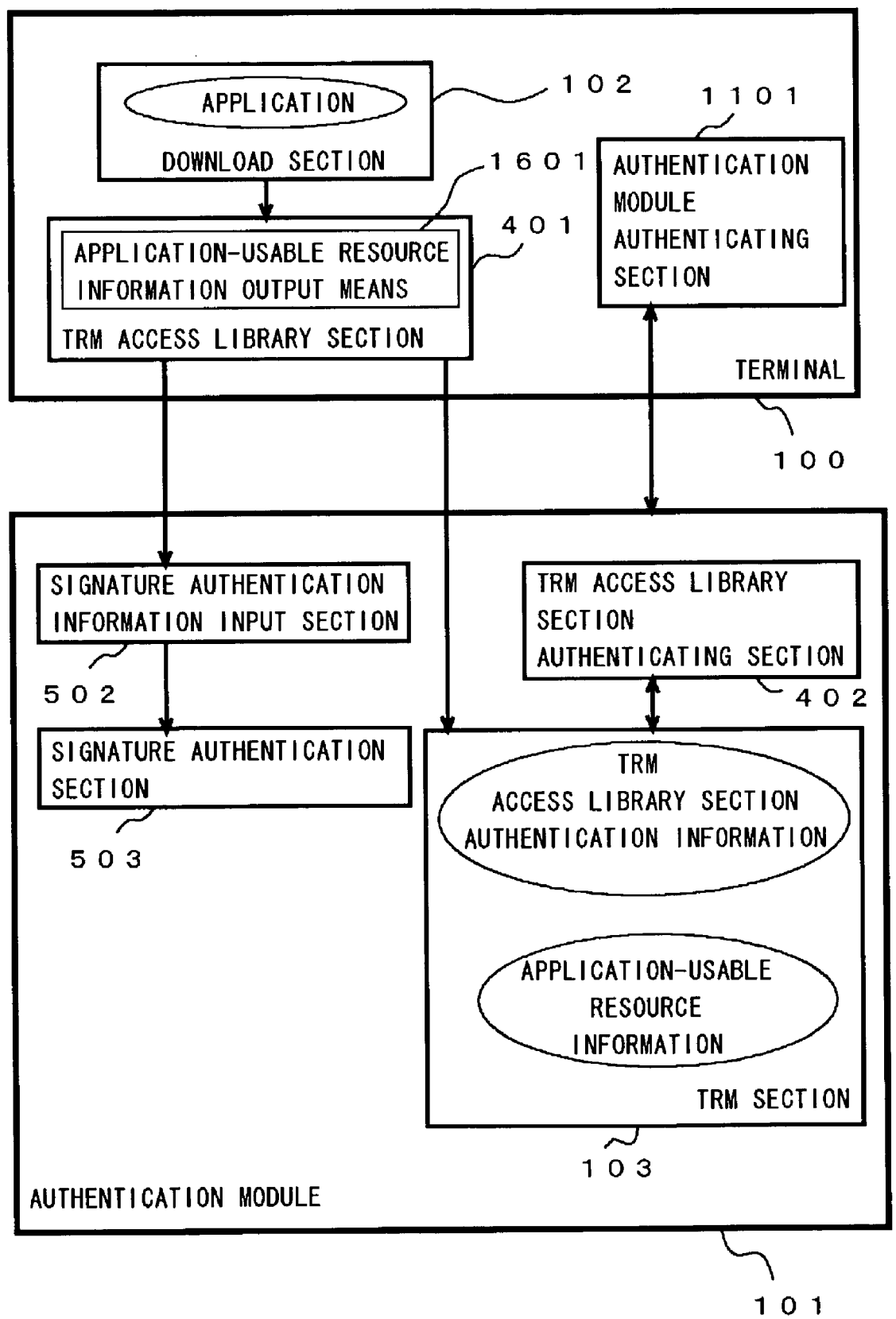
FIG. 16 is a function block diagram of the application authentication system in the sixth embodiment of the present invention.

FIG. 16 shows the function block diagram of the application authentication system in the sixth embodiment of the present invention. In this embodiment, the TRM access library section 401 of the terminal 100 of the application authentication system in the fourth embodiment or the fifth embodiment further has application-usable resource information output means 1601.

The application-usable resource information output means 1601 outputs the application-usable resource information to the authentication module 101 that has been authenticated by the authentication module authenticating section 1101.

In this embodiment, the TRM section 103 of the authentication module 101 holds the application-usable resource information, which has been output from the application-usable resource information output means 1601, in the tamper-resistant region in a rewritable manner.

The application-usable resource information held in the tamper-resistant region is read into the terminal 100 if necessary, and referred to in order to determine whether or not resources are usable when the application downloaded to the download section 102 uses the resources.

As described above, the TRM access library section 401 has the application-usable resource information output means 1601 and the TRM section 103 holds the application-usable resource information output from the application-usable resource information output means 1601, by which the application-usable resource information can be rewritten, if necessary, even after the application-usable resource information has been provided in the state where it is held in the authentication module 101. For example, rewriting of the expiry date of the application-usable resource information can be done. Further, by payment of the counter value from the service provider or the service user, the application-usable resource information held in the tamper-resistant region can be updated to one, which is less restricted for the usable resource of the application, for example. Because the TRM access library section 401, which has been authenticated by the signature authentication information input section 502 in advance, performs rewriting, invalid rewriting can be prevented.

Seventh Embodiment

Figure 17:
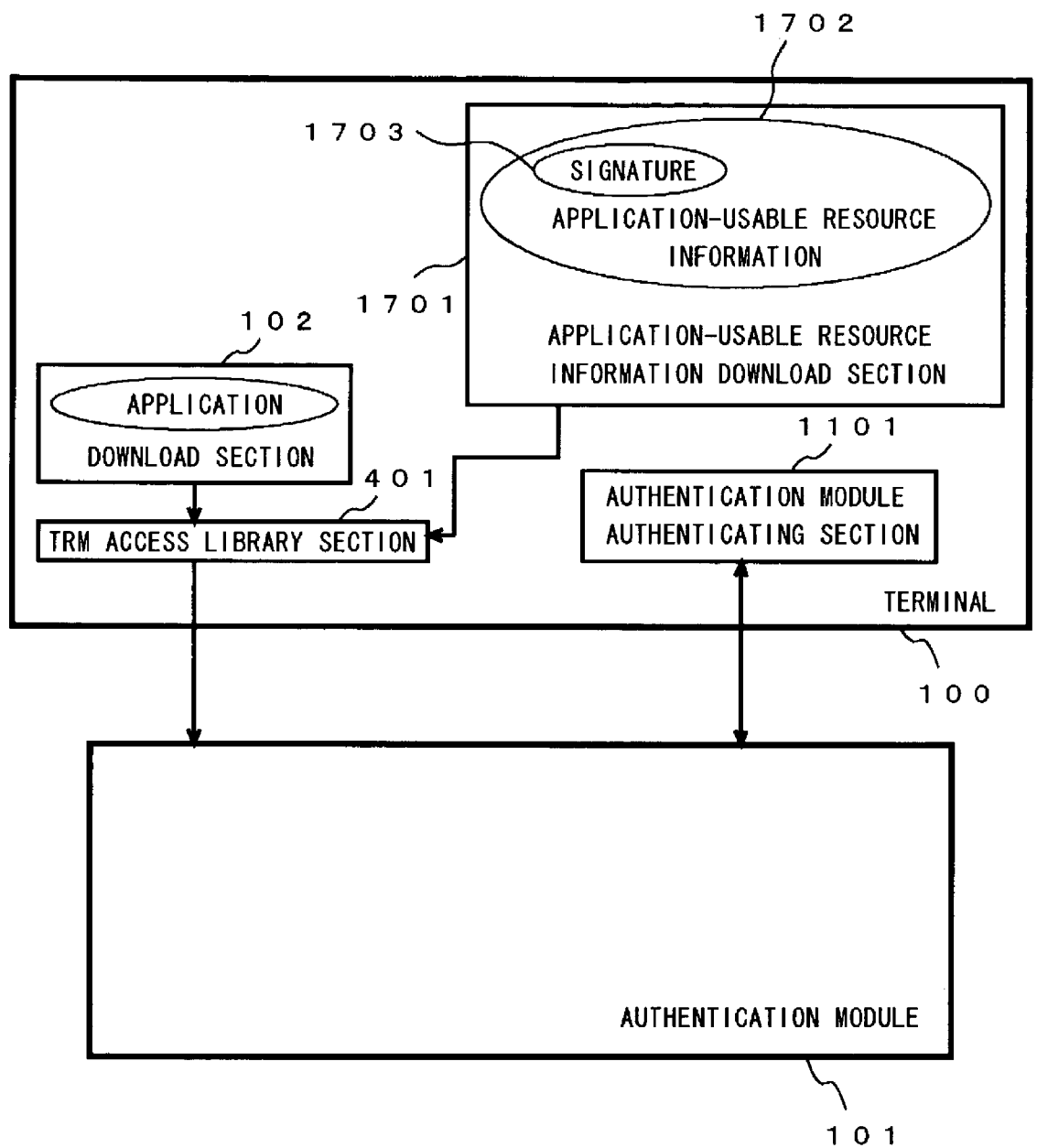
FIG. 17 is a function block diagram of the application authentication system in the seventh embodiment of the present invention.

FIG. 17 shows the function block diagram of the application authentication system in the seventh embodiment of the present invention. In this embodiment, the terminal 100 of the application authentication system in the fifth embodiment or the sixth embodiment further has an application-usable resource information download section 1701.

The application-usable resource information download section 1701 downloads application-usable resource information 1702 added with a signature 1703. This information may be downloaded together with the application downloaded to the download section 102 as shown in FIG. 15. On the other hand, it may be downloaded in addition to the application downloaded to the download section 102. For example, the application is previously downloaded, and the application-usable resource information 1702 may be downloaded when the application makes access to the resource.

In this embodiment, the TRM access library section 401 may authenticate the signature 1703 added to the application-usable resource information 1702 that has been downloaded to the application-usable resource information download section 1701. Since the authentication module 101 authenticates the TRM access library section 401, a result that the TRM access library section 401 has correctly authenticated the signature 1703 of the application-usable resource information 1702 is trustworthy for the authentication module 101. Therefore, it is guaranteed that an invalid operation does not occur even if the downloaded application accesses to the authentication module 101 according to the application-usable resource information 1702 authenticated in this manner.

Eighth Embodiment

Figure 18:
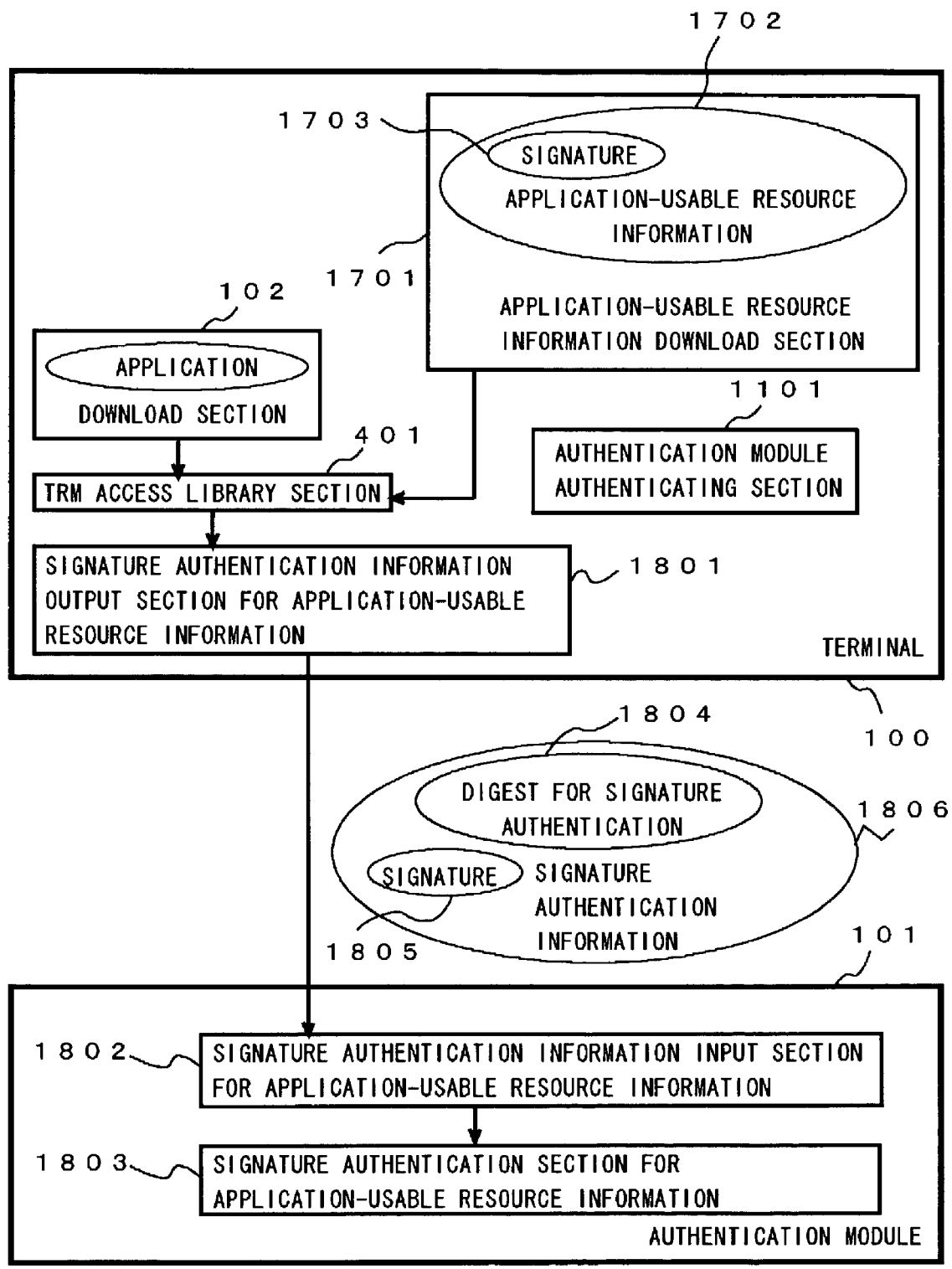
FIG. 18 is a function block diagram of the application authentication system in the eighth embodiment of the present invention.

FIG. 18 shows the function block diagram of the application authentication system in the eighth embodiment of the present invention. In this embodiment, the terminal 100 of the application authentication system in the fifth embodiment or the sixth embodiment has the application-usable resource information download section 1701 and a signature authentication information output section for application-usable resource information 1801, and the authentication module 101 has a signature authentication information input section for application-usable resource information 1802 and a signature authentication section for application-usable resource information 1803. This embodiment is a mode in which the authentication module 101 authenticates the signature 1703 instead of the seventh embodiment where the TRM access library section 401 authenticates the signature 1703 added to the application-usable resource information 1702.

The application-usable resource information download section 1701 downloads the application-usable resource information 1702 added with the signature 1703.

In this embodiment, the TRM access library section 401 generates the digest for signature authentication from the application-usable resource information 1702 that has been downloaded to the application-usable resource information download section 1701, and the signature authentication information output section for application-usable resource information 1801 outputs signature authentication information 1806, which includes the digest for signature authentication generated and the signature 1703, to the authentication module 101.

The signature authentication information input section for application-usable resource information 1802 enters the signature authentication information 1806 that has been output from the signature authentication information output section for application-usable resource information 1801. The signature authentication information 1806 includes a digest for signature authentication 1804 generated in the TRM access library section 401 and a signature 1805 that is the signature 1703 added to the application-usable resource information 1702.

The signature authentication section for application-usable resource information 1803 performs verification for the signature based on the digest for signature authentication 1804 and the signature 1805, which are entered from the signature authentication information input section for application-usable resource information 1802.

Figure 19:
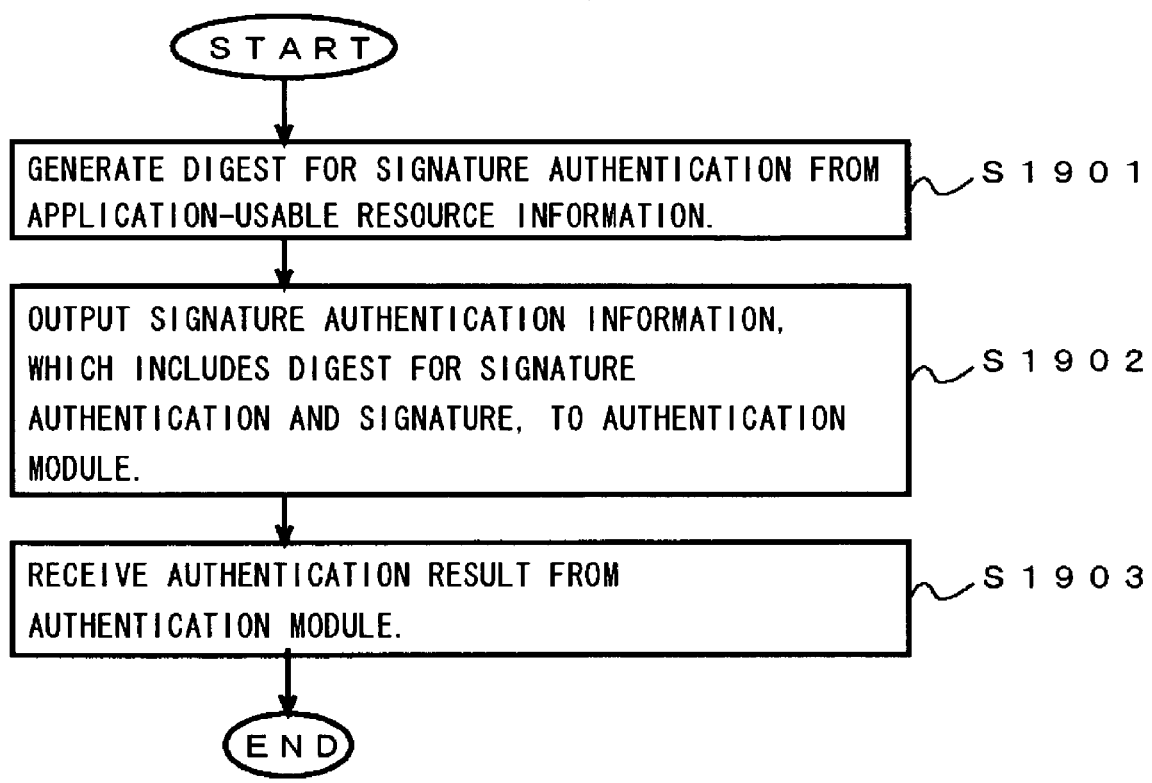
FIG. 19 is a flowchart explaining an operation of the terminal in the eighth embodiment of the present invention.

FIG. 19 is the flowchart explaining the operation of the terminal 100 in this embodiment. In step S1901, the TRM access library section 401 generates the digest for signature authentication 1804 from the application-usable resource information 1702. In step S1902, the signature authentication information output section for application-usable resource information 1801 outputs the signature authentication information 1806, which includes the digest for signature authentication 1804 and the signature 1805, to the authentication module 101. In step S1903, the terminal receives the authentication result from the authentication module 101.

Figure 20:
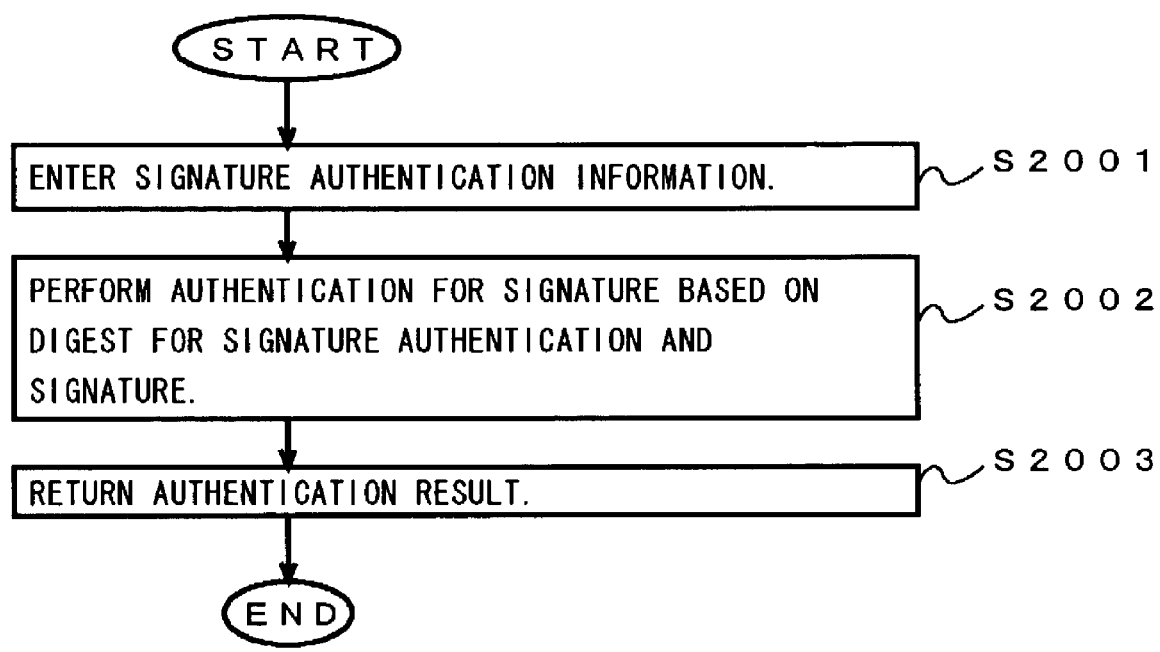
FIG. 20 is a flowchart explaining an operation of the authentication module in the eighth embodiment of the present invention.

FIG. 20 is the flowchart explaining the operation of the authentication module 101 in this embodiment. In step S2001, the signature authentication information input section for application-usable resource information 1802 enters the signature authentication information 1806. In step S2002, the signature authentication section for application-usable resource information 1803 performs verification of the signature 1805 based on the digest for signature authentication 1804 and the signature 1805. In step S2003, the module returns a verification result to the terminal 100.

In the above-described embodiment, since the signature of the application-usable resource information 1702 is authenticated based on the digest for signature authentication generated by the TRM access library section 401 that has been authenticated by the authentication module 101, the authentication result is trustworthy. Further, since it is possible that authentication in the signature authentication section for application-usable resource information 1803 is performed, not based on encryption but by determining whether or not a signature matches the signature stored in the TRM section of the authentication module 101, authentication can be performed with a simple task.

Ninth Embodiment

The ninth embodiment of the present invention is characterized in an in-authentication-module application, which operates in the authentication module 101, accepts access from the application operating in the terminal 100 on condition that the TRM access library section 401 has been authenticated by the authentication module 101.

Figure 21:
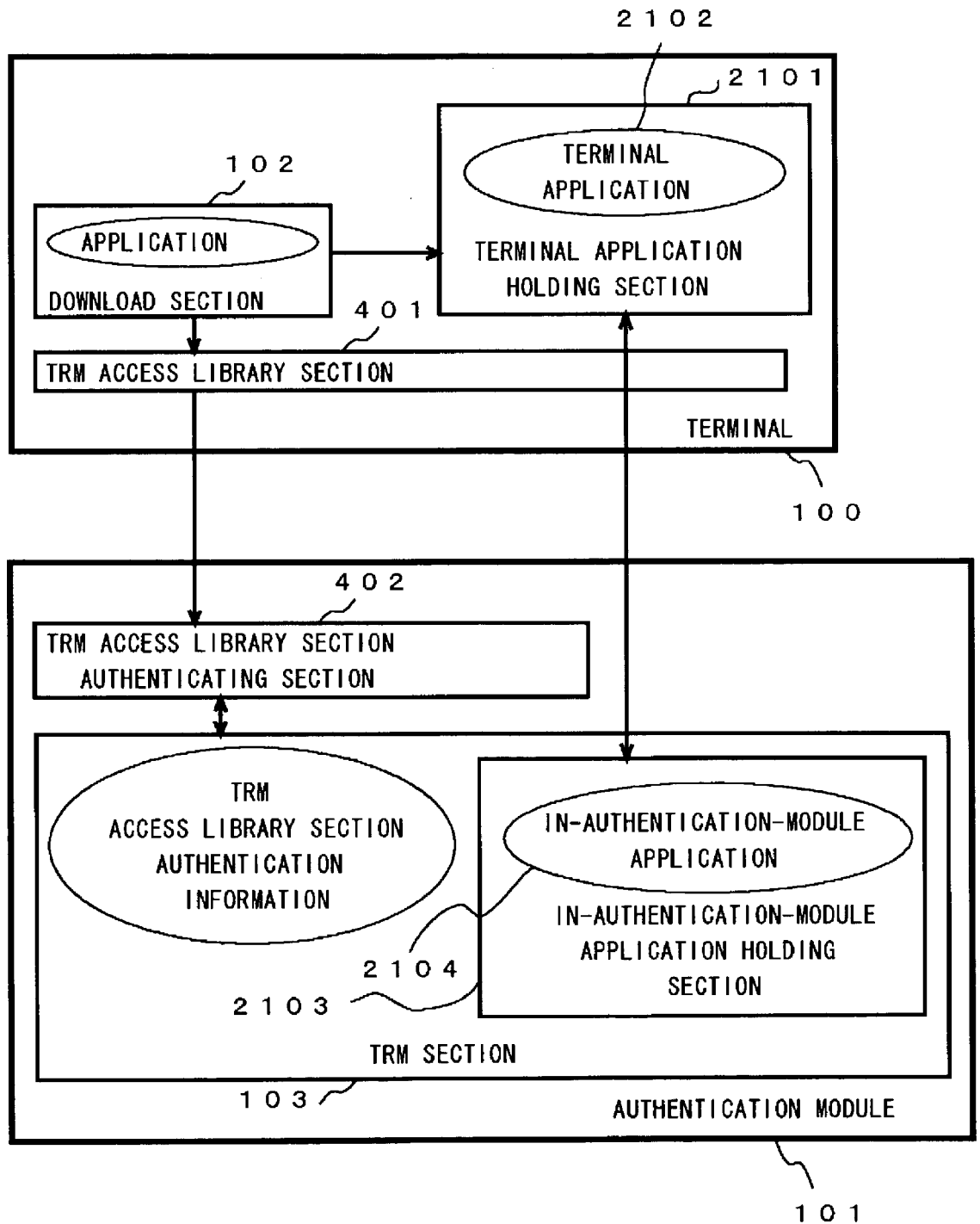
FIG. 21 is a function block diagram of the application authentication system in the ninth embodiment of the present invention.

FIG. 21 shows the function block diagram of the application authentication system in this embodiment. In this embodiment, the terminal 100 of the application authentication system in the second embodiment and the third embodiment has a terminal application holding section 2101, and the authentication module 101 has the TRM section 103 provided with an in-authentication-module application holding section 2103.

The terminal application holding section 2101 holds a terminal application 2102 that accesses the TRM section of the authentication module 101. The 'terminal application 2102' is an application executed inside the terminal 100. The application may be the application downloaded by the download section 102, or may be the application held in the ROM of the terminal 100. To 'hold' means to make the terminal application 2102 executable. Therefore, the terminal application holding section 2101 is realized by a rewritable memory region of the terminal 100, where all or a part of the terminal application 2102 is loaded, to execute the terminal application 2102.

The in-authentication-module application holding section 2103 holds an in-authentication-module application 2104. The 'in-authentication-module application 2104' is an application that operates in the authentication module 101. If the authentication module 101 is an IC card, in-authentication-module application 2104 is the card application. To 'hold' means to make the in-authentication-module application 2104 executable. Therefore, the in-authentication-module application holding section 2103 is realized by a rewritable memory region of the authentication module 101, where all or a part of the in-authentication-module application 2104 is loaded, to execute the in-authentication-module application 2104.

Figure 22:
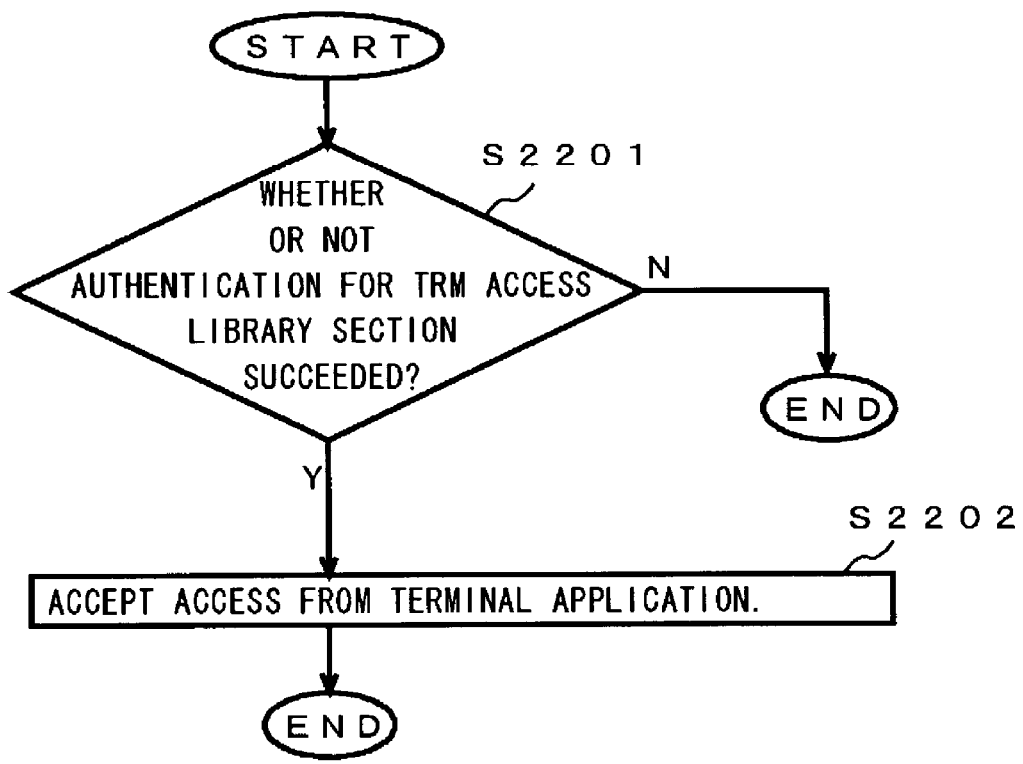
FIG. 22 is a flowchart explaining an operation of the authentication module in the ninth embodiment of the present invention.

In this embodiment, the in-authentication-module application 2104 operates on accepting access from the terminal application 2102 on condition that the TRM access library section authenticating section 402 authenticates the TRM access library section 401. For this reason, a value showing whether or not the TRM access library section 401 has been authenticated is stored in the authentication module 101, and, as shown in FIG. 22, the authentication module checks if the value itself or a similar value exists and determines whether or not authentication of the TRM access library section 401 has succeeded in step 2201. If authentication has succeeded, the processing proceeds to step S2202, and the application 2104 accepts access from the terminal application 2102. The determination in step S2201 is performed either in the in-authentication-module application 2104 or in a section other than the in-authentication-module application 2104. When it is performed in the in-authentication-module application 2104, determination is made by checking with the value, which shows whether or not the TRM access library section 401 has been authenticated, during the time when the in-authentication-module application 2104 is activated until the time when the terminal application 2102 accesses the application 2104. When the determination of step S2201 is performed in a section other than the in-authentication-module application 2104, the value showing whether or not the TRM access library section 401 has been authenticated is confirmed at the time when the in-authentication-module application 2104 is activated.

Since a card manager activates the in-authentication-module application 2104 when the authentication module 101 is an IC card, the card manager checks with the value, which shows whether or not the TRM access library section 401 has been authenticated, and determines if it activates the in-authentication-module application 2104. Furthermore, in deciding whether or not an interface section (not shown in FIG. 21) for the authentication module 101 approves access from the terminal application 2102 to the in-authentication-module application 2104, determination may be made by checking with the value, which shows whether or not the TRM access library section 401 has been authenticated.

Figure 23:
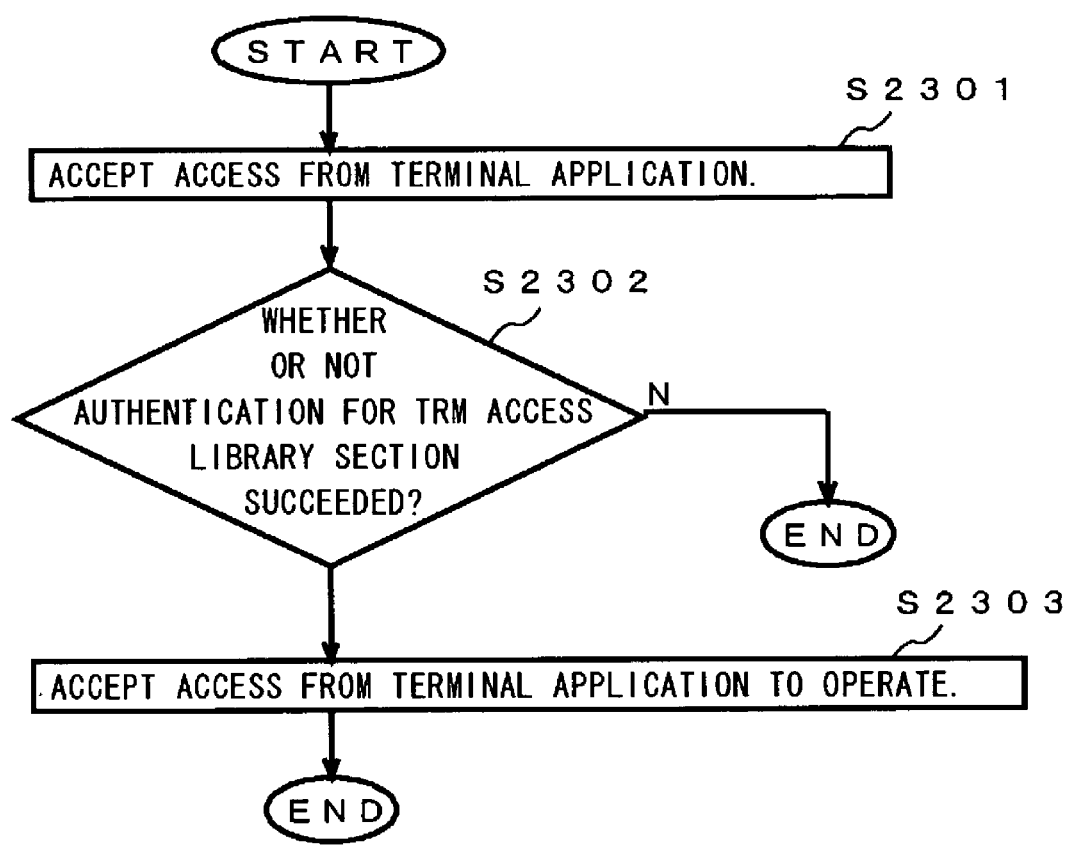
FIG. 23 is another flowchart explaining an operation of the authentication module in the ninth embodiment of the present invention.

Further, the in-authentication-module application 2104, every time it receives access from the terminal application 2102, checks with the value showing whether or not the TRM access library section 401 has been authenticated and may decide if it operates on accepting the access. FIG. 23 is the flowchart explaining the operation of the in-authentication-module application 2104 in such a case. In step S2301, the in-authentication-module application 2104 receives access from the terminal application 2102. In step S2302, the in-authentication-module application 2104 checks with the value showing whether or not the TRM access library section 401 has been authenticated and determines if authentication of the TRM access library section 401 has succeeded. If the authentication has succeeded, the application 2104 operates on accepting access from the terminal application 2102 in step S2303.

Figure 24:
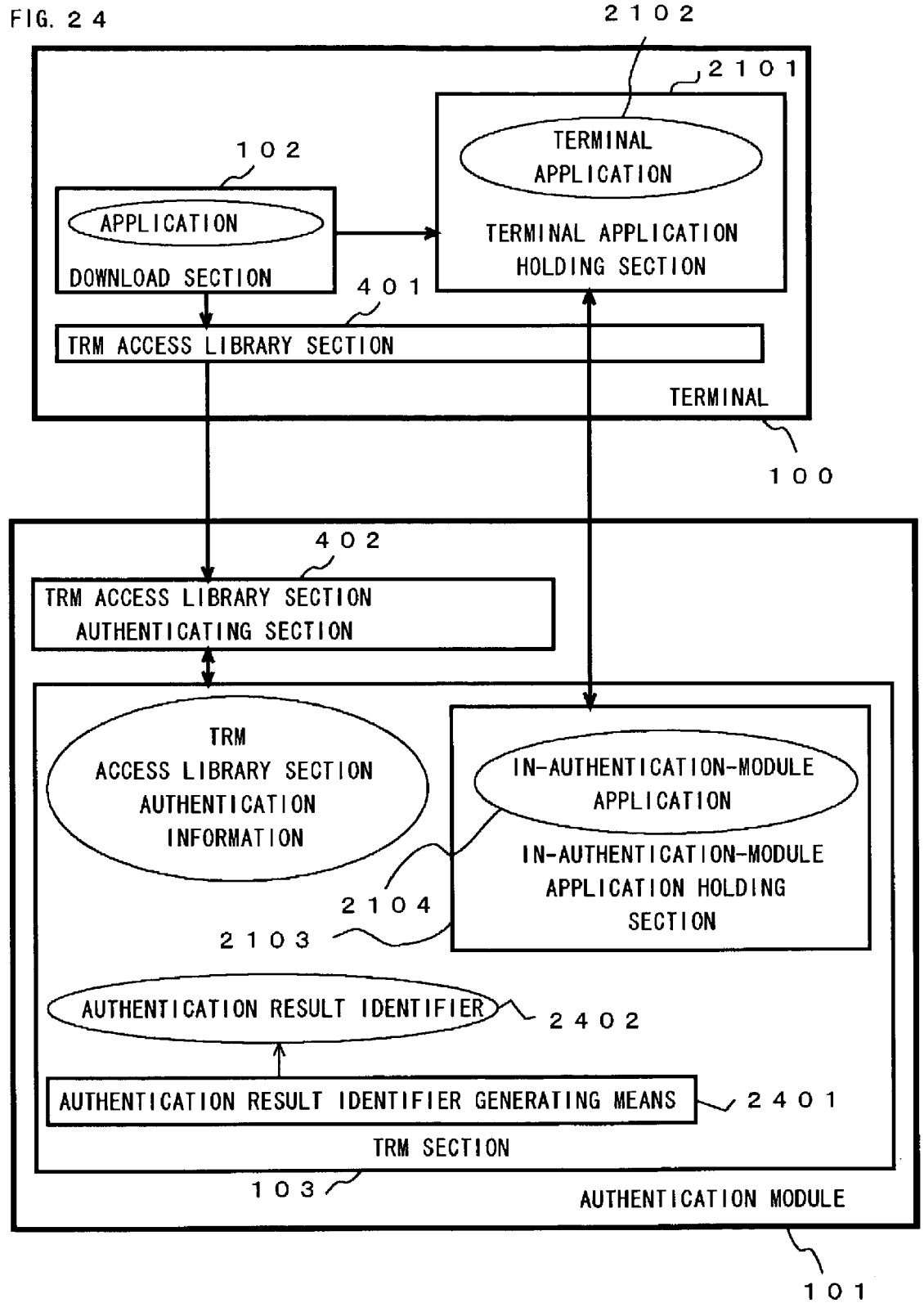
FIG. 24 is another function block diagram of the application authentication system in the ninth embodiment of the present invention.

FIG. 24 shows a mode where the value showing whether or not the TRM access library section 401 has been authenticated is stored in the TRM section 103. The TRM section 103 has authentication result identifier generating means 2401. The authentication result identifier generating means 2401 generates an authentication result identifier 2402 on condition that authentication of the TRM access library section 401 by the TRM access library section authenticating section 402 succeeds. The in-authentication-module application 2104 accepts access from the terminal application 2102 on condition that the authentication result identifier 2402 exists.

Note that the authentication result identifier 2402 does not only indicate authentication success of the TRM access library section 401 by the TRM access library section authenticating section 402, but also may have contents indicating authentication failure. In this case, the authentication result identifier generating means 2401 generates the authentication result identifier 2402 that has contents according to authentication success/failure of the TRM access library section 401 by the TRM access library section authenticating section 402. Further, the in-authentication-module application 2104 checks with the contents of the authentication result identifier 2402 and determines whether or not authentication has succeeded.

Figure 25:
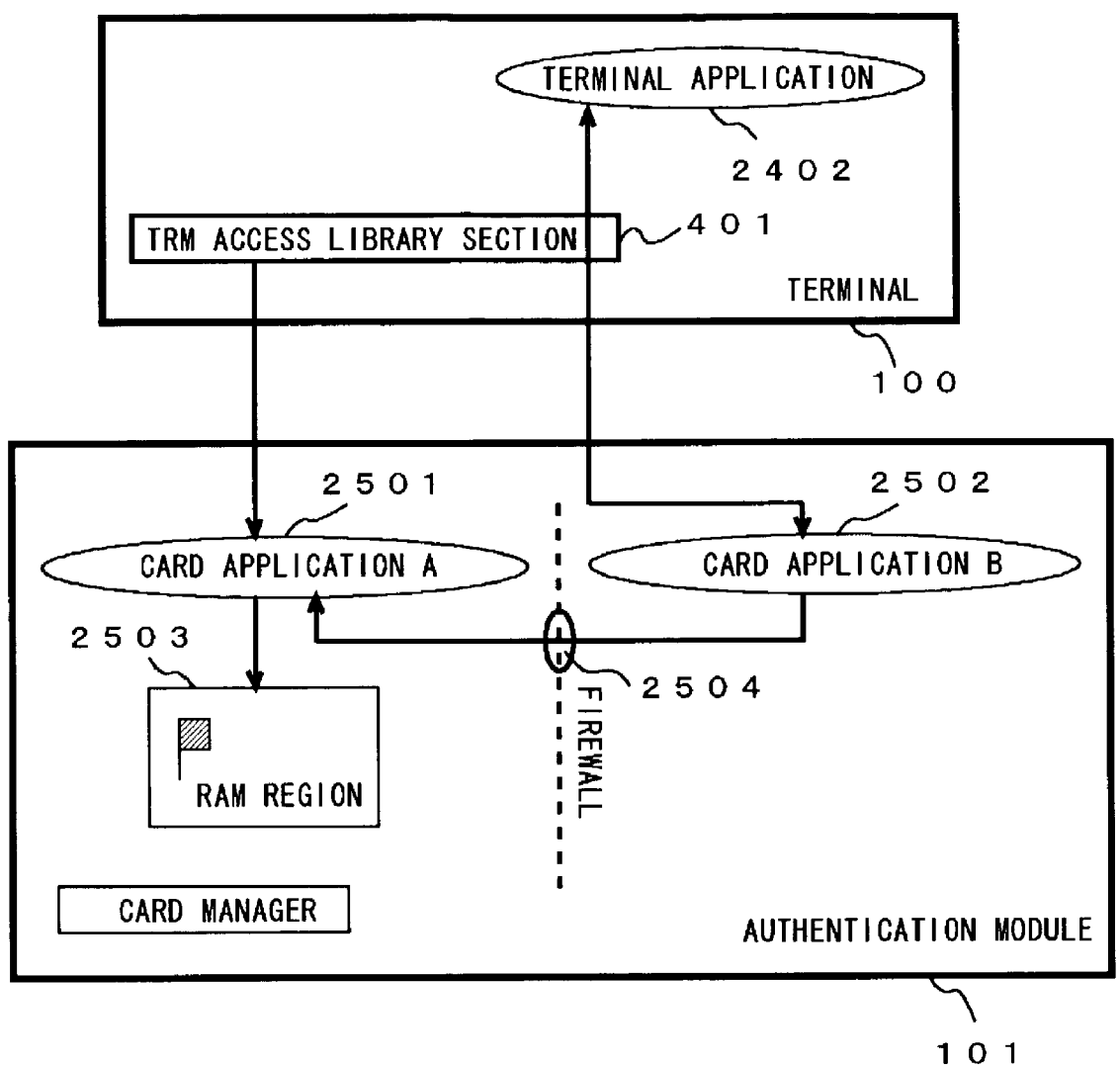
FIG. 25 is a view showing an example where the ninth embodiment of the present invention is realized in an IC card.

FIG. 25 shows a method of realizing the authentication result identifier 2402 when the authentication module 101 is an IC card. In FIG. 25, card application A (2501) authenticates the TRM access library section 401, and it sets the authentication result identifier 2402 in the rewritable memory region, which is a RAM region 2503 for example, when the TRM access library section 401 has been authenticated. In FIG. 25, a flag sign schematically expresses the authentication result identifier 2402. The card application A (2501) can read/write in the RAM region 2503, but another card application B (2502) cannot access to the RAM region 2503 directly due to a firewall function that activates each application independently, so that applications in the IC card do not adversely effect each other. Then, the card application A (2501), using a sharable interface function where the interface can be shared on specifying a destination, provides a sharable interface 2504. The card application B (2502), to which the terminal application 2402 has accessed, confirms whether or not the authentication result identifier 2402 exists in the RAM region 2503 through the sharable interface 2504.

Figure 26:
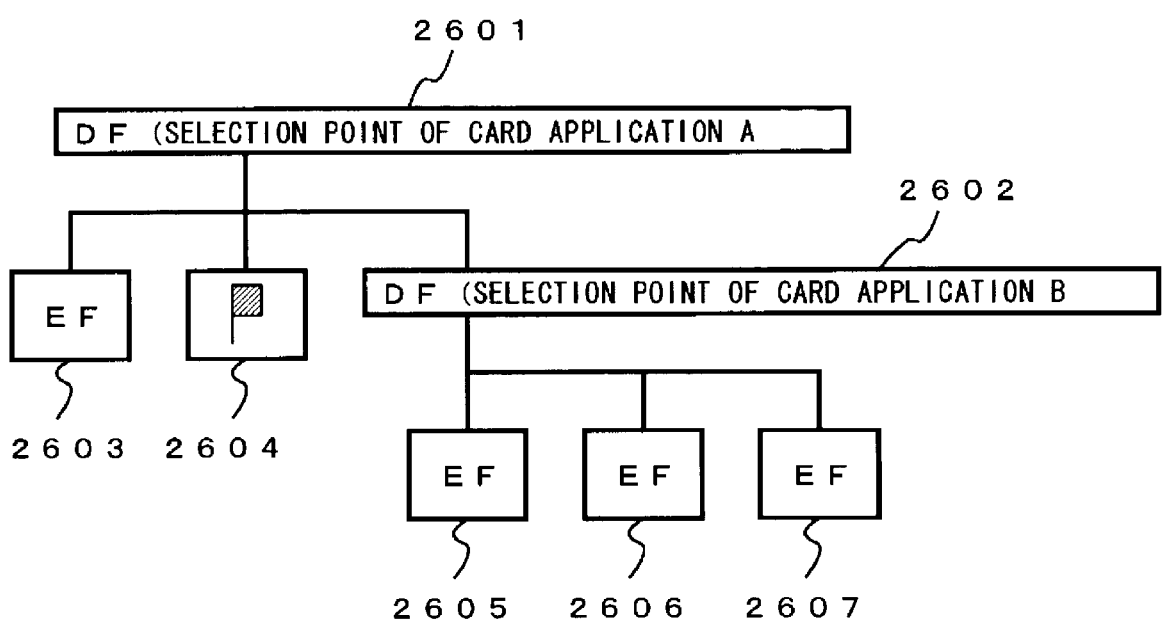
FIG. 26 is a view showing another example where the ninth embodiment of the present invention is realized in an IC card.

Further, FIG. 26 shows another method of realizing the authentication result identifier 2402 when the authentication module 101 is an IC card. Rectangles added with reference numerals 2601 and 2602 express dedicated files (DF). Each DF corresponds to each card application. Accordingly, when the DF is selected, the card application corresponding to the DF is activated. Hereinafter, DF with reference numeral 2601 and DF with reference numeral 2602 correspond to application A and application B, respectively. Rectangles added with reference numerals 2603, 2604, 2605, 2606 and 2607 express elementary files (EF). When a card application corresponding to DF is activated, EF directly under DF can be operated. For example, when DF with reference numeral 2601 is selected and card application A is activated, card application A becomes capable of accessing EF with reference numerals 2603 and 2604.

Hereinafter, it is presumed that the authentication result identifier 2402 is set to EF with reference numeral 2604 when card application A has performed authentication and has correctly authenticated the TRM access library section 401. When a security status of DF added with reference numeral 2601 includes a state of EF added with reference numeral 2604, selection of DF, which corresponds to offspring of DF added with reference numeral 2601 in a tree structure formed by DF and EF, can be controlled. Specifically, in the selection of DF with reference numeral 2602, setting is made on condition that the identifier in either one of the offspring of DF added with reference numeral 2601, which is EF added with reference numeral 2604, in this case, exists. In other words, since selection of DF corresponding to card application B can be controlled due to the authentication result of the TRM access library section 401 by card application A, card application B can be activated only when the TRM access library section 401 has been authenticated.

As a result of this embodiment, security of the authentication module 101 is maintained because the in-authentication-module application 2104 has never been accessed from the terminal application 2102 unless the TRM access library section 401 is authenticated by the authentication module 101.

Note that the in-authentication-module application holding section 2103 may be outside the TRM section 103. In this case, the in-authentication-module application 2104 checks whether or not the TRM access library section authenticating section 402 has authenticated the TRM access library section 401, and operates on accepting access from the terminal application 2102.

Tenth Embodiment

Figure 27:
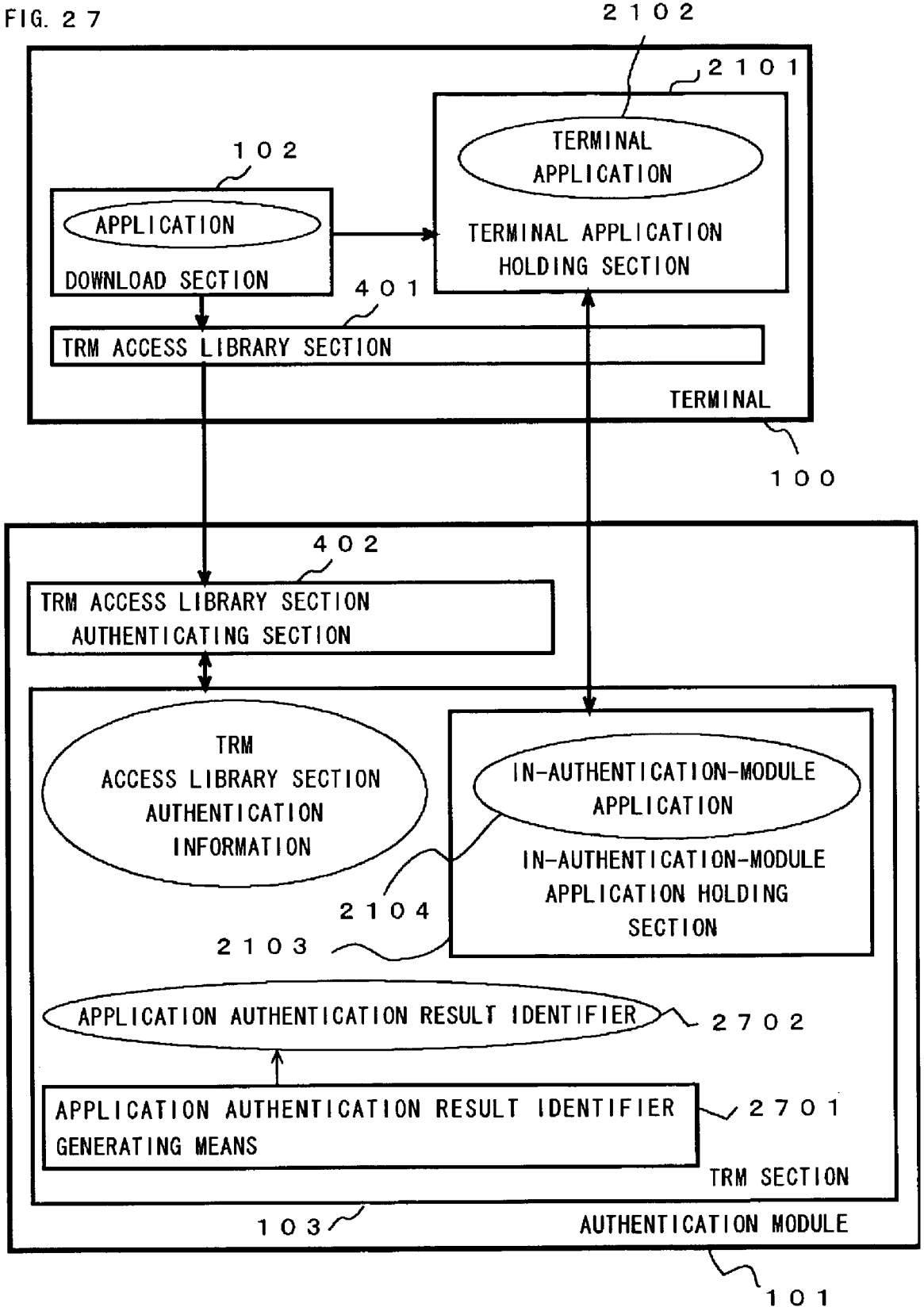
FIG. 27 is a function block diagram of the application authentication system in the tenth embodiment of the present invention.

FIG. 27 shows the function block diagram of the application authentication system in the tenth embodiment of the present invention. In the tenth embodiment of the present invention, in-authentication-module application 2104 operates on accepting access from the application operating in the terminal 100 on condition that the application has been authenticated. The application authentication system in this embodiment is a mode in which the TRM section 103 of the application authentication system in the ninth embodiment has application authentication result identifier generating means 2701.

The application authentication result identifier generating means 2701 generates an application authentication result identifier 2702 on condition that application authentication by the TRM access library section 401 has succeeded. Herein, the 'application' is the application downloaded to the download section 102. The 'application authentication by the TRM access library section 401' means authentication performed based on the signature added to the application and the digest for signature authentication.

In this embodiment, the in-authentication-module application 2104 enables the terminal application 2102 to access to the in-authentication-module application 2104 on condition that the application authentication result identifier 2702 showing success of authentication exists, and the in-authentication-module application 2104 accepts access from the terminal application 2102.

For example, in the case where the terminal application 2102 has already been operating first and the in-authentication-module application 2104 has not operated yet, the in-authentication-module application 2104 is activated only when the application authentication result identifier 2702 exists, in activating the in-authentication-module application 2104. Alternatively, in the case where both of the terminal application 2102 and the in-authentication-module application 2104 have been activated, when access has occurred from the terminal application 2102 to the in-authentication-module application 2104, it accepts the access only when the application authentication result identifier 2702 exists.

If only one terminal application that accesses to the in-authentication-module application 2104 operates in the terminal 100, one kind of the application authentication result identifier 2702 is enough. However, if a plurality of such terminal applications operate in the terminal 100, the application authentication result identifier generating means 2701 generates the application authentication result identifier 2702 for every terminal application in order to show which terminal application has been authenticated. Alternatively, when it is guaranteed that two or more terminal applications do not access to the in-authentication-module application 2104 simultaneously, only one kind of the application authentication result identifier 2701 is generated. Accordingly, the application authentication result identifier 2702 is generated only at the moment when the authenticated terminal application accesses to the in-authentication-module application 2104, and the application authentication result identifier 2702 may be deleted when access by the authenticated terminal application to the in-authentication-module application 2104 ends.

Due to this embodiment, only the terminal application 2102 that has been authenticated can access to the in-authentication-module application 2104, and thus the security of the authentication module 101 is assured.

Eleventh Embodiment

Figure 28:
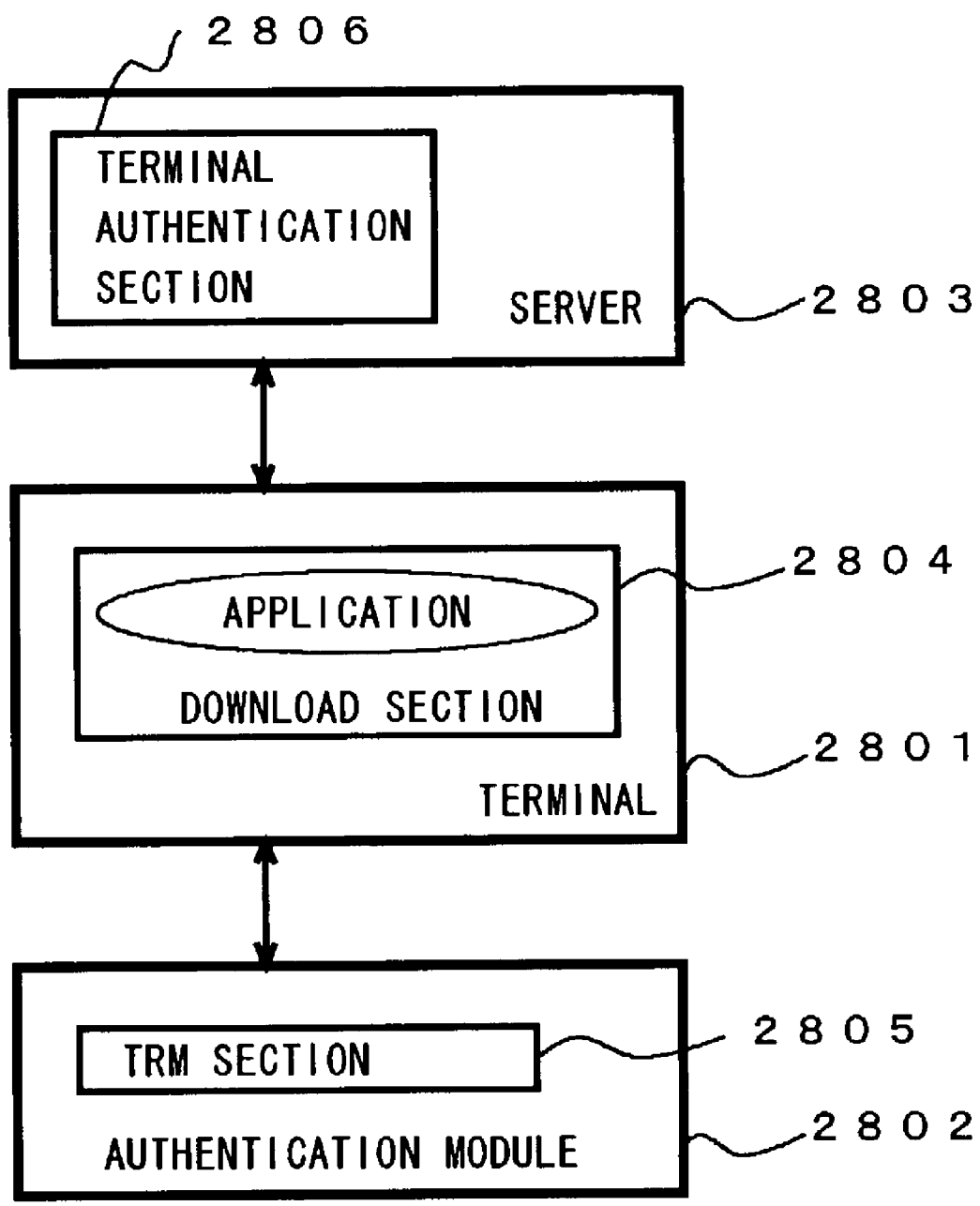
FIG. 28 is a function block diagram of the application authentication system in the eleventh embodiment of the present invention.

FIG. 28 shows the function block diagram of the application authentication system in the eleventh embodiment of the present invention. The application authentication system in this embodiment is comprised of the terminal, the authentication module, and the server that downloads the application to the terminal.

In FIG. 28, a terminal 2801 has a download section 2804. The download section 2804 is a section to download the application. For example, it downloads the application from a server 2803.

The authentication module 2802 has a TRM section 2805. The TRM section 2805 holds information for processing application authentication in the tamper-resistant region. Herein, the 'application' means the application downloaded to the download section 2804 of the terminal 2801. The 'application authentication' means to confirm that the application does not perform invalid operation such as whether or not the application has been issued by a credible person, has been guaranteed not to perform invalid operation, or has been tampered with after it was issued by the credible person or has been tampered with after it was guaranteed not to operate obliquely. As a method of processing the authentication, the hash function such as the SHA-1 and the MD5, where finding two different input data such that the resultant data obtained after processing the input data match is difficult, is generally used in order to find the resultant data obtained by processing the data for executing the application as input data, and the data encrypted (a so-called 'signature') is used. Therefore, the 'information for processing the application authentication' is the actual signature or the decryption key necessary for decrypting the signature to obtain the hash value. The 'tamper-resistant region' is a storage area of the authentication module 2802, which is a storage area whose data is difficult to read out or rewrite in an invalid manner. For example, to access to the storage area, the user must go through hardware that is not accessible unless the user takes the right procedure to access the storage area, or that the data stored in the storage area is encrypted.

The server 2803 has a terminal authentication section 2806. The terminal authentication section 2806 determines that authentication of the terminal 2801 has succeeded on condition that authentication for the authentication module 2802 via the terminal 2801 succeeds. Specifically, the server 2803 performs authentication for the authentication module 2802. During authentication, the server 2803 and the authentication module 2802 need to communicate with each other and the communication is performed by relaying the terminal 2801. As a method where the server 2803 performs authentication for the authentication module 2802, the server 2803 generates the random numbers, encrypts the random numbers by the public key of the authentication module 2802, and demands the authentication module 2802 via the terminal to decrypt the encrypted random numbers. The authentication module 2802 obtains the random numbers generated by the server 2803 through decryption using the private key, which is stored in the tamper-resistant region, of the authentication module 2802, and returns it to the server 2803 by relaying the terminal 2801. The server 2803 determines whether or not the generated random numbers and the random numbers sent from the authentication module 2802 are identical and performs authentication. Alternatively, there also exists a method where the server 2803 directly sends the random numbers to the authentication module 2802, the authentication module 2802 encrypts them by the private key to return the result to the server 2803, and the server 2803 decrypts the result by the public key of the authentication module 2802, and performs authentication for the authentication module 2802 by determining whether or not the decrypted random numbers are identical to the random numbers sent to the authentication module 2802.

Since the authentication module 2802 is attached to the terminal 2801, the terminal 2801 to which the authentication module 2802 has been attached is authenticated as well when the server 2803 authenticates the authentication module 2802. Additionally, authentication is further assured when the authentication module 2802 authenticates the terminal 2801 on condition that unique information, which the terminal 2801 has, such as a production number of the terminal 2801, an identifier showing a unit type, an identifier stored in the ROM of the terminal 2801, and a version number, exists in tamper-resistant region.

This enables the server 2803 to perform authentication for the terminal 2801 even without the tamper-resistant region in the terminal 2801, and the server can correctly authenticate the terminal 2801. Thus, an accounting processing, a settlement processing or the like can be performed between the server 2803 and the terminal 2801. Furthermore, the server 2803 can download the application including highly confidential data to the terminal 2801, and thus the application authentication system in this embodiment can execute a complicated business transaction operation.

Twelfth Embodiment

Figure 29:
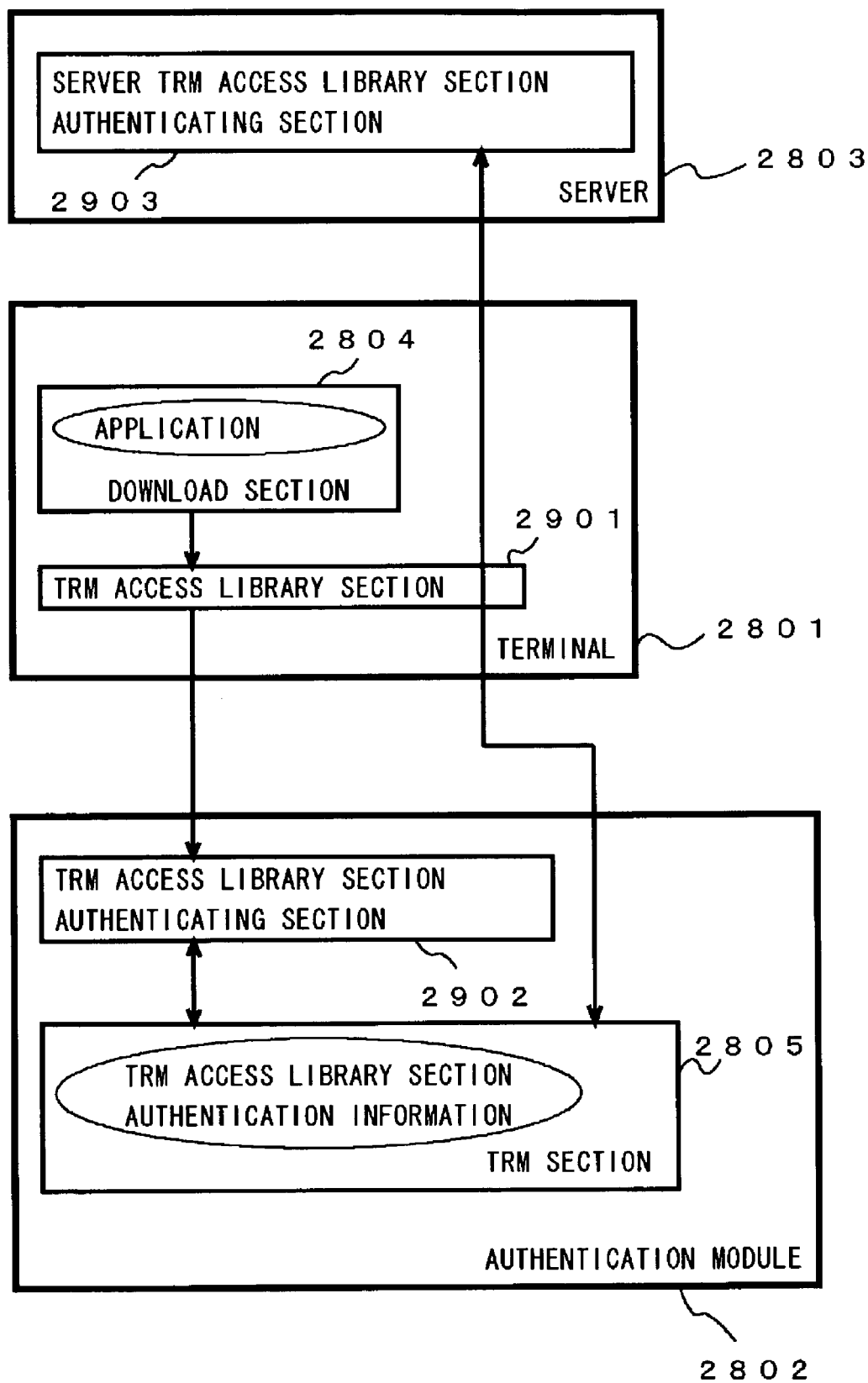
FIG. 29 is a function block diagram of the application authentication system in the twelfth embodiment of the present invention.

FIG. 29 shows the function block diagram of the application authentication system according to the twelfth embodiment of the present invention. In this embodiment, the application authentication system is comprised of the terminal 2801, authentication module 2802, and the server 2803 that downloads the application to the terminal 2801, as shown in the eleventh embodiment.

The terminal 2801 has the download section 2804 and a TRM access library section 2901. The download section 2804 downloads the application. In this case, the application is downloaded from the server 2803. Alternatively, it may be downloaded from a section other than the server 2803. The TRM access library section 2901 performs processing for application authentication on condition that the authentication module 2802 authenticates the section 2901 itself. Specifically, the TRM access library section 2901 makes the authentication module 2802 authenticate the section 2901 itself, and when it is authenticated correctly, it performs processing for authenticating the application downloaded to the download section 2804. As a method that the TRM access library section 2901 makes the authentication module 2802 authenticate the section 2901 itself, there exists a method where information unique to the terminal 2801 such as a production number, an identifier showing a terminal type, or a serial number or a version number of software, which realize the TRM access library section 2901, for example, is output to the authentication module 2802 to check whether or not the unique information of the terminal 2801, the serial number, the version number or the like, which has been output to the tamper-resistant region, exists.

The authentication module 2802 has the TRM section 2805 and a TRM access library section authenticating section 2902. The TRM section 2805 holds the TRM access library section authentication information, which is information for authenticating the TRM access library section 2901, in the tamper-resistant region. As the 'TRM access library section authentication information', the information unique to the terminal 2801 such as the production number, the identifier showing the terminal type, or the serial number or the version number of software, which realize the TRM access library section 2901, for example, is cited as described above. The TRM access library section authenticating section 2902 authenticates the TRM access library section 2901 of the terminal 2801 based on the TRM access library section authenticating section information. As a method of the authentication, there exists a method where the TRM access library section authenticating section 2902 receives identification information such as the information unique to the terminal 2801 that has been output from the TRM access library section 2901, or the serial number and the version number in the TRM access library section 2901, and checks whether or not the identification information exists in the TRM section 2805, as described above. The result of authentication is output from the TRM access library section authenticating section 2902 to the TRM access library section 2901. Further, the result of authentication is held in the authentication module 2802, and referred to in the case of exchanging information with the terminal 2801 later. Then, the authentication module 2802 exchanges correct information when the TRM access library section 2901 has been correctly authenticated, or exchanges incorrect information if the section 2901 has not been correctly authenticated.

The server 2803 has a server TRM access library section authenticating section 2903. The server TRM access library section authenticating section 2903 determines that authentication for the TRM access library section 2901 has succeeded on condition that authentication of the TRM section 2805 in the authentication module 2802 via the TRM access library section 2901 of the terminal 2801 succeeds. The following is a method that the server TRM access library section authenticating section 2903 performs authentication for the TRM section 2805 in the authentication module 2802 via the TRM access library section 2901 of the terminal 2801. Specifically, the server 2803 generates random numbers, encrypts the random numbers by the public key of the authentication module 3802, and demands the authentication module 2802 via the terminal 2801 to decrypt the encrypted random numbers. The authentication module 2802 decrypts the random numbers using its private key stored in the tamper-resistant region, and returns them to the server 2803 via the terminal 2801. The server 2803 determines whether or not the random numbers generated and the random numbers sent from the authentication module 2802 are identical to perform authentication. Alternatively, there also exists a method that the server 2803 sends the random numbers directly to the authentication module 2802, the authentication module 2802 encrypts them by its private key to return the result to the server 2803, the server 2803 decrypts it by the public key of the authentication module 2802, and authenticates the authentication module 2802 by determining whether or not the decrypted numbers are identical to the random numbers sent to the authentication module 2802.

Figure 30:
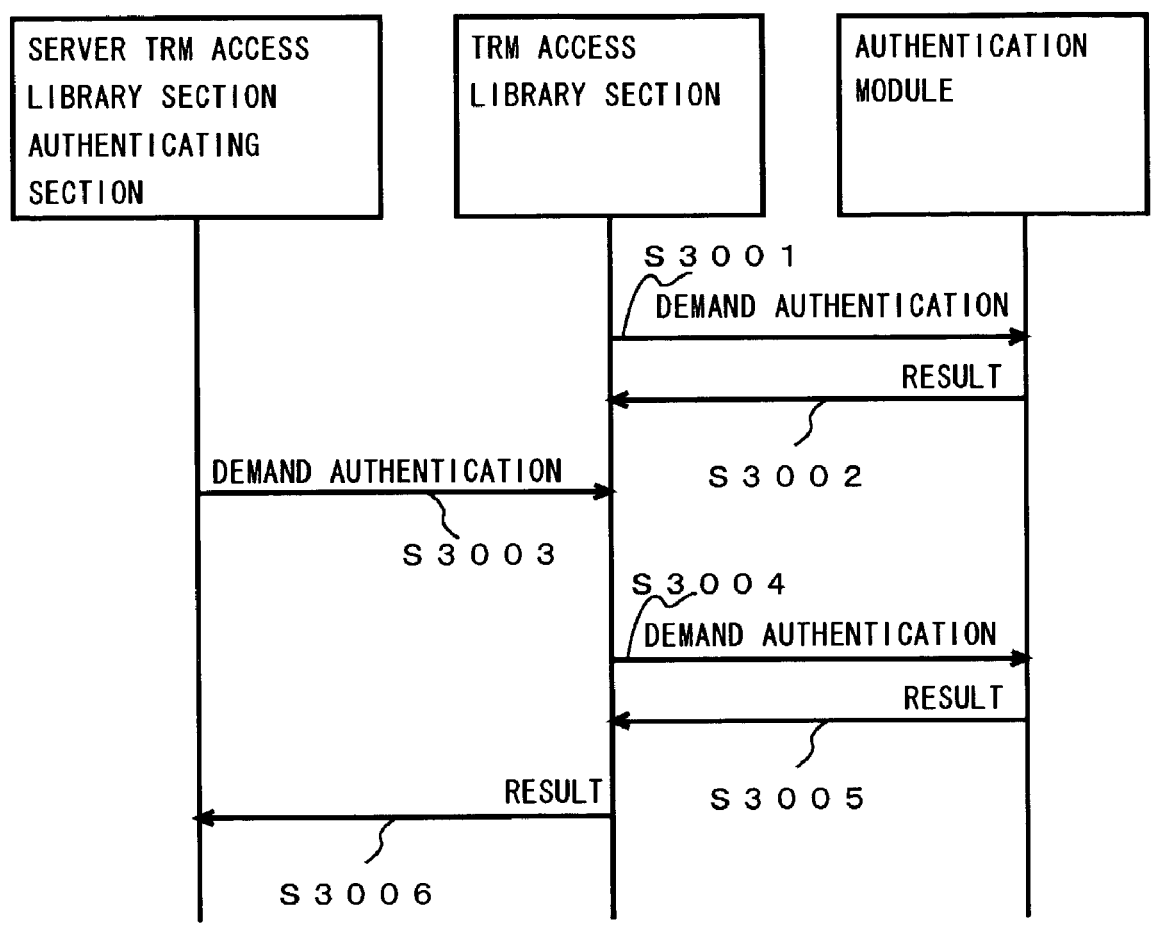
FIG. 30 is a sequential diagram explaining an operation of the application authentication system in the twelfth embodiment of the present invention.

FIG. 30 is the sequence diagram explaining the interaction among the server TRM access library section authenticating section 2903, the TRM access library section 2901, and the authentication module 2802. In step S3001, the TRM access library section 2901 outputs a demand to authenticate itself to the authentication module 2802, and an authentication result in the authentication module 2802 is output in step S3002. In step S3003, the server TRM access library section authenticating section 2903 outputs an authentication demand to the TRM access library section 2901, and in response to this, the TRM access library section 2901 outputs the authentication demand to the authentication module 2802 in step S3004, and the authentication module 2802 returns the result such that the module itself is authenticated by the server TRM access library section authenticating section 2903, in step S3005. At this point, it returns either a correct result or an incorrect result depending on whether or not the TRM access library section 2901 has been authenticated correctly. In step S3006, the TRM access library section 2901 returns the result output from the authentication module 2802 to the server TRM access library section authenticating section 2903. The server TRM access library section authenticating section 2903 checks with the result, and determines that the TRM access library section 2901 has been authenticated as well when it can authenticate the authentication module 2802.

As described above, the result of authentication for the TRM access library section 2901 by the server TRM access library section authenticating section 2903 is held inside the authentication module 2802, and the authentication module 2802 either performs or does not perform exchange of the correct information according to the authentication result. Therefore, when the server 2803 performs authentication for the TRM section in the authentication module 2802 via the TRM access library section 2901, and if it can correctly authenticate it, it may be determined that authentication for the TRM access library section 2901 has succeeded.

With this procedure, the server 2803 can perform authentication for the terminal 2801 even if the terminal 2801 does not have the tamper-resistant region, the server 2803 can correctly authenticate the terminal 2801, and thus an accounting processing, a settlement processing or the like can be performed between the server 2803 and the terminal 2801. Furthermore, the server 2803 can download the application including highly confidential data to the terminal 2801, and thus the application authentication system in this embodiment can execute a complicated business transaction operation.

Further, when the TRM access library section authenticating section 2902 authenticates the TRM access library section 2901, the authentication module 2802 determines that the TRM access library section 2901 is trustworthy. Thus, when the TRM access library section 2901 performs all or a part of authentication processing of the application downloaded to the download section 2804, the result of all or a part of authentication processing of the application performed by the TRM access library section 2901 is trustworthy for the authentication module 2802. Therefore, the authentication module 2802 can perform authentication for the application downloaded to the download section 2804 by using the result of all or a part of authentication processing of the application by the TRM access library section 2901. As a result, access to data inside the authentication module 2802 can be permitted to the application that has been correctly authenticated, and a complicated business transaction can be performed.

Note that the processing for application authentication by the TRM access library section 2901 may be performed on condition that the application has accessed the tamper-resistant region of the TRM section 2805 in the authentication module 2802. This eliminates a need to perform authentication for an application that does not access to the tamper-resistant region.

Further, the TRM access library section 2901 may perform the processing for application authentication on condition that the application has been downloaded to the download section 2804. With this processing, authentication for all downloaded applications is performed and there will be no possibility that the terminal 2801 executes an invalid application.

Still further, the TRM access library section 2901 may perform the processing for application authentication while using the start of application execution as a trigger. This makes it possible to omit authentication for an application that has been downloaded but not been executed.

Thirteenth Embodiment

Figure 31:
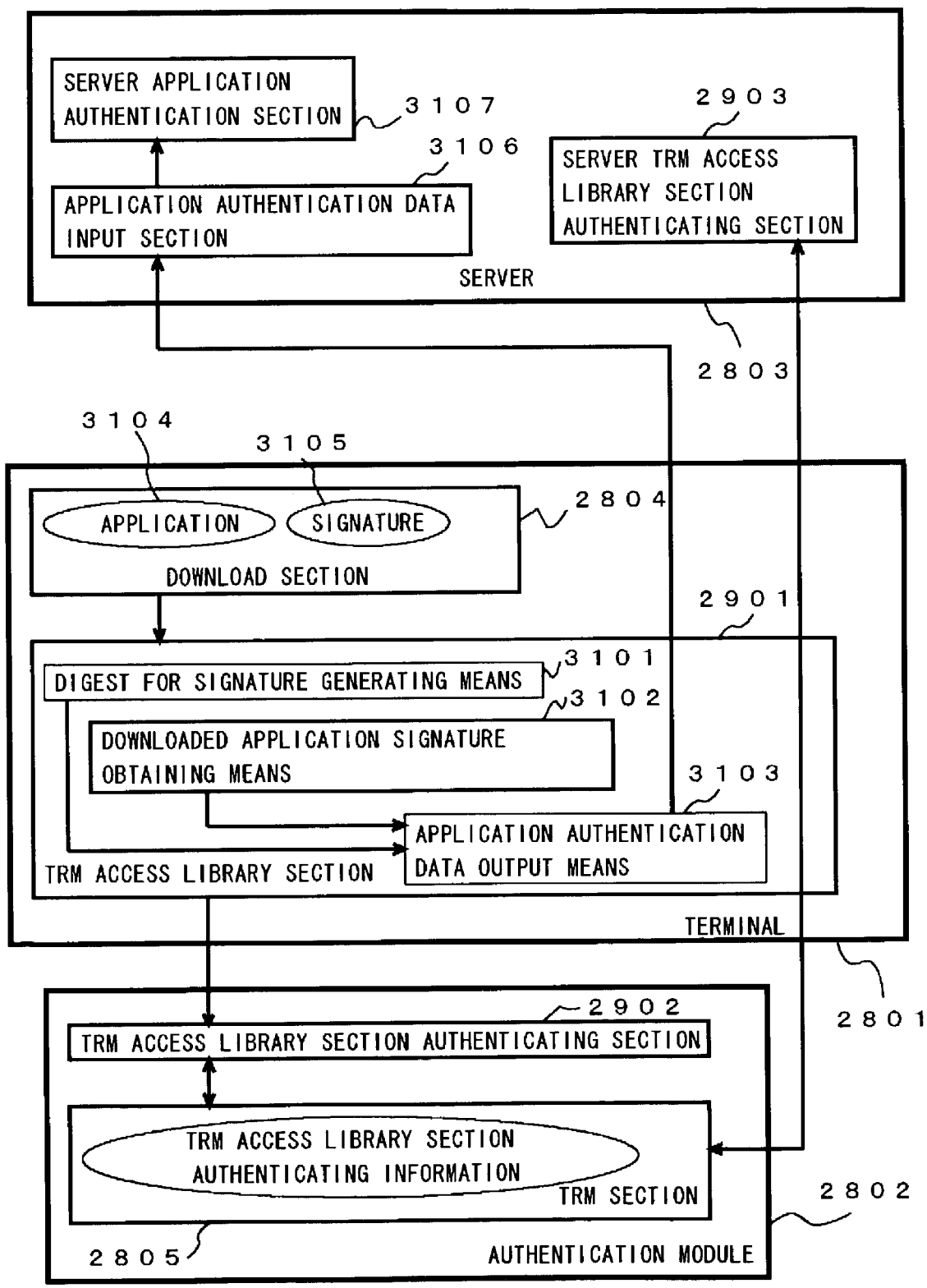
FIG. 31 is a function block diagram of the application authentication system in the thirteenth embodiment of the present invention.

FIG. 31 shows the function block diagram of the application authentication system in the thirteenth embodiment of the present invention. The application authentication system according to this embodiment comprises the terminal 2801, the authentication module 2802, and the server 2803 that downloads the application to the terminal 2801.

The terminal 2801 has the download section 2804 and the TRM access library section 2901, and the TRM access library section 2901 includes a digest for signature generating means 3101, downloaded application signature obtaining means 3102, and application authentication data output means 3103.

The download section 2804 downloads an application 3104. The application 3104 may be downloaded from the server 2803. It also may be downloaded from a section other than the server 2803, that is, the authentication module 2802, for example. In this embodiment, the application 3104 is downloaded along with a signature 3105 of the application 3104. 'Downloaded along with the signature 3105' does not only mean that they are downloaded simultaneously but also mean that the application 3104 may be downloaded before or after downloading the signature 3105. In other words, it means that the application 3104 and the signature 3105 are downloaded by the time when authentication for the application 3104 (described later) is performed.

The digest for signature generating means 3101 generates digest for signature from the application 3104. Specifically, it generates the digest for signature from the application 3104 downloaded to the download section 2804. The 'digest for signature' is a value obtained using the same hash function as the one used in generating the signature 3105.

The downloaded application signature obtaining means 3102 obtains the signature 3105 that has been downloaded along with download of the application 3104. As described above, 'downloaded along with download of the application 3104' does not only mean that they have been downloaded simultaneously, but it also means that the application 3104 and the signature 3105 are downloaded by the time when authentication for the application 3104 (described later) is performed.

The application authentication data output means 3103 transmits the obtained signature and the digest for signature generated by the digest for signature generating means 3101 to the server 2803. The 'obtained signature' is the signature 3105 obtained by the downloaded application signature obtaining means 3102.

The digest for signature generating means 3101, the downloaded application signature obtaining means 3102, and the application authentication data output means 3103 perform a processing for authenticating the application 3104 downloaded to the download section 2804. This processing may be performed on condition that the authentication module 2802 has authenticated the TRM access library section 2901.

The authentication module 2802 has the TRM section 2805 and the TRM access library section authenticating section 2902. The TRM section 2805 and the TRM access library section authenticating section 2902 are sections identical to the TRM section and the TRM access library section authenticating section in the twelfth embodiment.

The server 2803 has the server TRM access library section authenticating section 2903, an application authentication data input section 3106, and a server application authenticating section 3107.

The server TRM access library section authenticating section 2903 is identical to the one in the twelfth embodiment, and it determines that authentication of the TRM access library section 2901 has succeeded on condition that authentication of the TRM section 2805 in the authentication module 2802 via the TRM access library section 2901 of the terminal 2801 succeeds.

The application authentication data input section 3106 enters the digest for signature and the signature, which have been output from the application authentication data output means 3103 of the TRM access library section 2901 whose authentication has been determined as successful by the server TRM access library section authenticating section 2903.

The server application authenticating section 3107 performs authentication for the application 3104 based on the digest for signature and the signature, which have been input to the application authentication data input section 3106. Authentication is performed in such a manner that the signature is decrypted to find the digest and whether or not the digest is identical to the digest for signature is determined. If the signature has been encrypted by the private key of the server 2803 in the public key cryptography, the private key of the server 2803 encrypts the digest for signature input to the application authentication data input section 3106, and authentication may be determined based on whether or not the signature obtained is identical to the signature input to the application authentication data input section 3106.

Figure 32:
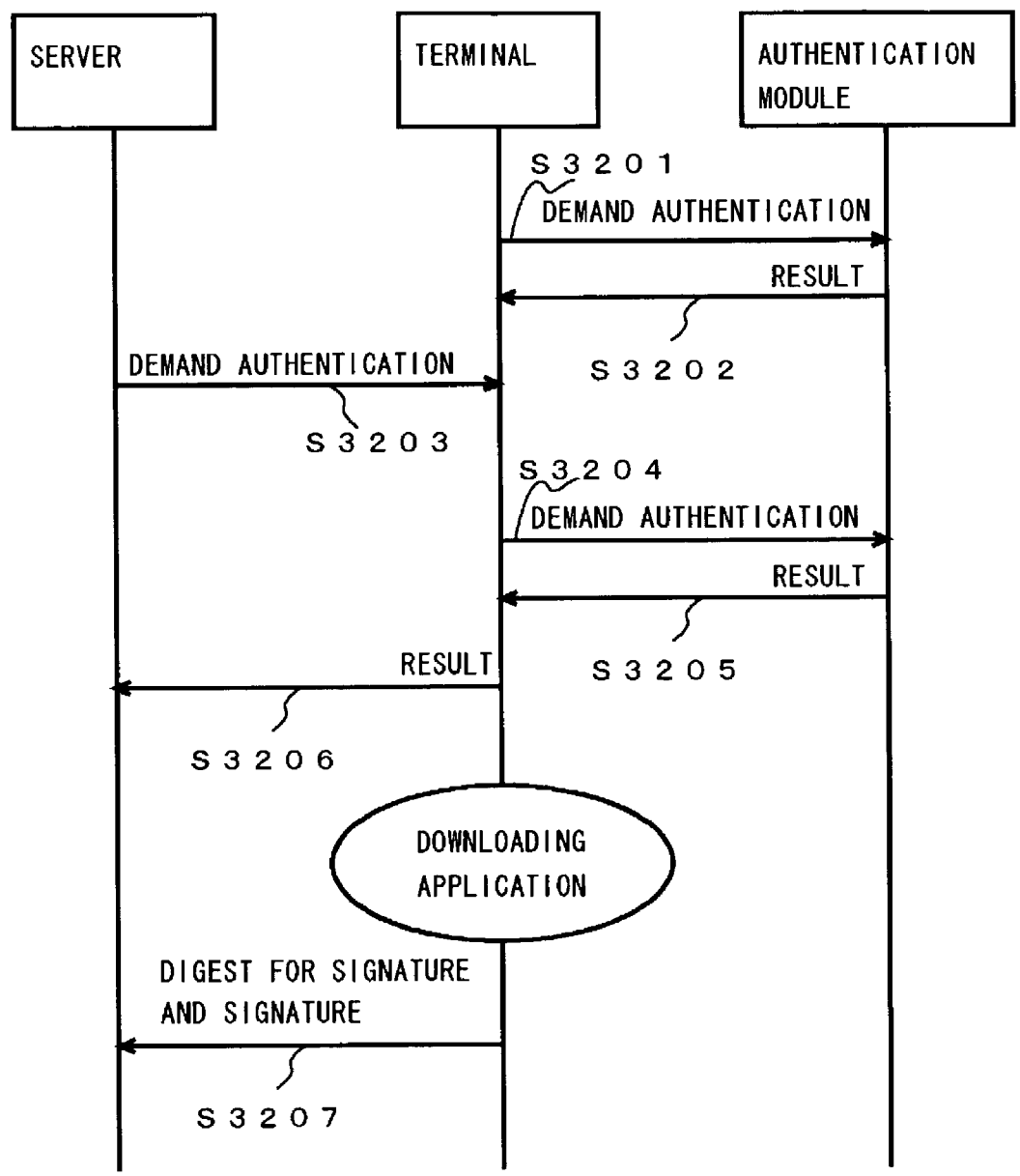
FIG. 32 is a sequential diagram explaining an operation of the application authentication system in the thirteenth embodiment of the present invention.

FIG. 32 shows the interaction along the passage of time among the server 2803, the terminal 2801, and the authentication module 2802, which constitute the application authentication system in this embodiment. Steps from S3201 to S3206 are the same as steps from S3001 to S3006 in FIG. 30 of the twelfth embodiment. When the application 3104 is downloaded to the download section 2804 after step S3206, the digest for signature generating means 3101 generates the digest for signature of the application 3104, the downloaded application signature obtaining means 3102 obtains the signature 3105, and the application authentication data output means 3103 outputs the digest for signature and the signature 3105 to the application authentication data input section 3106 (step S3207). Then, the server application authenticating section 3107 performs authentication for the application 3104 by the digest for signature and the signature, which have been input to the application authentication data input section 3106.

According to this embodiment, the server TRM access library section authenticating section 2903 in the server 2803 determines that authentication for the TRM access library section 2901 in the terminal 2801 has succeeded on condition that authentication for the TRM section 2805 in the authentication module 2802 via the TRM access library section 2901 of the terminal 2801 succeeds. Accordingly, the server 2803 can determine that the digest for signature and the signature 3105 of the application 3104, which are transmitted from the application authentication data output means 3103 of the TRM access library section 2901 to the application authentication data input section 3106, are actually derived from the application 3104, and thus the server 2803 can authenticate the application 3104.

Fourteenth Embodiment

Figure 33:
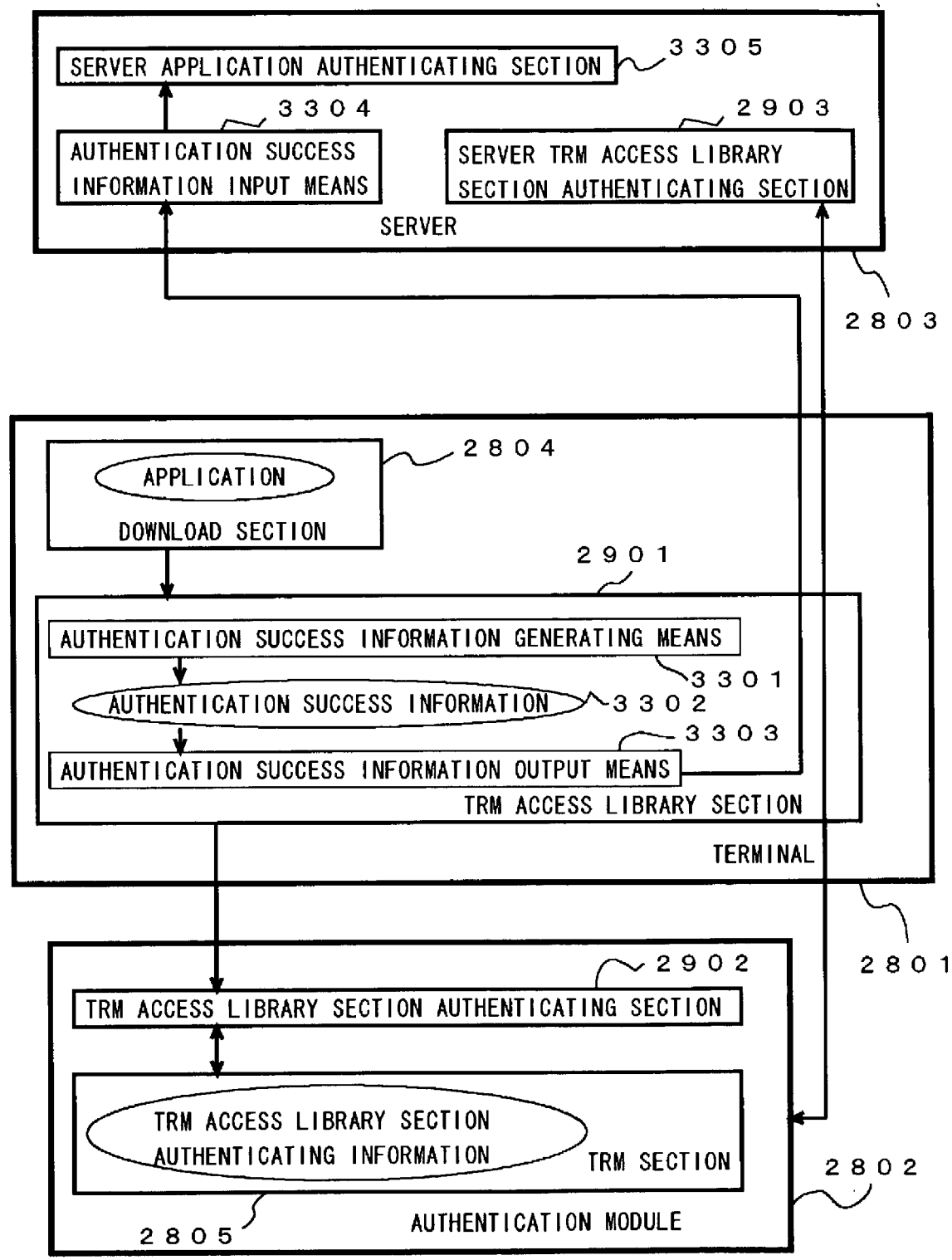
FIG. 33 is a function block diagram of the application authentication system in the fourteenth embodiment of the present invention.

FIG. 33 shows the function block diagram of the application authentication system in the fourteenth embodiment of the present invention. Although the server 2803 executes a part of the authentication processing of the application downloaded to the download section 2804 in the thirteenth embodiment, application authentication is performed in a section other than the server 2803 and the server 2803 only obtains the result of authentication in this embodiment.

The terminal 2801 has the download section 2804 and the TRM access library section 2901. The download section 2804 downloads the application. The TRM access library section 2901 includes authentication success information generating means 3301 and authentication success information output means 3303.

The authentication success information generating means 3301 generates authentication success information 3302 that shows success of application authentication. In this embodiment, application authentication may be performed only in the TRM access library section 2901. Further, the TRM access library section 2901 and the authentication module 2802 may perform authentication in cooperation, and the authentication success information generating means 3301 obtains a result of the authentication to generate the authentication success information 3302 showing whether or not authentication has succeeded. At this point, the private key of the authentication module 2802 or the public key of the server 2803 may encrypt the authentication success information 3302.

The authentication success information output means 3303 outputs the authentication success information 3302 that has been generated in the authentication success information generating means 3301. If the authentication success information 3302 has not been encrypted, it may be output after the private key of the authentication module 2802 or the public key of the server 2803 encrypts the authentication success information 3302.

The authentication module 2802 has the TRM section 2805 and the TRM access library authenticating section 2902, which have the same operation as those of the thirteenth embodiment.

The server 2803 has the server TRM access library section authenticating section 2903, an authentication success information input section 3304, and a server application authenticating section 3305.

The server TRM access library section authenticating section 2903 has the same operation as that of the thirteenth embodiment.

The authentication success information input section 3304 enters the authentication success information that has been output from the authentication success information output means 3303 in the TRM access library section 2901 whose authentication has been determined as a success by the server TRM access library section authenticating section 2903. When it is determined that the TRM access library section 2901 has been successfully authenticated by the server TRM access library section authenticating section 2903, information output from the TRM access library section 2901 and the authentication module 2802 is trustworthy for the server 2803. Therefore, it can be determined that the contents of the authentication success information output means 3303 are trustworthy.

The server application authenticating section 3305 performs authentication for the application based on the authentication success information that has been input to the authentication success information input section 3304. For example, when the authentication success information output from the authentication success information output means 3303 has been encrypted by the private key of the authentication module 2802 or the public key of the server 2803, it is decrypted to check with the contents of the authentication success information and authentication is performed for the application downloaded to the download section 2804.

Fifteenth Embodiment

In the present invention, it is required to download the application and the signature in order to authenticate the application (application program). Hereinafter, description will be made for an application that stores a signature of the application therein.

The application program can be generally divided into an application main body and an application definition file. The 'application main body' is a code or data for executing the application program, and the 'application definition file' is a file that describes an attribute of the application main body. As the 'attribute of the application main body', there exists a size of the application main body, an entry point to execute the application program, parameter (main-class starting parameter in the case of Java) that should be passed to the application program at the time of executing the application program, for example. When it is assumed that an area in which the attribute of the application main body described is referred to as an 'attribute information storage area', there are cases where an optional region that a creator of the application can freely use, exists in the attribute information storage area. Thus, signature data of the application main body may be stored in the optional region. Note that the application main body may not be the code and data itself, but may be a compression of the code and data. Similarly, the application definition file may also be a compression of an attribute description of the application main body.

Figure 34:
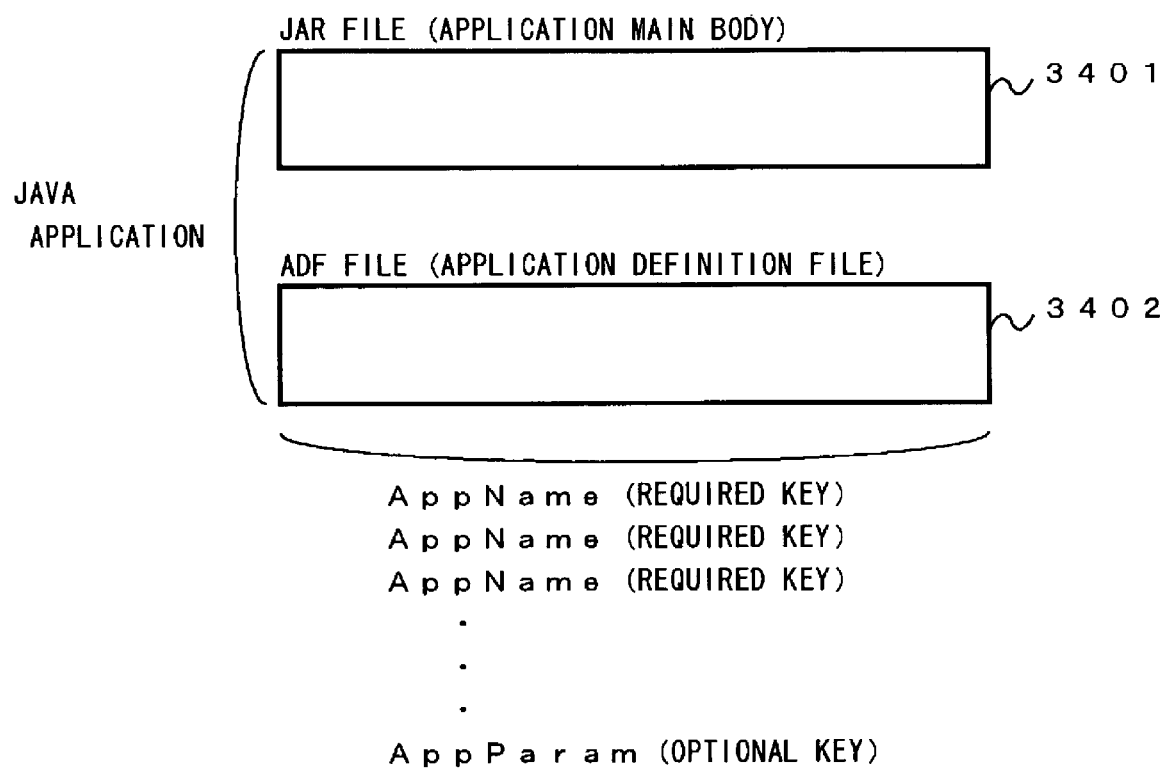
FIG. 34 is a view schematically showing an application main body and an application definition file of a Java application.

FIG. 34 exemplifies an application structure of the Java application, that is, an i-application (Java application for NTT DoCoMo cell phones) in particular. In the i-application, the application main body is stored in JAR file 3401 and the application definition file is provided as an ADF file 3402. The attribute of the application main body stored in the ADF file 3402 is shown by a required key called AppName as an application name, and the size of the application main body is shown by the required key called AppSize. Furthermore, there exists an optional key shown by AppParam as the optional region that the creator of the application can freely use. A maximum of 255 bytes can be used in the region shown by the AppParam. On the other hand, 20 bytes are needed for the signature of the application main body if Elliptic Curve Cryptography of 160 bits is used, 128 bytes are needed if RSA cryptography of 1024 bits is used, and they are stored in the region shown by AppParam. Thus, the signature of the application main body can be stored in the region shown by AppParam.

Figure 35:
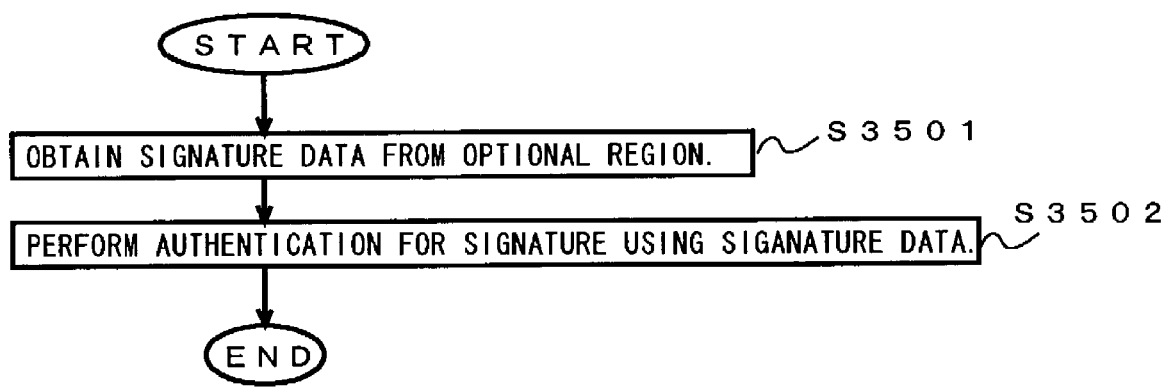
FIG. 35 is a flowchart explaining a processing of application authentication by using a signature stored in an optional region.

FIG. 35 is the flowchart explaining a processing in performing authentication for the application that stores signature data of the application main body in the optional region in this manner. In step S3501, the signature data is obtained from the optional region. In step S3502, authentication is performed for the signature using the signature data obtained in step 3501. These steps are executable by a program.

Further, FIG. 34 can be regarded as the one showing a data structure of the application program. Specifically, it can be regarded as the one comprised of the JAR file section 3401 that stores the JAR file that is a compression file of the code and data, and the ADF file section 3402 that stores the ADF file that is the definition file of the application. In such a data structure, the ADF file of the ADF file section 3402 has a region shown by AppParam, which stores the main-class starting parameter or the like, and the signature of the JAR file stored in the JAR file section 3401 is stored in the region shown by AppParam.

The signature of the JAR file stored in the region shown by AppParam may be a signature by a person who guarantees an operation of application. Herein, the 'person who guarantees an operation of application' is a person who has created an application operated by the code and data stored in the JAR file, a person who distributes the application, a third person who verifies an operation of the application and guarantees that it does not perform an invalid operation, or the like.

Since the data structure of the application program shown in FIG. 34 can be expressed by bit stream, a recording medium such as a (SD) memory card, a flexible disc, a compact disc, or the like, on which the bit stream has been recorded, can be created.

When the application is downloaded with such an application program, not only the application main body but also the signature of the application main body is also downloaded, so that an additional task to download the signature can be omitted.

Sixteenth Embodiment

Figure 37:
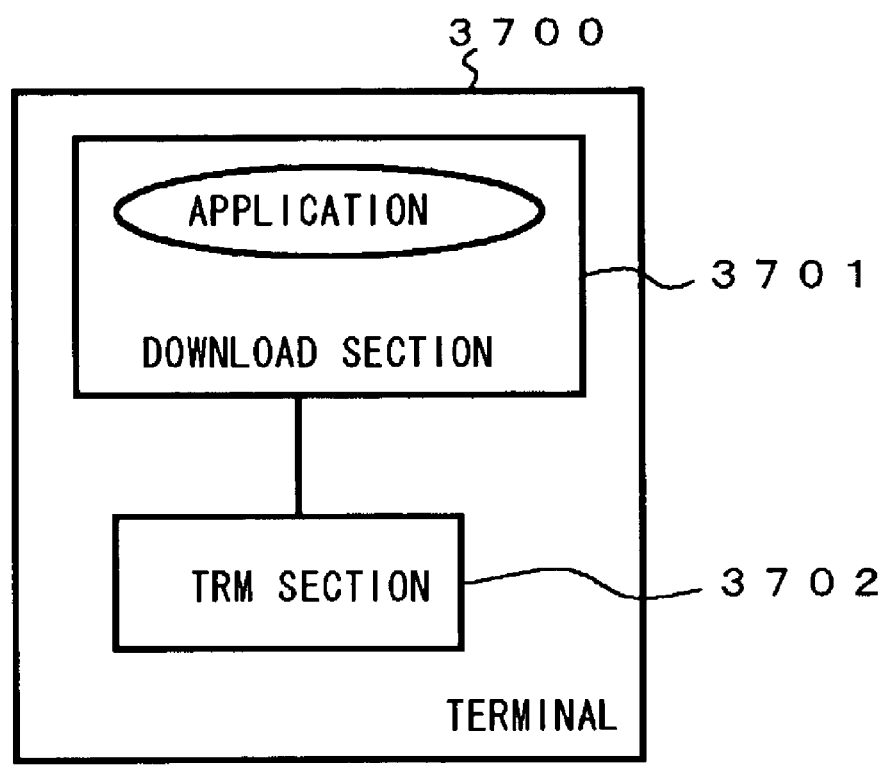
FIG. 37 is a function block diagram of the terminal of the sixteenth embodiment of the present invention.

FIG. 37 exemplifies the function block diagram of the terminal according to the sixteenth embodiment of the present invention. This embodiment is characterized in that the authentication module is provided inside the terminal in the application authentication system of the first embodiment to make them unified.

In this embodiment, a terminal 3700 has a download section 3701 and a TRM section 3702.

The download section 3701 downloads the application. Specifically, it has the same function as the download section 102 in the first embodiment.

The TRM section 3702 holds the information for application authentication in the tamper-resistant region. In other words, it has the same function as the TRM section 103 in the authentication module 101 in the first embodiment.

Therefore, in the terminal of this embodiment, procedure of downloading the application or procedure of authenticating the downloaded application may be the same as the first embodiment.

By using such a terminal, in the case where the authentication processing of the application downloaded to the download section 3701 of the terminal 3700 has been performed and the authentication processing has succeeded, for example, the application can be securely permitted to access to the information stored in the terminal, such as information held by the TRM section 3702.

Although the word 'terminal' has been used, it does not mean that the word is limited to the portable terminal or the like represented by a cell phone. For example, it may be a home electronic appliance, and also may be a so-called information home electronic appliance or a network home electronic appliance. Products such as an air conditioner, a humidifier, a dehumidifier, an air cleaner, a microwave oven, an oven, a refrigerator, a dish washing machine, a water heater, an iron, a trouser press, an electric vacuum cleaner, a washing machine, a drier, an electric blanket, electric sheets, a light fixture, a television, a radio, an audio apparatus such as a tape recorder, a camera, an IC recorder, a telephone, a facsimile machine, a copier, a printer, a scanner, a personal computer, and the like are cited. (The same will apply to the 'terminal' in the seventeenth embodiment described below.)

Seventeenth Embodiment

Figure 38:
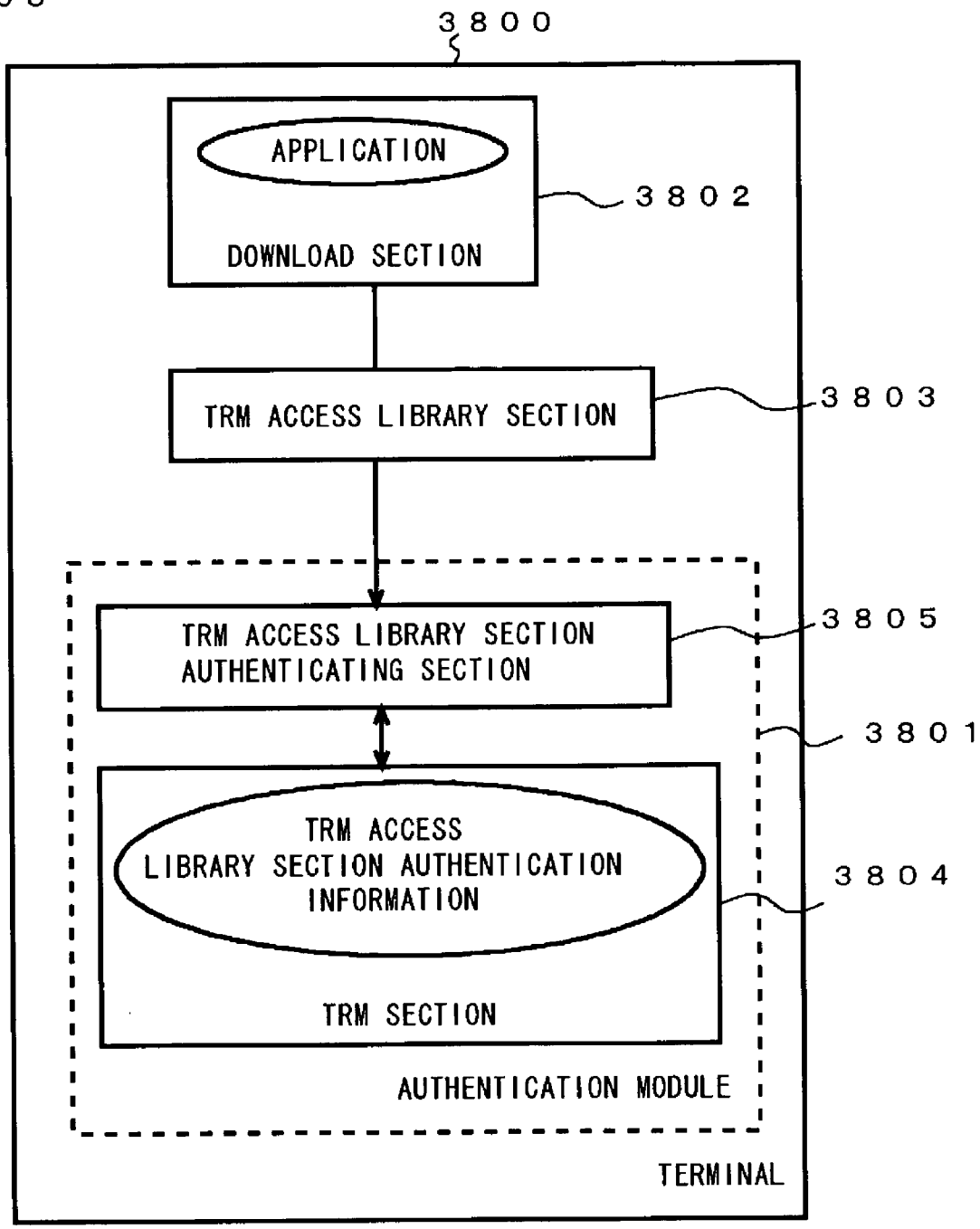
FIG. 38 is a function block diagram of the terminal of the seventeenth embodiment of the present invention.

FIG. 38 exemplifies the function block diagram of the terminal according to the seventeenth embodiment of the present invention. This embodiment is characterized in that the authentication module is provided inside the terminal in the application authentication system of the second embodiment or the like to make the terminal and the authentication module unified.

In this embodiment, a terminal 3800 is a terminal provided with an authentication module 3801, and it has a download section 3802 and a TRM access library section 3803. The authentication module 3801 has a TRM section 3804 and a TRM access library section authenticating section 3805.

The authentication module 3801 holds information in the tamper-resistant region and performs the processing for authentication using the information. Details will be described later.

The download section 3802 downloads the application. Specifically, it has the same function as the download section 102 in the second embodiment or the like.

The TRM access library section 3803 performs the processing for application authentication on condition that the authentication module 3801 authenticates the section 3803 itself. In other words, it has the same function as the TRM access library section 401 in the second embodiment or the like. Note that 'the authentication module 3801 authenticates the section 3801 itself' means that authentication is performed by the TRM access library section authenticating section 3805, as described later.

The TRM section 3804 holds the TRM access library section authentication information in the tamper-resistant region. The TRM access library section authentication information' is information for authenticating the TRM access library section, which is the same as the definition of the second embodiment. Thus, the TRM section 3804 has the same function as the TRM section 103 of the second embodiment or the like. Note that the tamper-resistant region may be inside the TRM section 3804, or may be inside the authentication module 3801 and outside the TRM section 3804.

The TRM access library section 3805 performs authentication for the TRM access library section 3803 based on the TRM access library section authentication information. Therefore, the TRM access library section 3805 has the same function as the TRM access library section 401 of the second embodiment or the like.

Figure 39:
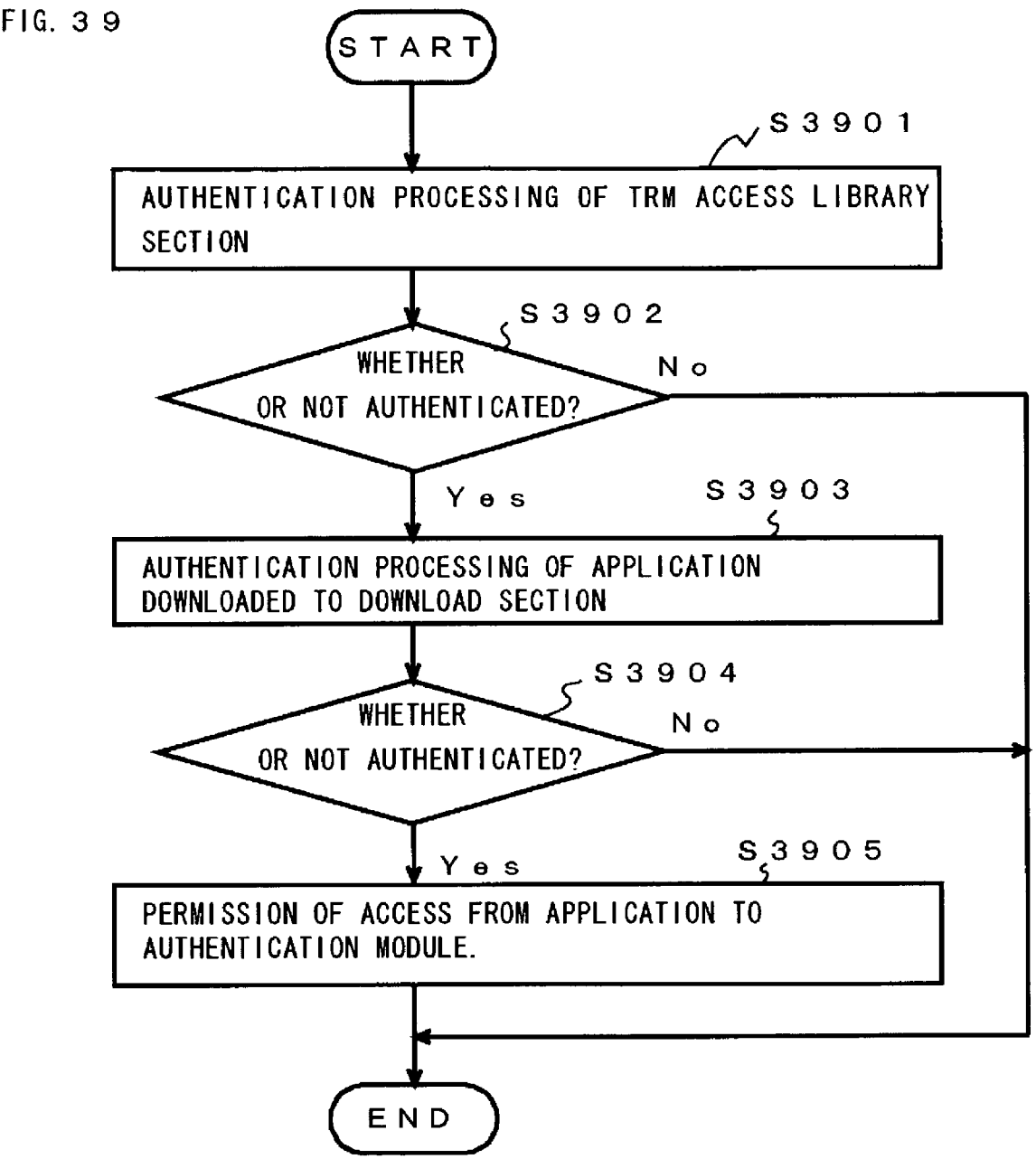
FIG. 39 is a flowchart explaining a processing flow in the terminal of the seventeenth embodiment.

FIG. 39 exemplifies the flowchart explaining the processing flow of the terminal 3800 in this embodiment. It is presumed that the application has been downloaded to the download section 3802 in the processing exemplified in this flowchart.

In step S3901, the TRM access library section authenticating section 3805 performs authentication processing of the TRM access library section 3803.

In step S3902, whether or not the TRM access library section 3803 has been authenticated is determined, and the processing proceeds to step S3903 if authenticated. In FIG. 39, the processing ends if it has not been authenticated. Instead, the application downloaded to the download section 3802 may be discarded.

In step S3903, the TRM access library section 3803 performs authentication processing of the application downloaded to the download section 3802.

In step S3904, if the downloaded application has been authenticated, the processing proceeds to step S3905. If it has not been authenticated, the processing ends. Instead of ending the processing, the application downloaded to the download section 3802 may be discarded.

In step S3905, access of the downloaded application to the authentication module is permitted. It is the authentication module 3801 that permits the access. Alternatively, if the function of the TRM access library section 3803 is always used when the application accesses the authentication module 3803, access by the TRM access library section 3803 to the authentication module may be permitted.

Note that the TRM access library section 3803 may comprise the application manager, the device driver, or the like as described in the second embodiment.

According to this embodiment, when the terminal has the authentication module inside thereof, the terminal can hold information that must be highly protected inside thereof, and authentication for the application downloaded to the terminal can be performed.

Eighteenth Embodiment

The eighteenth embodiment of the present invention relates to the application authentication system that comprises a primary equipment and an authentication module. In this embodiment, authentication for the application stored in the primary equipment is performed by using information held in the authentication module.

Figure 40:
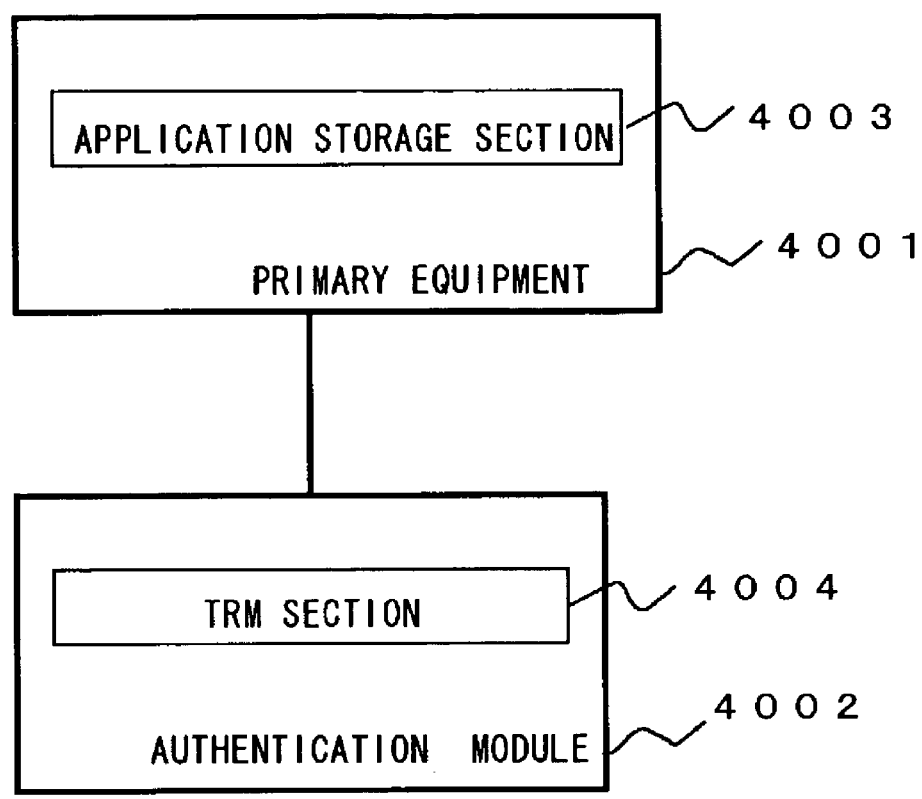
FIG. 40 is a function block diagram of the application authentication system in the eighteenth embodiment of the present invention.

FIG. 40 exemplifies the function block diagram of the application authentication system of this embodiment. The application authentication system comprises a primary equipment 4001 and an authentication module 4002. The primary equipment is not limited to the terminal, but may be a personal computer, a workstation, a large-scale computer, or a server. Further, the primary equipment 4001 and the authentication module 4002 do not need to be directly connected electrically, nor do they need to be contacted physically. For example, they may be connected via radio waves. Alternatively, they may be connected via a network represented by the Internet. Particularly, the network may be constructed using a medium such as an optical cable that does not use electrical transmission.

The primary equipment 4001 comprises an application storage section 4003. The application storage section 4003 stores the application. The application is not limited to a program that operates in the primary equipment 4001. It may be the application that operates in equipment other than the primary equipment 4001. Further, to 'store' is to hold the application. The length of holding time is unlimited. An object of holding the application is unlimited as well. For example, the object of storage may be that the application is made to operate in the primary equipment 4001. Further, the object may be that the application is downloaded to the primary equipment 4001 and made to operate. Alternatively, the object may be a temporary holding for the primary equipment 4001 to relay the application when it is sent via a communication network. Alternatively, the object may be that the application is held to download it to equipment other than the primary equipment 4001.

The authentication module 4002 comprises a TRM section 4004. The TRM section 4004 holds information for an authentication processing of the application in the tamper-resistant region. As the information for processing application authentication, the private key for encryption, a certificate to confirm authenticity of the signature of the application, or the like, is cited for example. The application referred to here is an application stored in the application storage section 4003 of the primary equipment 4001. Accordingly, the TRM section of the authentication module in this embodiment may be the one having the same function as the TRM section of the first embodiment. In this case, a method of processing application authentication, or the like is the same as that of the embodiment.

Since authentication can be performed for the application stored in the application storage section 4003 with the application authentication system of this embodiment, the application is prevented from operating obliquely, for example.

Note that the primary equipment 4001 may be a home electronic appliance. It also may be a so-called information home electronic appliance or a network home electronic appliance. Products such as an air conditioner, a humidifier, a dehumidifier, an air cleaner, a microwave oven, an oven, a refrigerator, a dish washing machine, a water heater, an iron, a trouser press, an electric vacuum cleaner, a washing machine, a drier, an electric blanket, electric sheets, a light fixture, a television, a radio, an audio apparatus such as a tape recorder, a camera, an IC recorder, a telephone, a facsimile machine, a copier, a printer, a scanner, a personal computer, and the like are cited.

Nineteenth Embodiment

The nineteenth embodiment of the present invention also relates to the application authentication system that comprises a primary equipment and an authentication module similar to the eighteenth embodiment. In this embodiment, when authentication is performed for the application stored in the primary equipment, the authentication module authenticates a section in the first equipment, which performs authentication.

Figure 41:
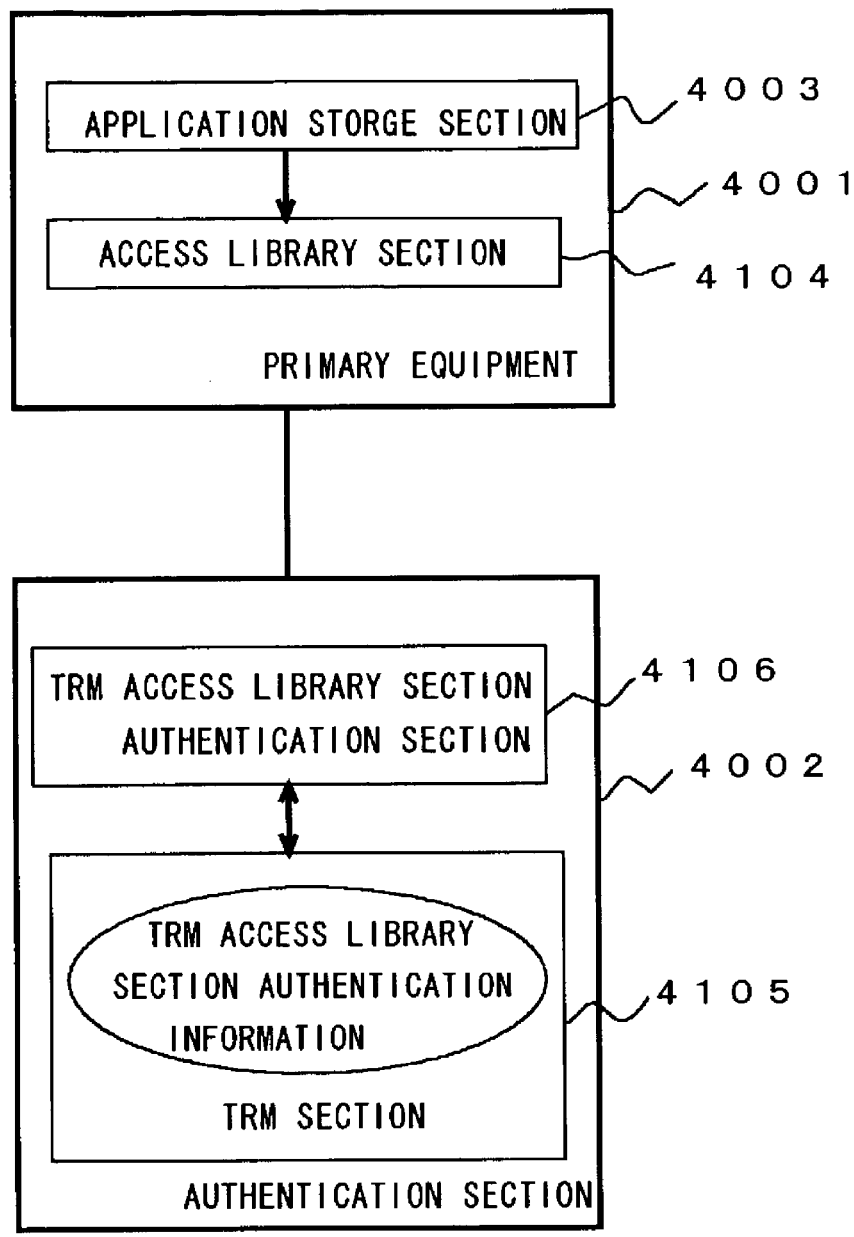
FIG. 41 is a function block diagram of the application authentication system in the nineteenth embodiment of the present invention.
Figure 4:
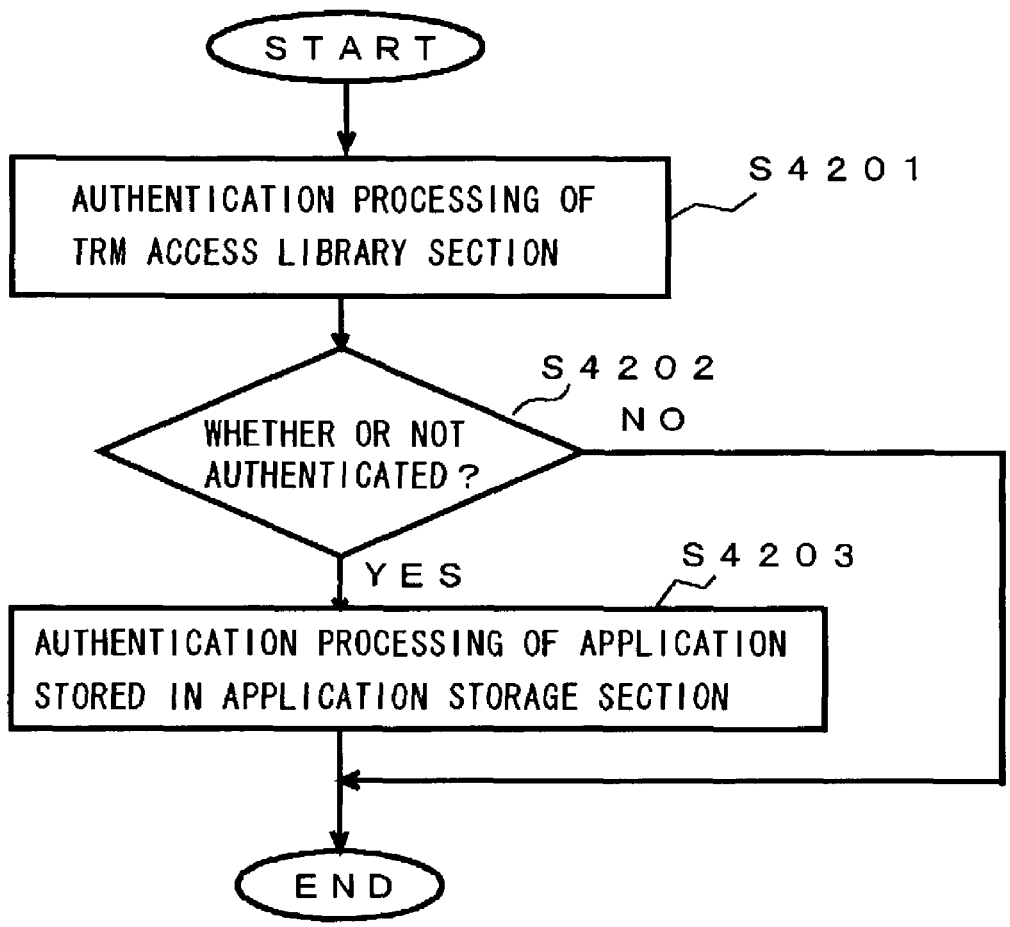

FIG. 41 exemplifies the function block diagram of the application authentication system in this embodiment. The application authentication system comprises a primary equipment 4101 and an authentication module 4102. Note that the primary equipment 4101 and the authentication module 4102 do not need to be directly connected electrically, nor do they need to be connected physically, as in the eighteenth embodiment.

The primary equipment 4101 comprises an application storage section 4103 and a TRM access library section 4104.

The application storage section 4103 stores the application. For example, it has the same function as the application storage section 4003 in the eighteenth embodiment.

The TRM access library section 4104 performs the processing for application authentication on condition that the authentication module 4102 authenticates the section 4104 itself. Herein, the 'itself' means the TRM access library section 4104. Alternatively, the 'itself' may be a section that includes the TRM access library section 4104. For example, the primary equipment 4101 may be the 'itself'.

Further, the 'application' means the application stored in the application storage section 4003.

Therefore, the processing in which the authentication module authenticates the TRM access library section 4104 itself is performed, and the processing for authenticating the application stored in the application storage section 4103 is performed when it has been correctly authenticated as a result of the processing.

Note that the TRM access library section 4104 may comprise the application manger and the device driver and performs their processing, as described in the second embodiment.

The authentication module 4102 comprises the TRM section 4105 and a TRM access library section authenticating section 4106.

The TRM section 4105 holds the TRM access library section authentication information in the tamper-resistant region. The 'TRM access library section authentication information' is information for authenticating the TRM access library section. For example, information for specifying the primary equipment is cited. Such information as: a manufacturer name and a production number, and a telephone number if the telephone number is allocated for the primary equipment. Further, the information may be the one showing a state where the primary equipment is placed, such as information of another equipment to which the primary equipment is connected, information that specifies a part equipped to the primary equipment, or a version number of a program installed in the primary equipment. Furthermore, when the primary equipment is capable of holding secret information of any kind such as an encryption key, information for detecting that the encryption key is authentic may be the TRM access library section authentication information.

In addition, refer to the description of the second embodiment for the tamper-resistant region.

The TRM access library section authenticating section 4106 performs authentication for the TRM access library section 4104 of the primary equipment 4101 based on the TRM access library section authentication information. Specifically, it obtains the information sent from the TRM access library section 4104, determines whether or not the information obtained from the TRM access library section 4104 conforms to the TRM access library section authentication information, and performs authentication processing.

Note that an object for which the TRM access library section authenticating section 4106 performs authentication is not limited to the TRM access library section 4104, but may be a section including the TRM access library section 4104. For example, the section 4106 may perform authentication for the entire primary equipment 4101. In this case, the TRM access library section authentication information may use the production number of the first equipment 4101 or the state where the primary equipment 4101 is placed.

FIG. 42 exemplifies the flowchart that explains the operation of the application authentication system in this embodiment.

In step S4201, the TRM access library section authenticating section 4106 performs authentication processing of the TRM access library section 4104. At this point, the TRM access library section authentication information held in the tamper-resistant region is used.

In step S4202, it is determined that whether or not the TRM access library section 4104 has been authenticated by the processing of step S4201. If it has been determined that the section 4104 was authenticated, the TRM access library section 4104 performs authentication processing of the application stored in the application storage section 4103, in step S4203.

In this embodiment, the TRM access library section 4104, which has been authenticated by the TRM access library section authenticating section 4106 of the authentication module 4102, performs application authentication. Thus, the result of application authentication is trustworthy for the authentication module 4102. As a result, in the case where access to the authentication module has occurred by execution of the application stored in the application storage section 4103, the authentication module can permit the access. Further, even if the application storage section 4103 has been provided to download the application to another equipment, for example, access from the application downloaded from the application storage section 4103 to the authentication module can be permitted. Furthermore, information showing that the application has been authenticated by the authentication module 4102 can be added to the application. This can realize a processing more complicate than the conventional processing.

Twentieth Embodiment

The application authentication system shown in the nineteenth embodiment or the like has been constituted of 2 kinds of principal equipment of the primary equipment and the authentication module. However, the number of the principal equipment is not limited to 2 as shown in this embodiment.

Figure 43:
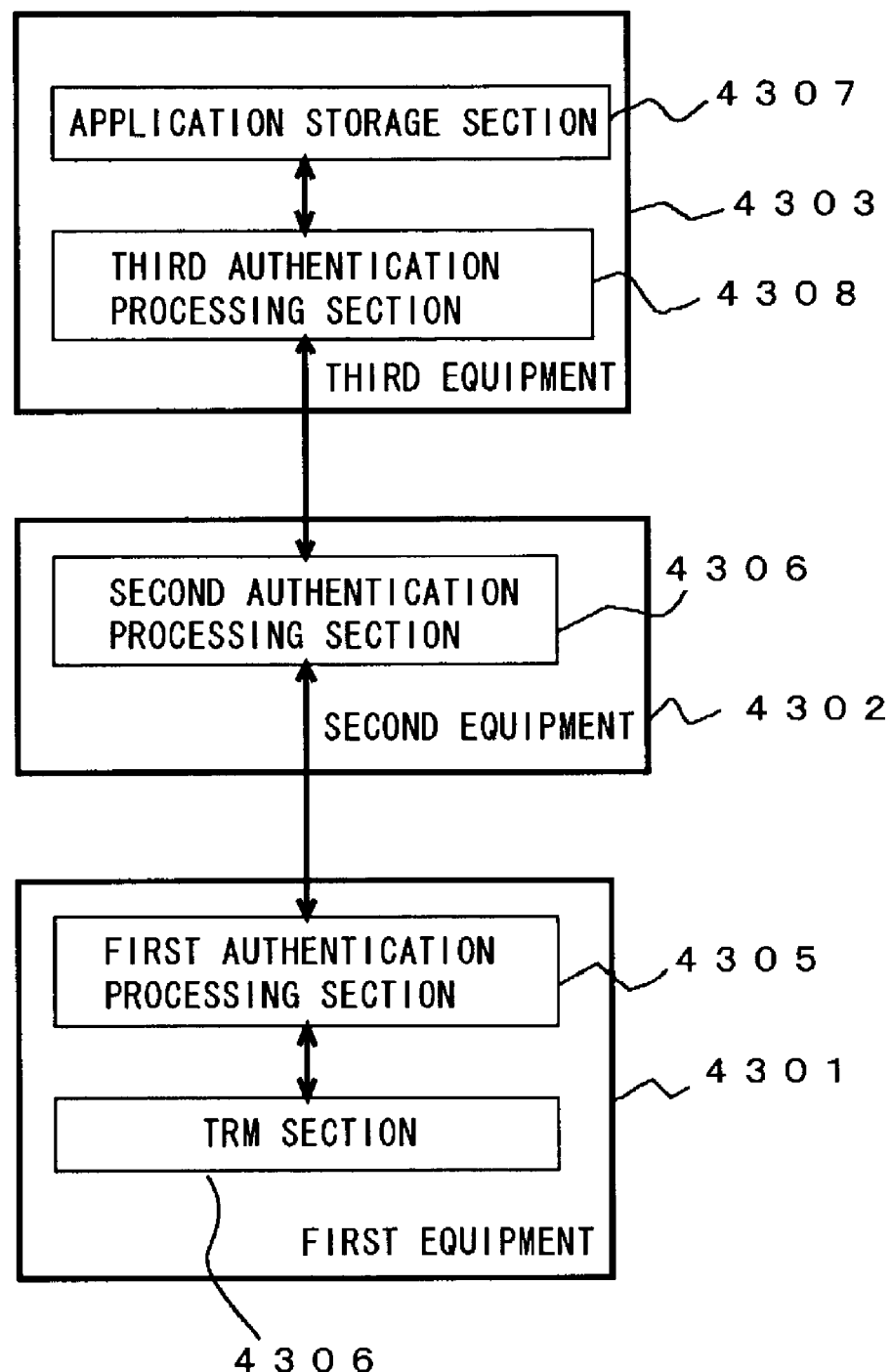
FIG. 43 is a function block diagram of the application authentication system that consists of three kinds of equipment.

FIG. 43 exemplifies the function block diagram of the application authentication system when the number of principal equipment is 3. The application authentication system comprises a first equipment 4301, a second equipment 4302, and a third equipment 4303. Specifically, the application authentication system has 3 principal sections. Note that the 3 principal sections are connected in series, but they do not need to be directly connected electrically nor do they need to be contacted physically, as described in the eighteenth embodiment and the nineteenth embodiment. Further, a person who owns or occupies the first equipment 4301, the second equipment 4302, and the third equipment 4303 may be one, or the 3 kinds of equipment may be owned or occupied by different persons.

Correspondence with the application authentication system of the nineteenth embodiment or the like is as follows. In other words, the first equipment 4301 is equivalent to the authentication module, and the third equipment 4303 is equivalent to the terminal or the primary equipment 4101 in the nineteenth embodiment.

The first equipment 4301 comprises a TRM section 4304 and a first authentication processing section 4305.

The TRM section 4304 holds the authentication information for authenticating the second equipment 4302 in the tamper-resistant region. Therefore, it has the same function as the TRM section in the nineteenth embodiment. But, what is different is that the information held in the tamper-resistant region is the authentication information for authenticating the second equipment. Note that the tamper-resistant region does not only hold the information to authenticate the second equipment but may also hold the information to authenticate the third equipment. As the authentication information, the information showing the production number of the equipment or the state where the equipment is placed, or the information for detecting the authenticity of an encryption key or a certificate if the equipment can hold the encryption key or the certificate is cited, similar to the TRM access library section authentication information in the nineteenth embodiment.

The first authentication processing section 4305 performs authentication for the second equipment 4302 based on the authentication information. The 'authentication information' is the authentication information held in the tamper-resistant region.

The second equipment 4302 comprises a second authentication processing section 4306. The second authentication processing section 4306 performs authentication for the third equipment 4303 on condition that the first authentication processing section 4305 authenticates the equipment 3402 itself. Herein, the 'itself' means the second equipment 3402 including the second authentication processing section 4306.

In the case where the first authentication processing section 4305 has authenticated the second equipment 4302, the second equipment 4302 can be regarded as trustworthy equipment for the first equipment 4301. Therefore, the first equipment 4301 can permit the second equipment 4302 to access to the information held in the tamper-resistant region. Then, when the second authentication processing section 4306 performs authentication for the third equipment 4303, it can use the information held in the tamper-resistant region. Accordingly, the second authentication processing section 4306 may use the information held in the tamper-resistant region when it performs authentication for the third equipment 4303.

As described, the second authentication processing section 4306 may include a function of the device driver for accessing to the first equipment 4301.

Further, the second authentication processing section 4306 may obtain information necessary to perform authentication for the third equipment 4303 from equipment different from the first equipment or the third equipment. In obtaining the information, the second authentication processing section

4306 may present information showing that the second equipment 4302 has been authenticated by the first authentication processing section 4305.

The third equipment 4303 comprises an application storage section 4307 and a third authentication processing section 4308. The application storage section 4307 stores the application. Therefore, it has the same function as the application storage section in the nineteenth embodiment or the like. Thus, the length of time to store the application or an object of storage is not particularly limited.

The third authentication processing section 4308 performs the processing for authenticating the application on condition that the second equipment 4302 authenticates the equipment 4303 itself. The 'application' means the application stored in the application storage section 4307. Further, the 'itself' means the third equipment 4303.

In the case where the second authentication processing section 4306 has authenticated the third equipment 4303, the third equipment 4303 can be regarded as trustworthy equipment for the first equipment 4301. Therefore, the first equipment 4301 can permit the third equipment 4303 to access to the information held in the tamper-resistant region. Then, when the third authentication processing section 4308 performs authentication for the application, it can use the information held in the tamper-resistant region.

Further, the third authentication processing section 4308 may obtain information necessary to perform authentication for the application from equipment different from the first equipment or the second equipment. In obtaining the information, the third authentication processing section 4308 may present information showing that the third equipment 4303 has been authenticated by the second authentication processing section 4306. Alternatively, in such an occasion, the second equipment 4302 may present information that the second equipment 4302 has been authenticated by the first authentication processing section 4305.

Figure 44:
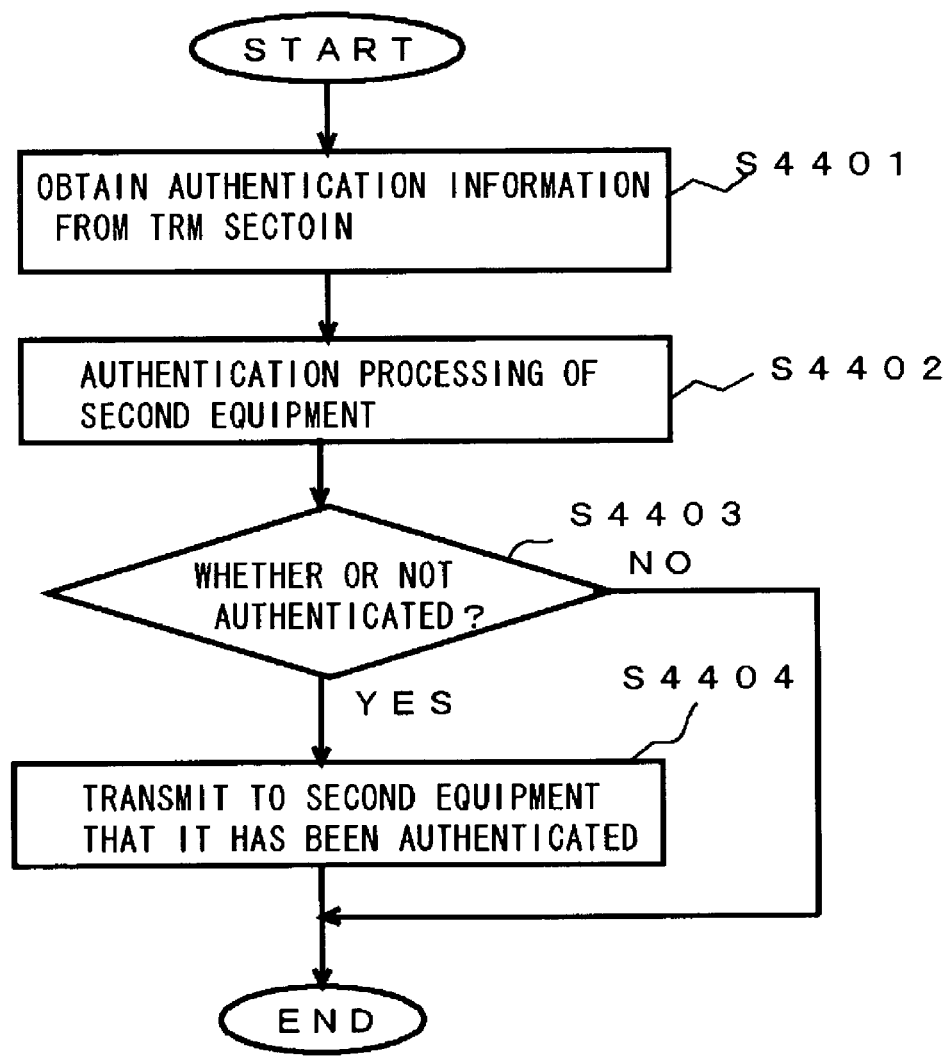
FIG. 44 is a flowchart explaining an operation flow of the first equipment.

FIG. 44 exemplifies the flowchart that explains the operation of the first equipment 4301. In step 4401, the first authentication processing section 4305 obtains the authentication information that the TRM section 4304 holds in the tamper-resistant region. In step S4402, authentication processing of the second equipment is performed, and whether or not it has been authenticated is determined in step S4403. If the equipment has been authenticated, the fact that it has been authenticated is transmitted to the second equipment in step S4404.

Figure 45:
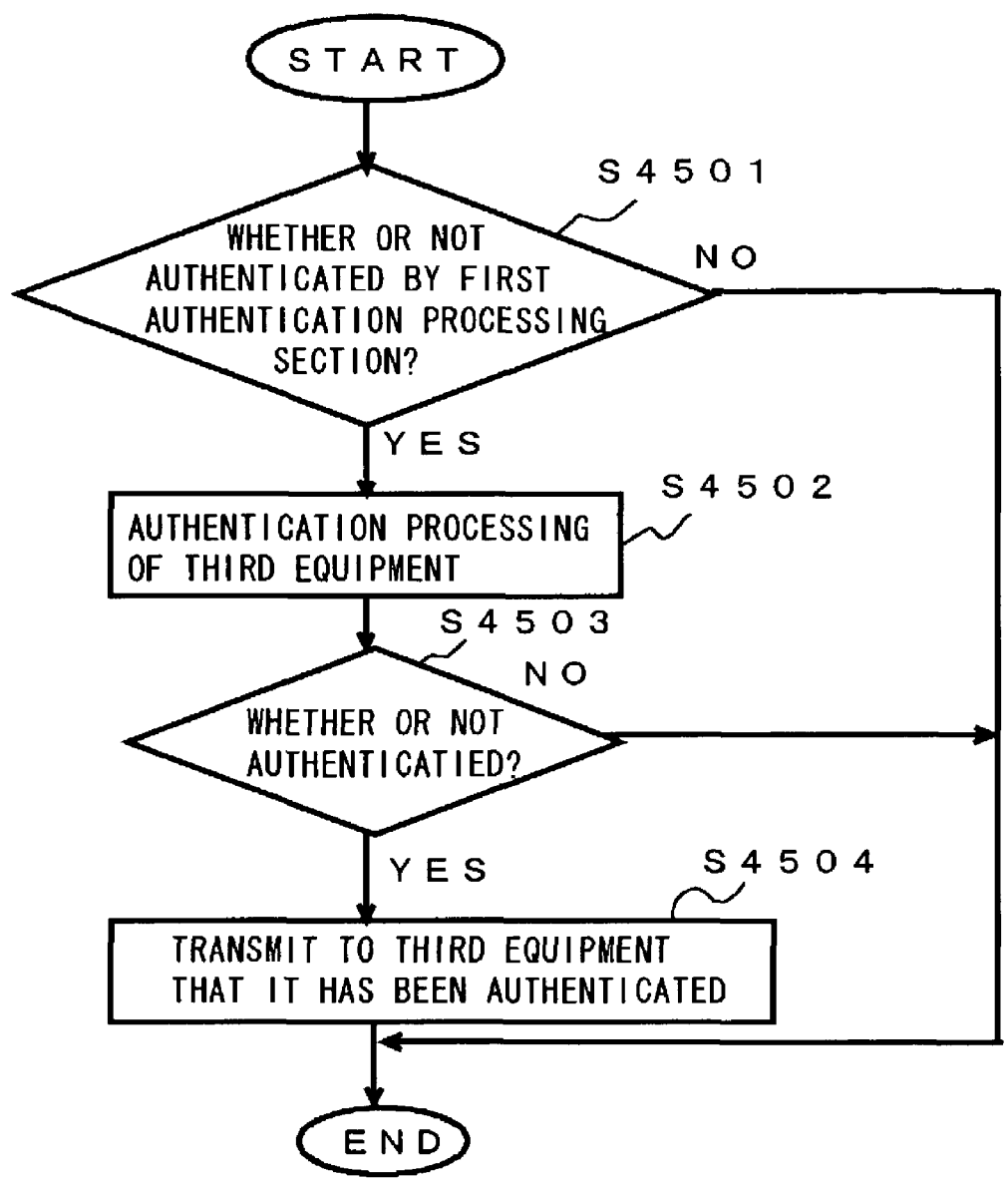
FIG. 45 is a flowchart explaining an operation flow of the second equipment.

FIG. 45 exemplifies the flowchart that explains the operation of the second equipment 4302. In step S4501, whether or not it has been authenticated by the first authentication processing section 4305 is determined. This determination is made depending on whether or not the fact that the first equipment 4301 was authenticated in step S4404 shown in FIG. 44 has been transmitted from the first equipment. If it has been authenticated, the second authentication processing section 4306 performs authentication processing of the third equipment, in step S4502. In step S4503, whether or not it has been authenticated is determined. If the equipment has been authenticated, the fact that it has been authenticated is transmitted to the third equipment in step S4504.

Figure 46:
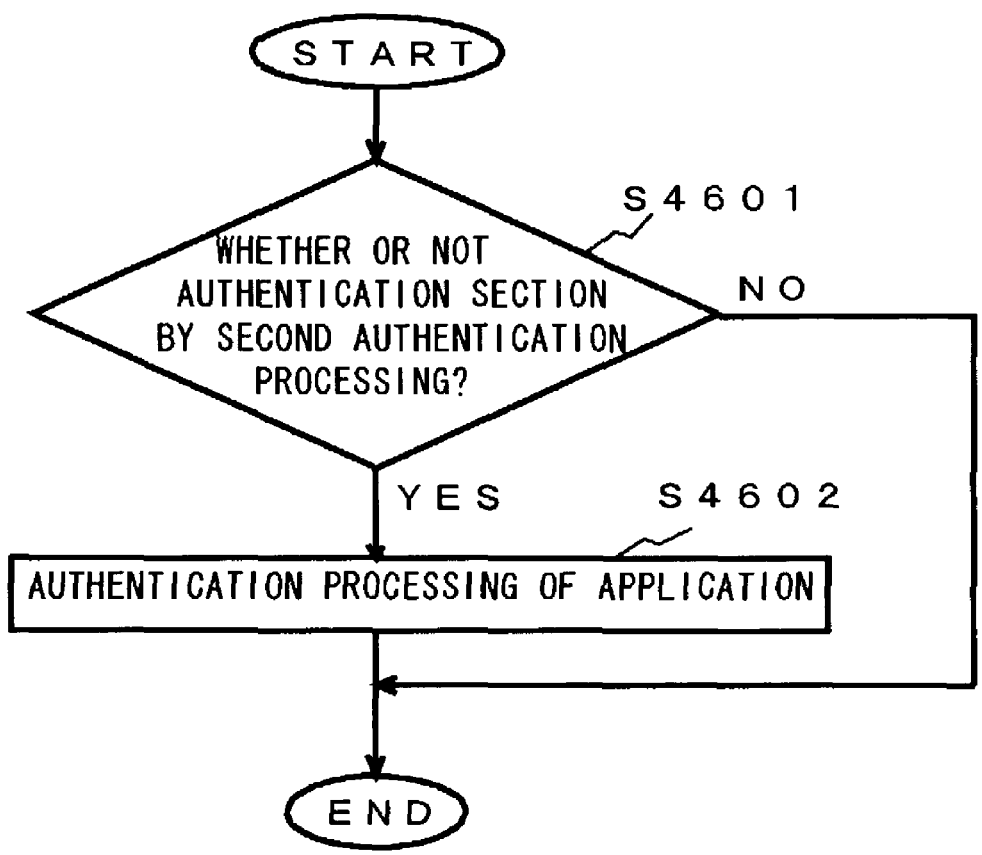
FIG. 46 is a flowchart explaining an operation flow of the third equipment when the application authentication system consists of the three kinds of equipment.

FIG. 46 exemplifies the flowchart that explains the operation of the third equipment 4303. In step S4601, whether or not it has been authenticated by the second authentication processing section 4306 is determined. This determination is made depending on whether or not the fact that the second equipment 4302 was authenticated in step S4504 shown in FIG. 45 has been transmitted from the second equipment. If it has been authenticated, authentication processing of the application is performed in step S4602. Although the processing ends here in FIG. 46, the result of processing for application authentication may be transmitted to the first equipment 4301, for example. Alternatively, it may be transmitted to the second equipment 4302. Furthermore, if the application accesses another piece of equipment, it may present information showing that it has been authenticated by the third authentication processing section 4308. Alternatively, the application may be added with information showing that it has been authenticated by the third authentication processing section 4308.

Figure 47:
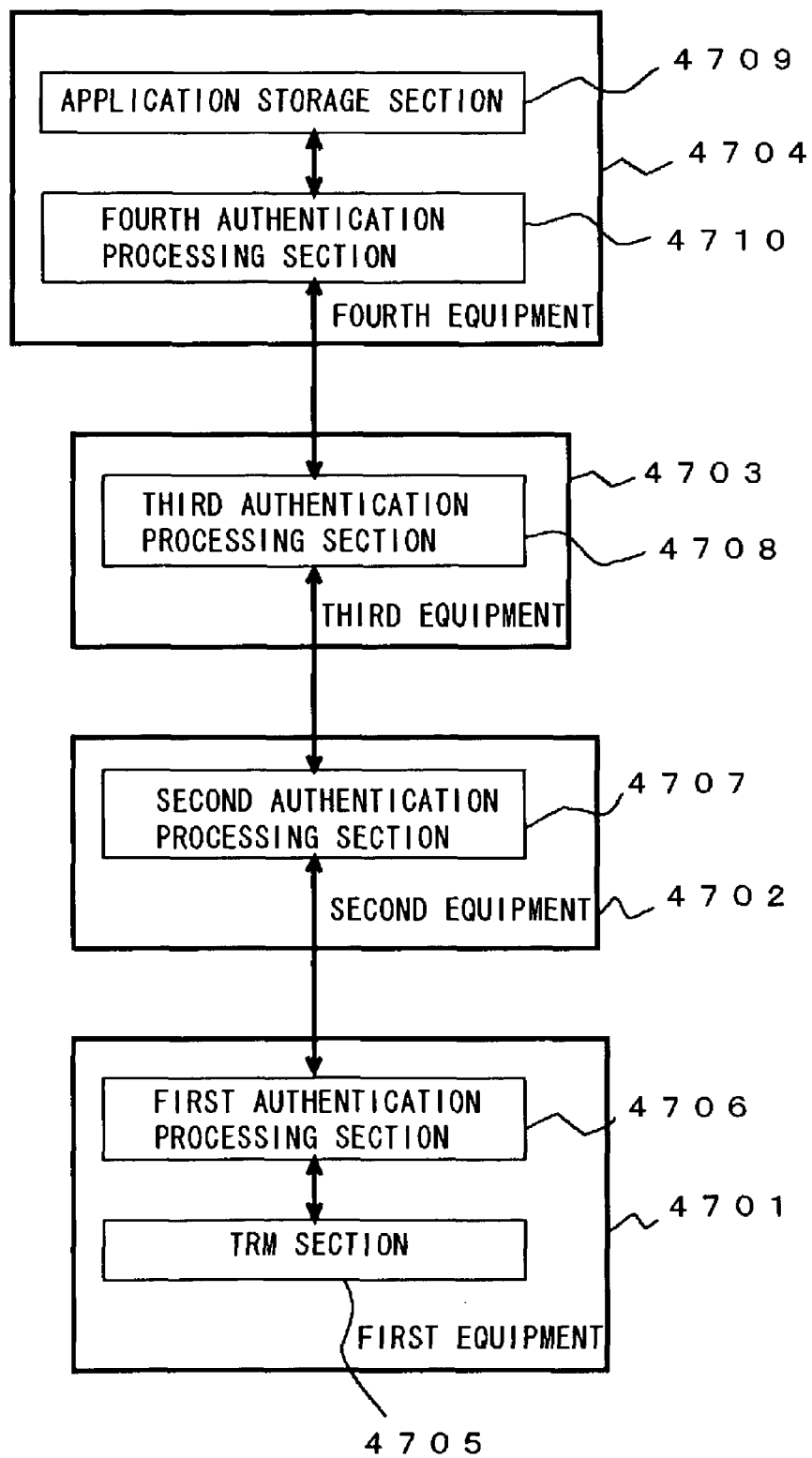
FIG. 47 is a function block diagram of the application authentication system that consists of four kinds of equipment.

The case described above has been the one in which the application authentication system is constituted of 3 kinds of principal equipment, but the application authentication system may be constituted of 4 kinds of principal equipment as shown in FIG. 47.

In FIG. 47, the application authentication system comprises a first equipment 4701, a second equipment 4702, a third equipment 4703, and a fourth equipment 4704. The first equipment 4701 comprises a TRM section 4705 and a first authentication processing section 4706, which correspond to the TRM section 4304 and the first authentication processing section 4305 exemplified in FIG. 43. The second equipment 4702 comprises a second authentication processing section 4707. This corresponds to the second authentication processing section 4306 exemplified in FIG. 43.

The third equipment has a third authentication processing section 4708. The third authentication processing section 4708 performs authentication for the fourth equipment 4704 on condition that the section 4708 itself is authenticated by the second authentication processing section 4707. If the second authentication processing section 4707 authenticates the third equipment 4703, the third equipment 4703 becomes trustworthy equipment for the first equipment 4701. Therefore, the first equipment 4701 can permit the third equipment 4703 to access to the information that the TRM section 4705 holds in the tamper-resistant region. Then, the third authentication processing section 4708 obtains the information that the TRM section 4705 holds in the tamper-resistant region, and may perform authentication for the fourth equipment 4704. Alternatively, it may obtain the information held in another equipment to perform authentication.

In the case where the third authentication processing section 4708 obtains the information that the TRM section 4705 holds in the tamper-resistant region, a communication section may be provided for the third equipment 4703 and the first equipment 4701 to enable the third equipment 4703 and the first equipment 4701 to directly communicate with each other. Alternatively, the following can be performed when the second authentication processing section 4707 includes the device driver function to access to the first equipment 4701. Specifically, the third authentication processing section 4708, by using the device driver function provided by the second authentication processing section 4707, obtains the information that the TRM section 4705 has in the tamper-resistant region via the second equipment. Therefore, the third authentication processing section 4708 may include the device driver function to access to the second authentication processing section 4707.

The fourth equipment 4704 has an application storage section 4709 and a fourth authentication processing section 4710. The application storage section 4709 corresponds to the application storage section 4307 in FIG. 43. The fourth authentication processing section 4710 performs authentication on condition that the equipment 4704 itself is authenticated by the third authentication processing section 4708. Herein the 'itself' means the fourth equipment 4704. Accordingly, if the third authentication processing section 4708 has authenticated the fourth equipment 4704, it is regarded that the first authentication processing section 4706 has authenticated the equipment, so that the third authentication processing section 4710 can perform authentication for the application stored in the application storage section 4709 using the information that the TRM section 4705 holds in the tamper-resistant region. Further, the fourth authentication processing section 4710 presents information showing that it has been authenticated the third authentication processing section 4708 for another equipment, obtains information for application authentication, and may perform authentication for the application.

Figure 48:
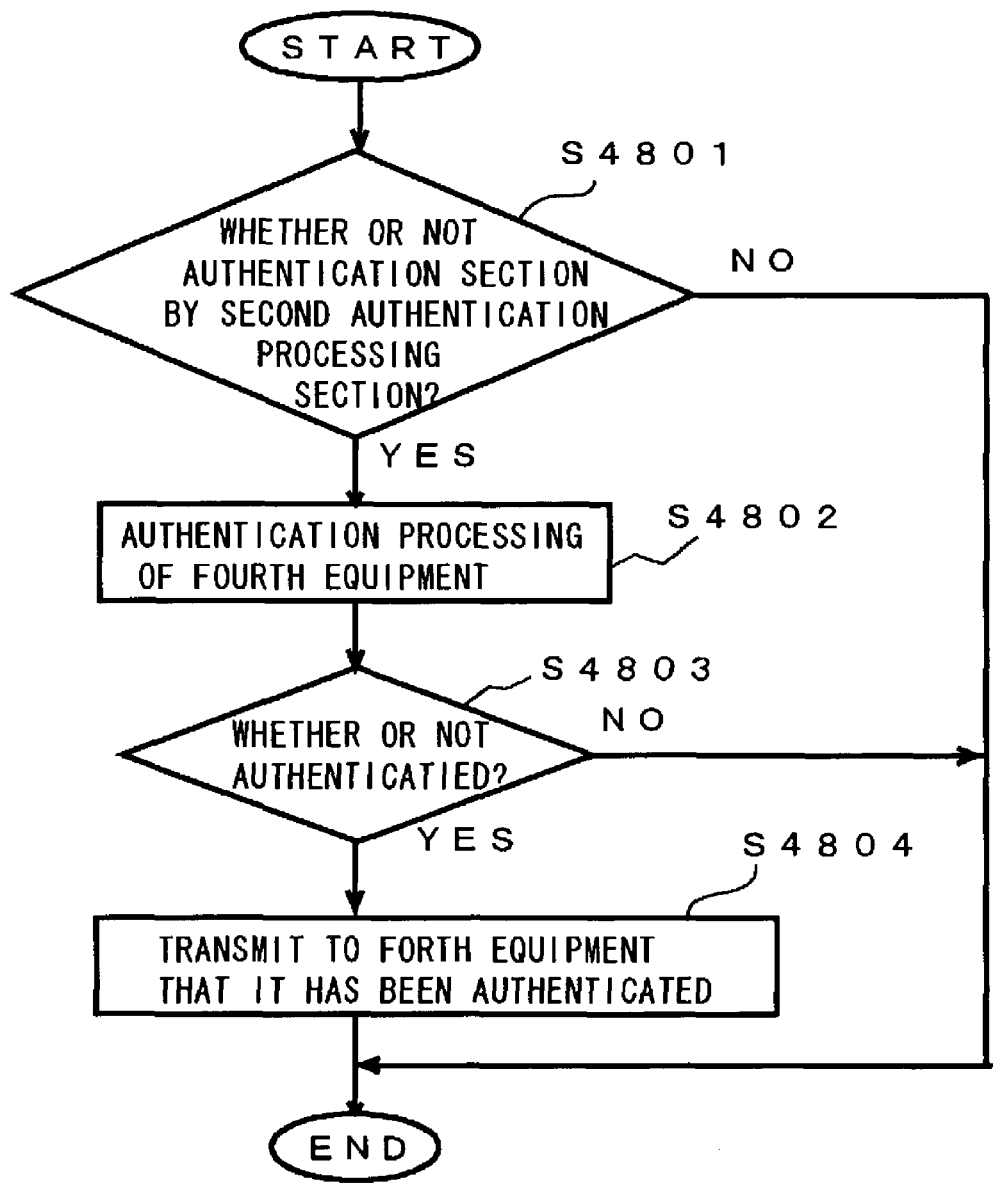
FIG. 48 is a flowchart explaining an operation flow of the third equipment when the application authentication system consists of the four kinds of equipment.

Thus, an operation in the case where the application authentication system is constituted of the 4 kinds of principal equipment is as follows. The operation of the first equipment 4701 is the same as the one exemplified in FIG. 44. Similarly, the operation of the second equipment 4702 is exemplified in FIG. 45. The operation of the third equipment 4703 is exemplified in FIG. 48. In other words, whether or not the third equipment 4703 has been authenticated by the second authentication processing section 4707 is determined in step S4801. If it has been authenticated, the authentication processing of the fourth equipment 4704 is performed in step S4802. In step S4803, whether or not it has been authenticated is determined, and if authenticated, the fact that it has been authenticated is transmitted to the fourth equipment 4704 in step S4804.

Figure 49:
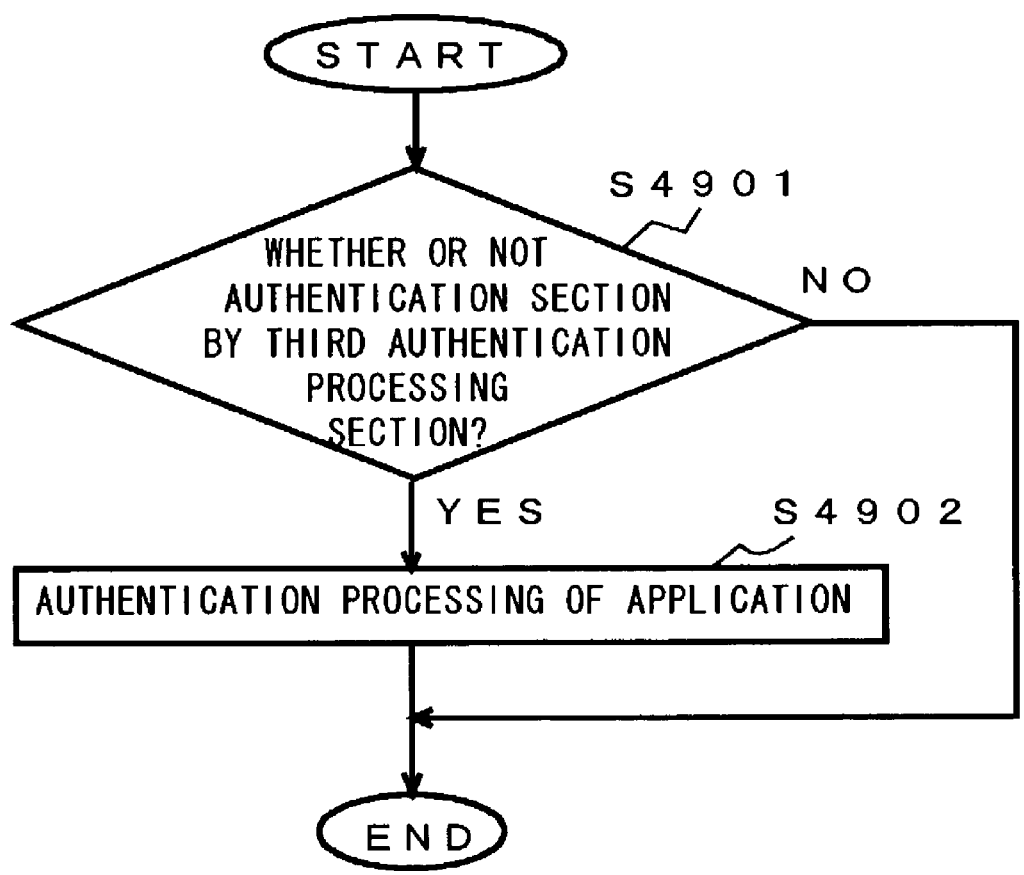
FIG. 49 is a flowchart explaining an operation flow of the fourth equipment when the application authentication system consists of the four kinds of equipment.

The operation of the fourth equipment 4704 is exemplified in FIG. 49. Whether or not it has been authenticated by the third authentication processing section 4708 is determined in step S4901, and if authenticated, the authentication processing of the application is performed in step 4902. The result of the authentication processing of the application may be transmitted to the first equipment 4701, for example. Alternatively, it may be transmitted to the second equipment 4702. If the application accesses another equipment, the information showing it has been authenticated by the third authentication processing section 4708 may be presented. Alternatively, the application may be added with the information showing that it has been authenticated by the third authentication processing section 4708.

Figure 50:
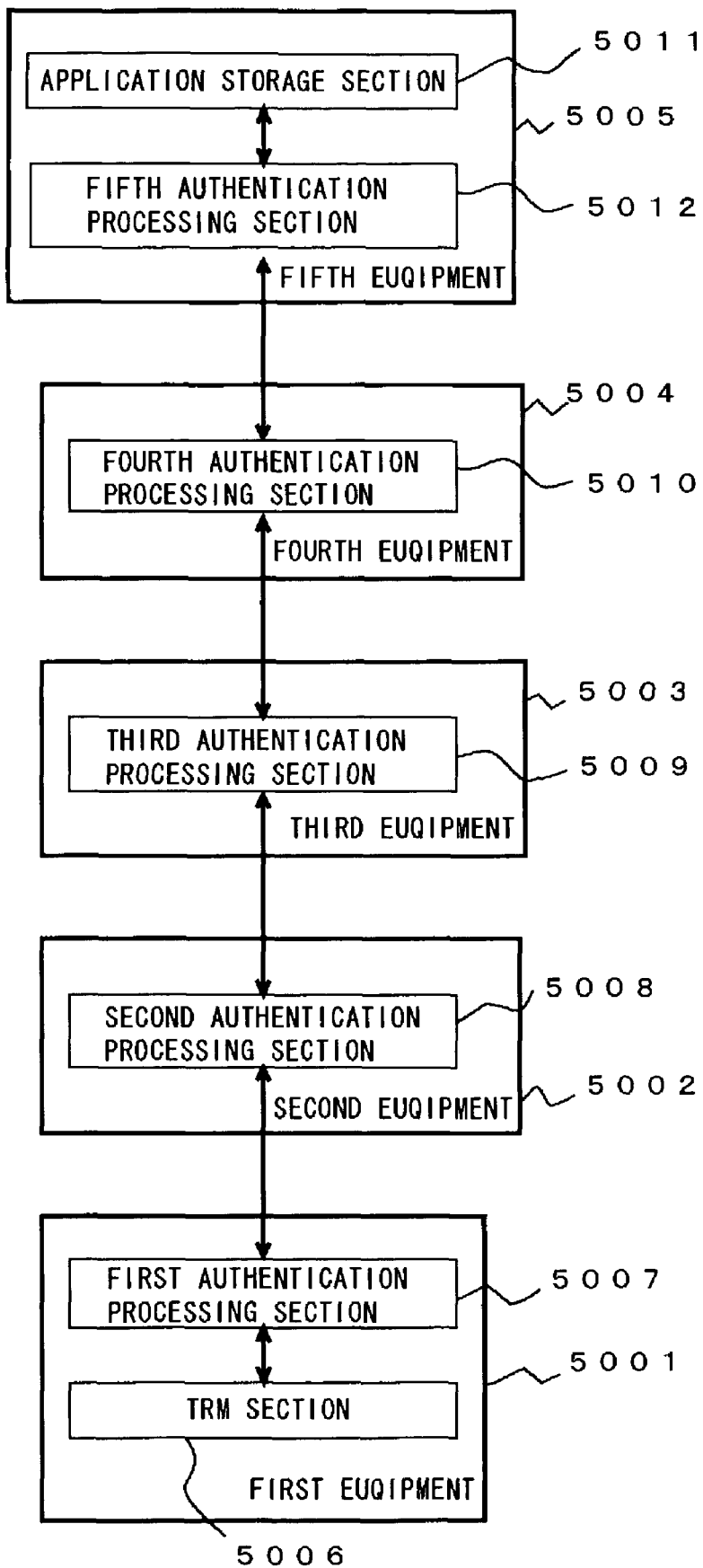
FIG. 50 is a function block diagram of the application authentication system that consists of five kinds of equipment.

Moreover, the number of principal equipment is not limited to 4, but the application authentication system may be constituted of 5 kinds of equipment as shown in FIG. 50, which are a first equipment 5001, a second equipment 5002, a third equipment 5003, a fourth equipment 5004, and a fifth equipment.

Figure 51:
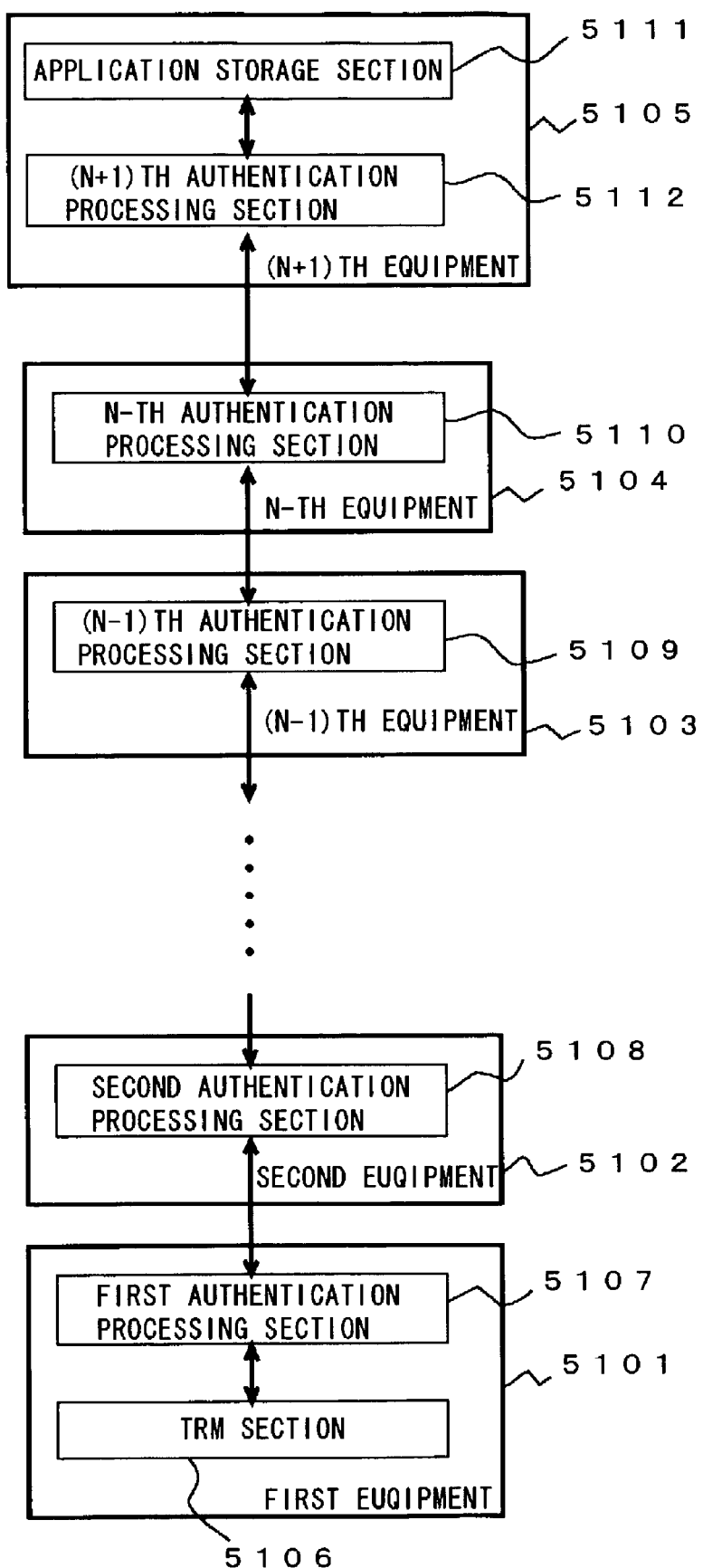
FIG. 51 is a function block diagram of the application authentication system that consists of N+1 kinds of equipment.

FIG. 51 exemplifies the function block diagram of the application authentication system when the number of principal equipment is generalized. In FIG. 51, the application authentication system is constituted of (N+1) pieces of equipment, which is formed by connecting a first equipment 5101 through an (N+1)th equipment 5105 in series. The description 'connecting' does not only mean that they are directly connected electrically or physically contact with each other. For example, they may be connected by a network represented by the Internet. Particularly, they may be connected by the network using the optical cable. Further, they may be connected by radio waves. In addition, the equipment may be interconnected with each other.

The first equipment 5101 has a TRM section 5106 and a first authentication processing section 5107. The TRM section 5106 holds information for authenticating the second equipment 5102 in the tamper-resistant region. The first authentication processing section 5107 performs authentication for the second equipment 5102 based on the authentication information.

In the following, any one of the second equipment 5102 to the N-th equipment 5104 will be shown as an i-th equipment. The i-th equipment has an i-th authentication processing section. The i-th authentication processing section performs authentication for an (i+1)th equipment on condition that the equipment itself is authenticated by the i-th authentication processing section. Herein, the 'itself' means the i-th equipment. Therefore, the i-th authentication processing section performs authentication for the (i+1)th equipment if the i-th equipment has been authenticated by an (i−1)th authentication processing section. If the (i−1)th authentication processing section has authenticated the i-th equipment, the i-th equipment can be regarded as a trustworthy one for the first equipment 5101. Thus, the first equipment 5101 can permit the i-th equipment to access to the information held in the tamper-resistant region by the TRM section 5106. Then, the i-th equipment may perform authentication for the (i+1)th equipment using the information held in the tamper-resistant region.

For example, in the case where the i-th authentication processing section accesses to the information held in the tamper-resistant region by the TRM section 5106, the i-th equipment and the first equipment 5101 may directly communicate with each other.

Further, the i-th authentication processing section may include the device driver function or the like to access to the (i−1)th authentication processing section. With this function included, an information demand is sequentially output from the i-th authentication processing section to the first authentication processing section 5107, and the demanded information is sent back sequentially from the first authentication processing section 5107 to the i-th authentication processing section.

The (N+1)th equipment has an application storage section 5111 and an (N+1)th authentication processing section 5112. The application storage section 5111 stores the application. Time for storing the application is unlimited. For example, the application may be stored to execute the application in the (N+1)th equipment 5105, or may be temporarily stored only to relay application transmission. Furthermore, an object of application storage is no object, and it is not only stored to execute the application in the (N+1)th equipment 5105, but may be stored for a downloading purpose to execute the application in another equipment. In addition, it may be stored to download and execute the application in the (N+1)th equipment 5105. Note that the name 'application' has been used, but it is not necessarily a program, but may be data.

The (N+1)th authentication processing section 5112 performs authentication for the application on condition that the equipment itself is authenticated by an N-th authentication processing section 5110. The 'itself' means the (N+1)th equipment 5105, and the 'application' means the application stored in the application storage section 5111.

Figure 52:
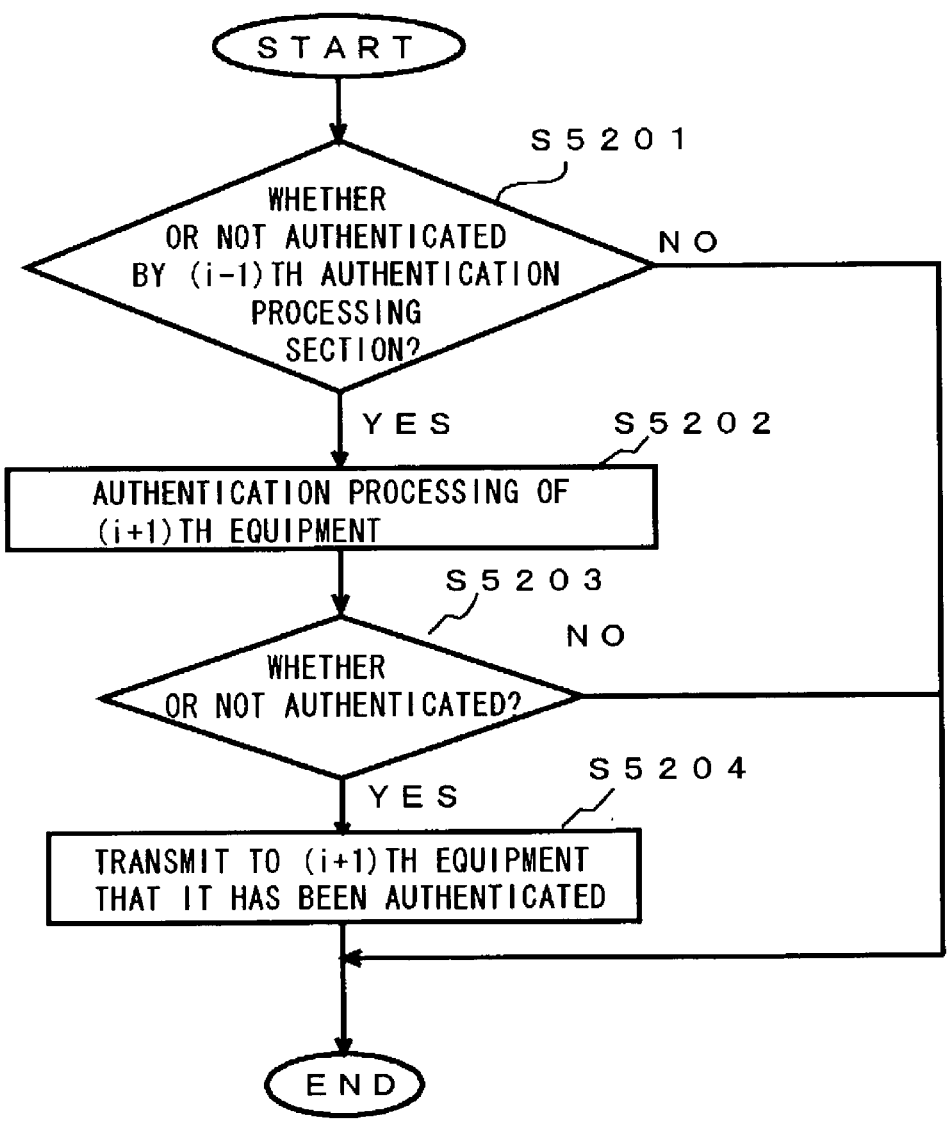
FIG. 52 is a flowchart explaining an operation flow of the i-th equipment.

FIG. 52 is the flowchart explaining the operation of any equipment from the second equipment 5102 to the N-th equipment 5104. In step S5201, whether or not the equipment has been authenticated by the (i−1)th authentication processing section is determined, and if authenticated, the authentication processing of the (i+1)th equipment is performed in step S5202. Whether or not the (i+1)th equipment has been authenticated is determined in step S5203, and if authenticated, the fact that the it has been authenticated is transmitted to the (i+1)th equipment. Thus, authentication is performed from the second equipment 5102 to the N-th equipment 5104 sequentially.

Figure 53:
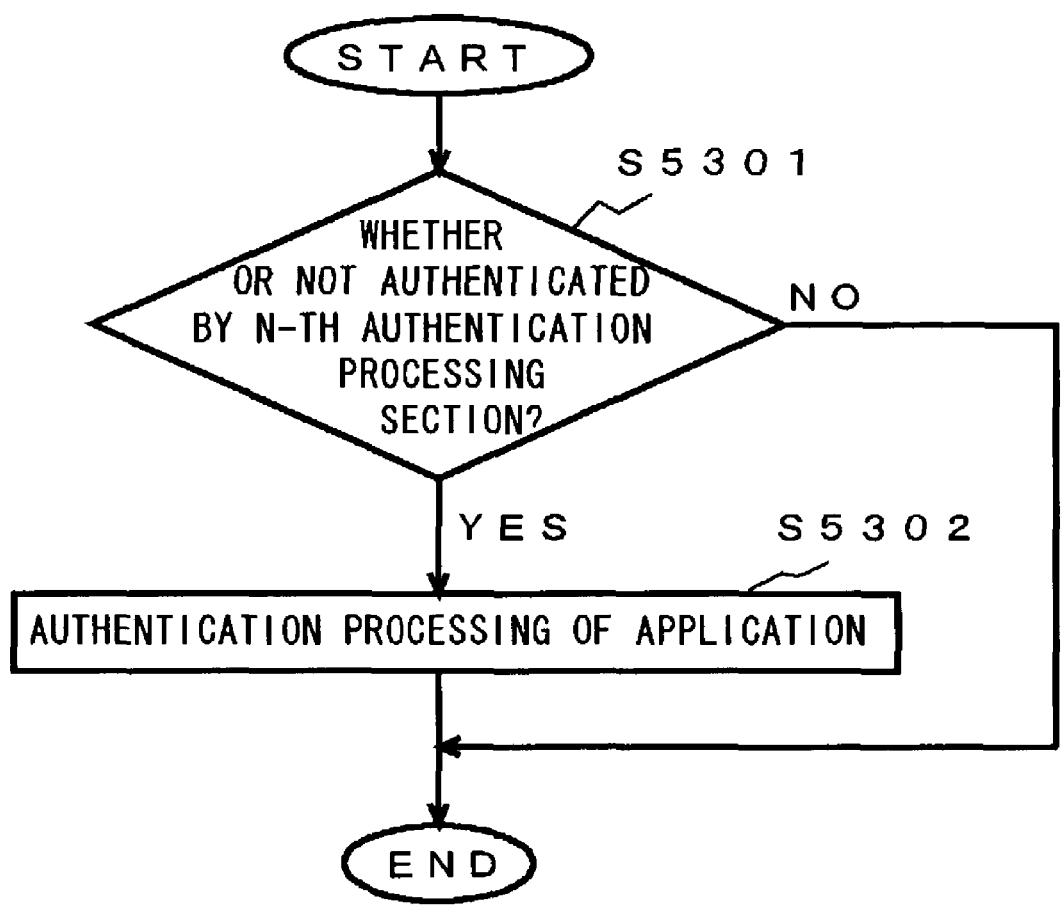
FIG. 53 is a flowchart explaining an operation flow of the (N+1)th equipment.

FIG. 53 exemplifies the flowchart of the operation of the (N+1)th equipment 5105. Whether or not it has been authenticated by the N-th authentication processing section 5110 is determined in step S5301, and if it is determined that it has been authenticated, it performs the authentication processing of the application in step S5302. When the application has been authenticated, the equipment 5105 transmits its result to the first equipment 5101 or the like, and permits the application to access to the first equipment 5101. Alternatively, the information that the application has been authenticated may be added to the application.

Figure 54:
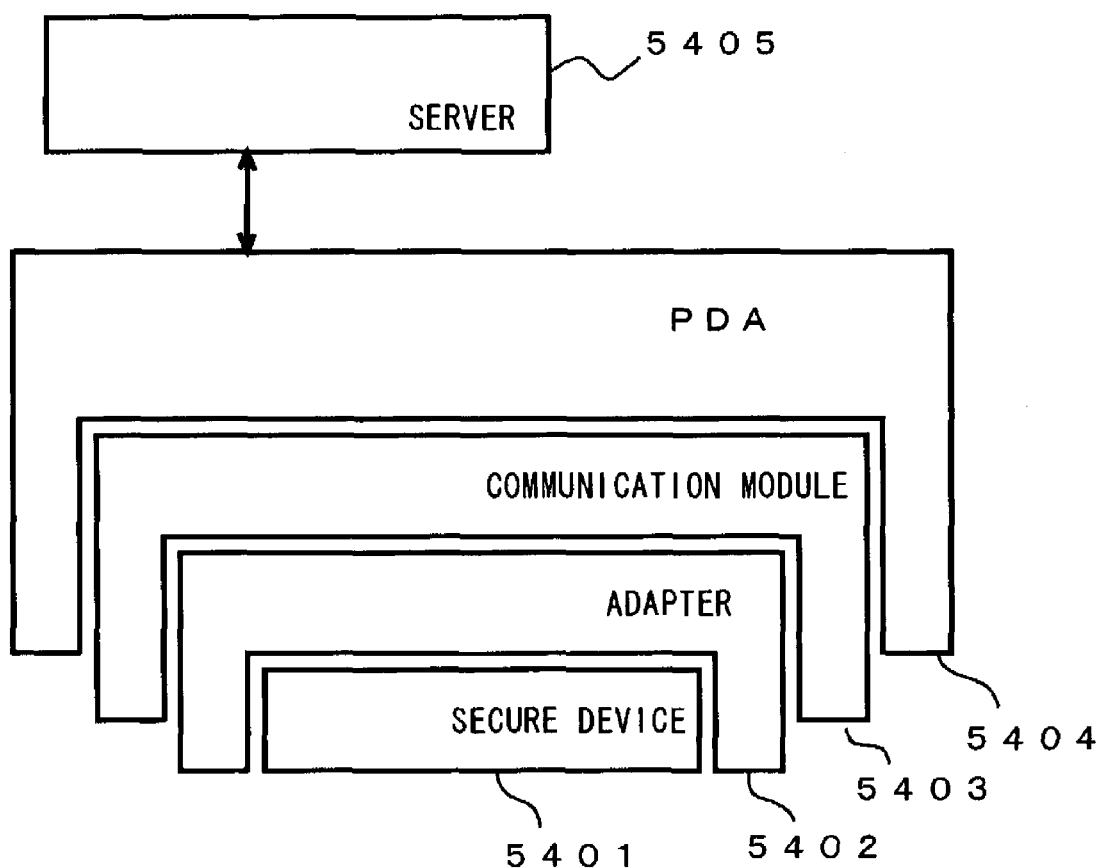
FIG. 54 is a schematic diagram showing that the equipment is connected using a nested structure.

In FIGS. 43, 47, 50, and 51, the equipment has been connected in series, but the equipment may be connected by using the nested structure. FIG. 54 schematically shows that the equipment is connected using the nested structure. A secure device 5401 is equivalent to the first equipment 5101, and has the TRM section and the first authentication processing section. The secure device 5401 is connected so as to be built in an adapter 5402 that is equivalent to the second equipment, as a part thereof. The adapter 5402 is connected so as to be built in a communication module 5403 that is equivalent to the third equipment, as a part thereof. Further, the communication module 5403 is connected so as to be built in a PDA (personal digital assistance) 5404 that is equivalent to the fourth equipment, as a part thereof. The PDA 5404 is connected to the server, which is equivalent to the fifth equipment, via a communication line. With such a connection, authentication can be performed for the application stored in the server 5405 by using the information held in the tamper-resistant region of the secure device 5401.

Note that the (N+1)th equipment 5105 may be a home electronic appliance. It also may be a so-called information home electronic appliance or a network home electronic appliance. Products such as an air conditioner, a humidifier, a dehumidifier, an air cleaner, a microwave oven, an oven, a refrigerator, a dish washing machine, a water heater, an iron, a trouser press, an electric vacuum cleaner, a washing machine, a drier, an electric blanket, electric sheets, a light fixture, a television, a radio, an audio apparatus such as a tape recorder, a camera, an IC recorder, a telephone, a facsimile machine, a copier, a printer, a scanner, a personal computer, and the like are cited.

Twenty-First Embodiment

In the twenty-first embodiment, when any one of the second equipment to the N-th equipment is shown as the i-th equipment, the i-th equipment may hold the information necessary for authenticating the (i+1)th equipment. For example, the i-th equipment has the tamper-resistant region, and may hold the necessary information for performing authentication in the region.

As described, when there could be a case that the i-th equipment holds the authentication information, which is the information necessary for authenticating, the i-th equipment may have an i-th authentication information obtaining section. Herein, the i-th authentication information obtaining section is a section that obtains the authentication information from an authentication information storage region when the i-th equipment has the authentication information storage region that is a region storing the authentication information. Further, the i-th authentication information obtaining section obtains the authentication information from the TRM section via the equipment from the second equipment to the (i−1)th equipment when the TRM section of the first equipment stores the authentication information. 'Via the equipment from the second equipment to the (i−1)th equipment' means the following. Specifically, the i-th authentication information obtaining section outputs a demand of the authentication information to an (i−1)th authentication information obtaining section, and finally, a second authentication information obtaining section outputs a demand of the authentication information to the first equipment. When the second authentication information obtaining section obtains the authentication information from the first equipment, it outputs the authentication information to a third authentication information obtaining section, and finally, the (i−1)th authentication information obtaining section outputs the authentication information to the i-th authentication information obtaining section.

Figure 55:
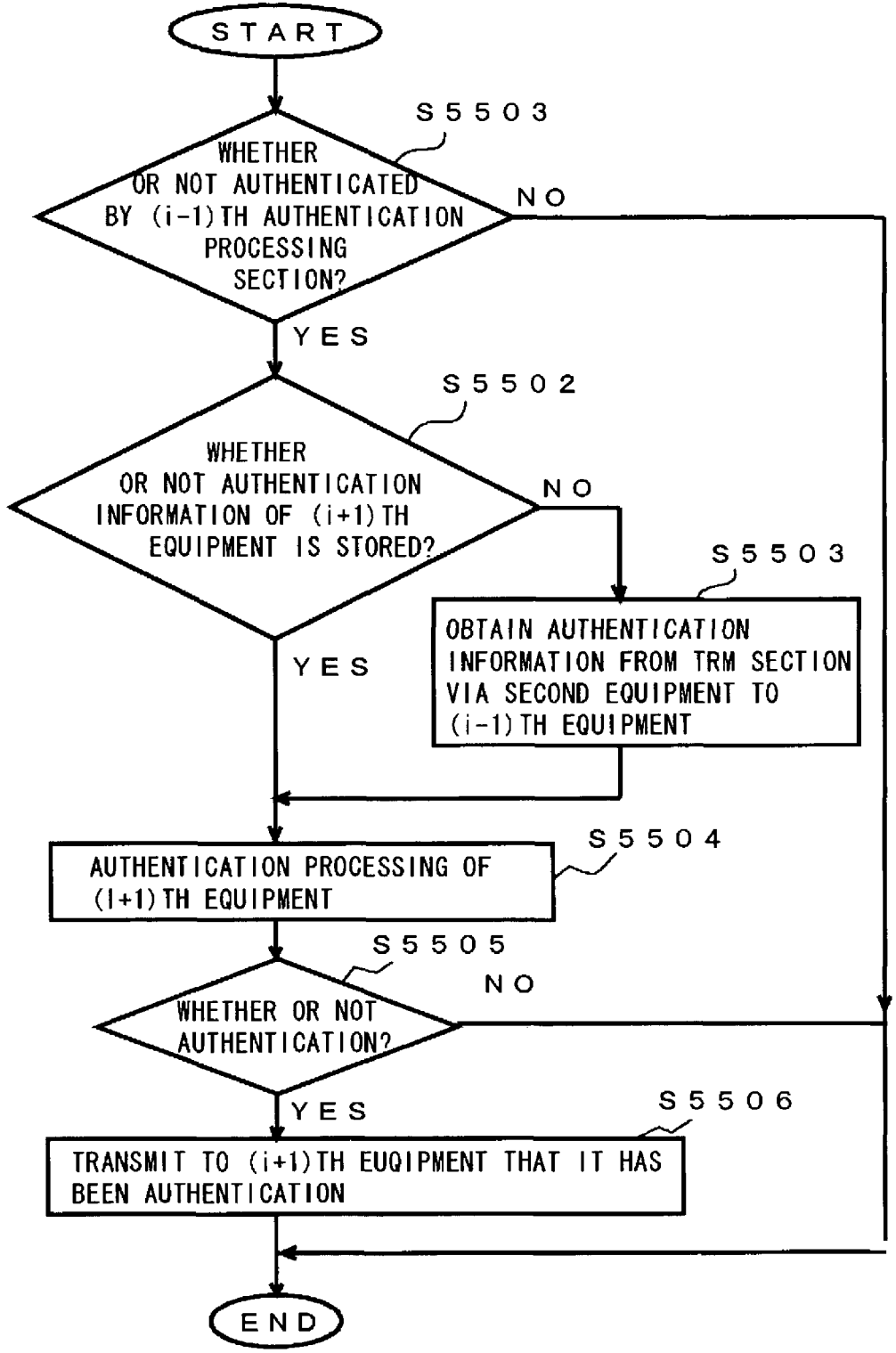
FIG. 55 is a flowchart explaining an operation flow of the i-th equipment in the twenty-first embodiment of the present invention.

FIG. 55 exemplifies the flowchart explaining the operation of the i-th equipment in this embodiment. In step S5501, whether or not it has been authenticated by the (i−1)th authentication processing section is determined. When it is determined that it has been authenticated, the processing proceeds to step S5502, and whether or not the authentication information of the (i+1)th equipment is stored in the authentication information storage region is determined. For example, the i-th equipment reads out the information stored in the authentication information storage region and determines if the authentication information can be obtained. If the information has not been stored, the processing proceeds to step S5503, and the equipment obtains the authentication information from the TRM section via the second equipment to the (i−1)th equipment. In step S5504, the authentication processing of the (i+1)th equipment is performed, and whether or not it has been authenticated is determined in step S5605. If authenticated, the fact that it has been authenticated is transmitted to the (i+1)th equipment.

By performing such a processing, even if the number of equipment that constitutes the application authentication system increases, authentication is performed using the authentication information when the equipment has the authentication information, and for example, it is possible to complete authentication for all the equipment in a short time.

ADVANTAGE OF THE INVENTION

As described above, according to the present invention, the authentication module and the terminal are combined to authenticate the application that operates in the terminal by the information held in the authentication module, and thus preventing an undesirable application from being executed in the terminal.

Further, by authenticating the TRM access library in the terminal with the authentication module, the TRM access library can perform a processing for authenticating the application. As a result, an application with high security can be executed, and an operation of A business transaction using the terminal can be performed. In addition, the tamper-resistant region may be in the authentication module and there is no need to mount the tamper-resistant region on the terminal, thus reducing manufacturing costs.

Furthermore, a source of the application is guaranteed by authenticating the application that operates in the terminal, and the application is permitted to access to the local resources of the terminal or the authentication module.

Still further, by authenticating the TRM section of the authentication module with the server, authentication for the terminal and the application that operates in the terminal can be performed. Thus, highly confidential information can be exchanged with the application that operates in the terminal, and an operation of complicated business transaction can be realized among the server, the terminal, and the authentication module.

Still further, by storing the signature of the application main body in the optional region, the signature of the application main body can be simultaneously downloaded with download of the application, thus the additional task to download the signature of the application main body can be omitted.

Moreover, in a state where three or more kinds of equipment are connected in series, authentication is sequentially performed from the equipment on one end and authentication for the application stored in the equipment on the other end.

What is claimed is:

1. A terminal comprising:
a storing unit operable to store a program executed in the terminal;
an authentication module including a resource used by the program; and,
a tamper resistant module access library section operable to intermediate an access from the program to the resource in the authentication module;
wherein,
said authentication module (i) includes a tamper resistant region storing tamper resistant module access library section authentication information, the tamper resistant region being protected from invalid reading and invalid writing of the tamper resistant module access library section authentication information stored therein, and (ii) determines, by using the tamper resistant module access library section authentication information, whether or not said tamper resistant module access library section is tampered with;
said tamper resistant module access library section determines whether or not the program is tampered with, when said authentication module determines that said tamper resistant module access library section is not tampered with; and,
said authentication module accepts the access from the program to the resource through said tamper resistant module access library section when (a) said authentication module determines that said tamper resistant module access library section is not tampered with and (b) said tamper resistant module access library section, which determines not to be tampered with, determines that the program is not tampered with, even when said authentication module itself does not determine whether or not the program is tampered with.

2. A terminal according to claim 1, further comprising:
a downloading unit operable to download the program to be stored in said storing unit from a server.

3. The terminal according to claim 1, wherein,
said storing unit, said module and said access controlling unit have different entity from one another.

4. The terminal according to claim 1, wherein,
the terminal includes N number of tamper resistant module access library sections, the N being two or more;
said authentication module determines, by using the tamper resistant module access library section authentication information, whether or not 1st tamper resistant module access library section is tampered with;
each of the 1st tamper resistant module access library section to N−1th tamper resistant module access library section determines whether or not each of 2nd tamper resistant module access library section to Nth tamper resistant module access library section is tampered with;
the Nth tamper resistant module access library section determines whether or not the program is tampered with; and said authentication module accepts the access from the program to the resource through said N number of tamper resistant module access library sections when (a) said authentication module determines that the 1st tamper resistant module access library section is not tampered with and (b) all of the N number of tamper resistant module access library sections are determined not to be tampered with, even when the authentication module itself does not determine whether or not the program is tampered with.

5. A terminal comprising:
a storing unit operable to store a program executed in the terminal;
an authentication module operable to manage resource used by the program;
a tamper resistant module access library section operable to intermediate an access from the program to the resource;
wherein,
said authentication module (i) includes a tamper resistant region storing tamper resistant module access library section authentication information, the tamper resistant region being protected from invalid reading and invalid writing of the tamper resistant module access library section authentication information stored therein, and (ii) determines, by using the tamper resistant module access library section authentication information, whether or not said tamper resistant module access library section is tampered with,
said tamper resistant module access library section (i) calculates a hash value of the program stored in said storing unit and send the calculated hash value to said authentication module when said authentication module determines that said tamper resistant module access library section is not tampered with and,
said authentication module further (i) determines, by using the hash value received from the tamper resistant module access library section, whether or not the program stored in said storing unit is tampered with, and (ii) accepts the access from the program to the resource through said tamper resistant module access library section when said authentication module determines that the program is not tampered with.

6. A terminal according to claim 1, further comprising: a downloading unit operable to download the program to be stored in said storing unit from the authentication module.

7. A method for a terminal, wherein the terminal includes a storing unit for storing a program executed in the terminal, an authentication module including a resource used by the program and a tamper resistant module access library section for intermediating an access from the program to the resource in the authentication module, and the method comprising steps of:
determining, by said authentication module and by using tamper resistant module access library section authentication information, whether or not said tamper resistant module access library section is tampered with, the tamper resistant module access library section authentication information being stored in a tamper resistant region in said authentication module, the tamper resistant region being protected from invalid reading and invalid writing of the tamper resistant module access library section authentication information stored therein;
determining, by said tamper resistant module access library section, determines whether or not the program is tampered with; and accepting the access from the program to the resource through said tamper resistant module access library section when (a) said authentication module determines that said tamper resistant module access library section is not tampered with and (b) said tamper resistant module access library section, which is determined not to be tampered with, determines that the program is not tampered with, even when the authentication module itself does not determine whether or not the program is tampered with.

8. The method for a terminal according to claim 7, wherein, the terminal further including a downloading unit; and, the information to be stored in said storing unit is downloaded from a server by said downloading unit.

9. The method according to claim 7, wherein,
said storing unit, said module and said tamper resistant module access library section are a different entity from one another.

10. The method according to claim 7, wherein,
the terminal includes N number of tamper resistant module access library sections; and
the method comprising steps of:
determining by said authentication module and by using the tamper resistant module access library section authentication information, whether or not 1st tamper resistant module access library section is tampered with;
determining, by each of the 1st tamper resistant module access library section to the N−1th tamper resistant module access library section, whether or not each of 2nd tamper resistant module access library section to Nth tamper resistant module access library section is tampered with;
determining, by said Nth tamper resistant module access library section, whether or not the program is tampered with; and
accepting the access from the program to the resource through said N number of tamper resistant module access library sections when (a) said authentication module determines that the 1st authentication is not tampered with and (b) all of the N number of tamper resistant module access library sections are determined not to be tampered with,
even when the authentication module itself does not determine whether or not the program is tampered with.

11. A method for a terminal, wherein the terminal includes a storing unit for storing a program executed by the terminal,
an authentication module including a resource used by the program and a tamper resistant module access library section for intermediating an access from the program to the resource in the authentication module, and
the method comprising steps of:
determining, by said authentication module and by using tamper resistant module access library section authentication information, whether or not said tamper resistant module access library section is tampered with, the tamper resistant module access library section authentication information being stored in a tamper resistant region in said authentication module, the tamper resistant region being protected from invalid reading and invalid writing of the tamper resistant module access library section authentication information stored therein;
calculating, by said tamper resistant module access library section, a hash value of the program stored in said storing unit when said authentication module determines that said tamper resistant module access library section is not tampered with;
sending, by said tamper resistant module access library section, the calculated hash value to said authentication module when said authentication module determines that said tamper resistant module access library section is not tampered with;
determining, by said authentication module, whether or not the program is tampered with by using the hash value received from said tamper resistant module access library section; and
accepting the access from the program to the resource through said tamper resistant module access library section when said authentication module determines that the program is not tampered with.

12. The method for a terminal according to claim 7, wherein,
the terminal further including a downloading unit; and,
the information to be stored in said storing unit is downloaded from said authentication module by said downloading unit.

* * * * *